(12) United States Patent
Milne et al.

(10) Patent No.: US 7,590,461 B2
(45) Date of Patent: Sep. 15, 2009

(54) LARGE SCALE SUPPLY PLANNING

(75) Inventors: Robert J. Milne, Jericho, VT (US);
Robert A. Orzell, Essex Junction, VT (US); Chi-Tai Wang, Greenfield Park (CA)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 11/278,817

(22) Filed: Apr. 6, 2006

(65) Prior Publication Data

US 2007/0239299 A1  Oct. 11, 2007

(51) Int. Cl.
*G06F 19/00* (2006.01)
*G06Q 10/00* (2006.01)

(52) U.S. Cl. ................. 700/95; 700/99; 700/101; 700/102; 700/103; 700/107; 705/28

(58) Field of Classification Search ............. 700/95–97, 700/99–104, 106, 107; 705/28, 29
See application file for complete search history.

(56) References Cited

U.S. PATENT DOCUMENTS

| | | | |
|---|---|---|---|
| 5,216,612 A | 6/1993 | Cornett et al. | |
| 5,548,518 A | 8/1996 | Dietrich et al. | |
| 5,699,259 A | 12/1997 | Colman et al. | |
| 5,751,580 A | 5/1998 | Chi | |
| 5,787,000 A | 7/1998 | Lilly et al. | |
| 5,818,716 A | 10/1998 | Chin et al. | |
| 5,971,585 A | 10/1999 | Dangat et al. | |
| 6,088,626 A | 7/2000 | Lilly et al. | |
| 6,272,389 B1 | 8/2001 | Dietrich | |
| 6,434,443 B1 | 8/2002 | Lin | |
| 6,584,370 B2 | 6/2003 | Denton et al. | |
| 6,701,201 B2 * | 3/2004 | Hegde et al. | ............ 700/107 |
| 6,731,999 B1 | 5/2004 | Yang et al. | |
| 7,058,587 B1 | 6/2006 | Horne | |
| 7,197,469 B2 | 3/2007 | Hegde et al. | |
| 7,286,889 B1 | 10/2007 | Orzell et al. | |
| 7,292,904 B2 | 11/2007 | Denton et al. | |
| 7,308,330 B2 | 12/2007 | Jones | |
| 7,356,376 B1 | 4/2008 | Aboujaoude et al. | |
| 7,379,781 B2 * | 5/2008 | Treichler et al. | ............. 700/99 |
| 7,385,529 B2 | 6/2008 | Hersh et al. | |

(Continued)

*Primary Examiner*—Sean P Shechtman
(74) *Attorney, Agent, or Firm*—Gibb I.P. Law Firm, LLC; Richard M. Kotulak, Esq.

(57) ABSTRACT

A production planning method inputs demands for products. The demands have multiple due dates, and the multiple due dates have different priorities. The method performs an explosion process utilizing linear programming and heuristics to identify demands for components that are used to make the products (the explosion process maintains the multiple due dates and corresponding priorities for the components) and performs an implosion process utilizing linear programming and heuristics to assign resources to the components considering the multiple due dates and corresponding priorities.

23 Claims, 22 Drawing Sheets

4 – MRP to create starts with multiple due dates and corresponding priorities

4a-MRP steps used to post process LP results to get muliple due dates and starts info 2a- "grouping" portion of resource allocation/grouping used to lotsize with requested date as driver date 4b – BOM explosion

U.S. PATENT DOCUMENTS

| | | |
|---|---|---|
| 2002/0198757 A1 | 12/2002 | Hegde et al. |
| 2003/0149631 A1 | 8/2003 | Crampton et al. |
| 2004/0186605 A1 | 9/2004 | Wu et al. |
| 2005/0096771 A1 | 5/2005 | Denton et al. |
| 2005/0171625 A1 | 8/2005 | Denton et al. |
| 2005/0171786 A1 | 8/2005 | Denton et al. |
| 2005/0171824 A1 | 8/2005 | Denton et al. |
| 2005/0171828 A1 | 8/2005 | Denton et al. |
| 2005/0177465 A1 | 8/2005 | Orzell et al. |
| 2006/0282343 A1* | 12/2006 | Palanisamy et al. ........... 705/28 |
| 2007/0239297 A1 | 10/2007 | Degbotse et al. |
| 2007/0239304 A1 | 10/2007 | Orzell |

* cited by examiner

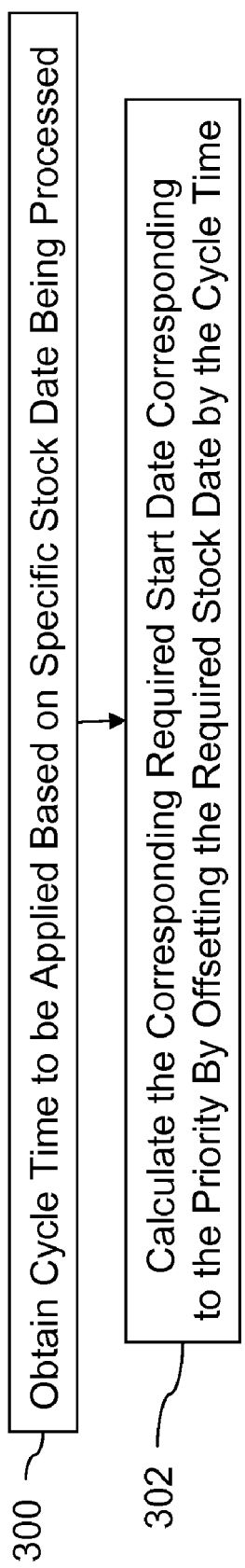

300 — Obtain Cycle Time to be Applied Based on Specific Stock Date Being Processed 302 — Calculate the Corresponding Required Start Date Corresponding to the Priority By Offsetting the Required Stock Date by the Cycle Time

Figure 8

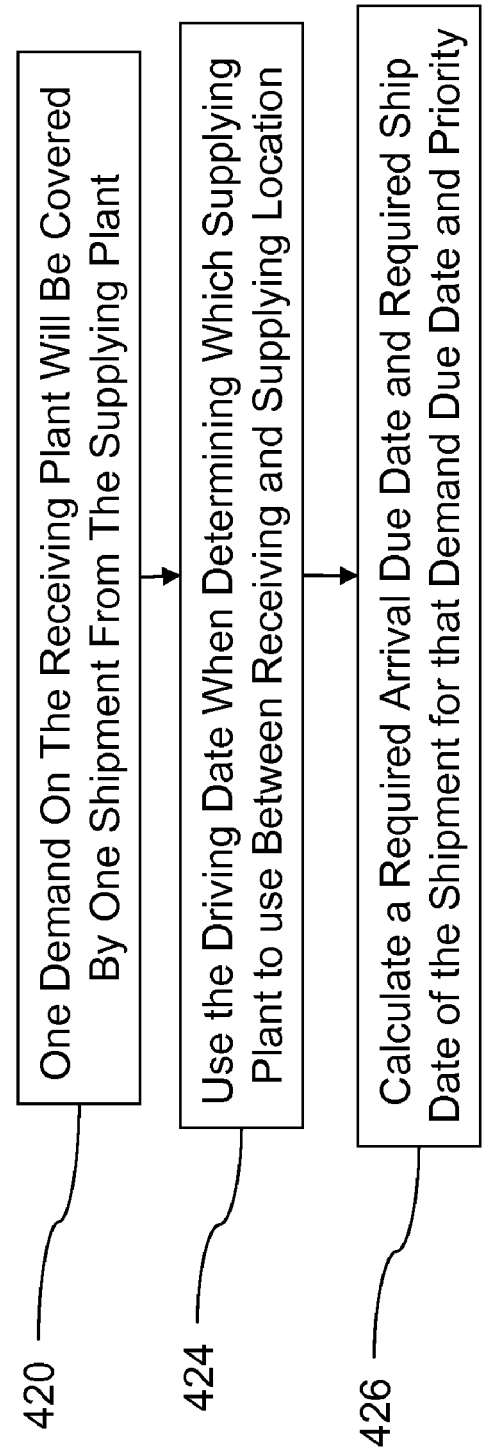

420 — One Demand On The Receiving Plant Will Be Covered By One Shipment From The Supplying Plant 424 — Use the Driving Date When Determining Which Supplying Plant to use Between Receiving and Supplying Location 426 — Calculate a Required Arrival Due Date and Required Ship Date of the Shipment for that Demand Due Date and Priority

Figure 9

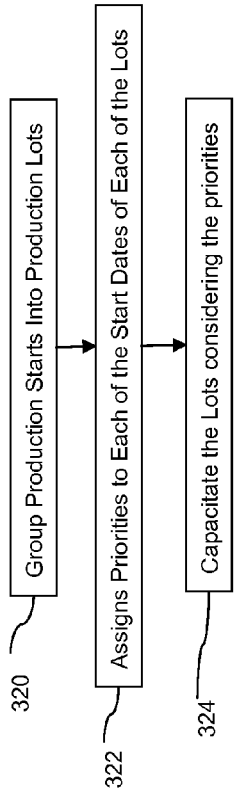
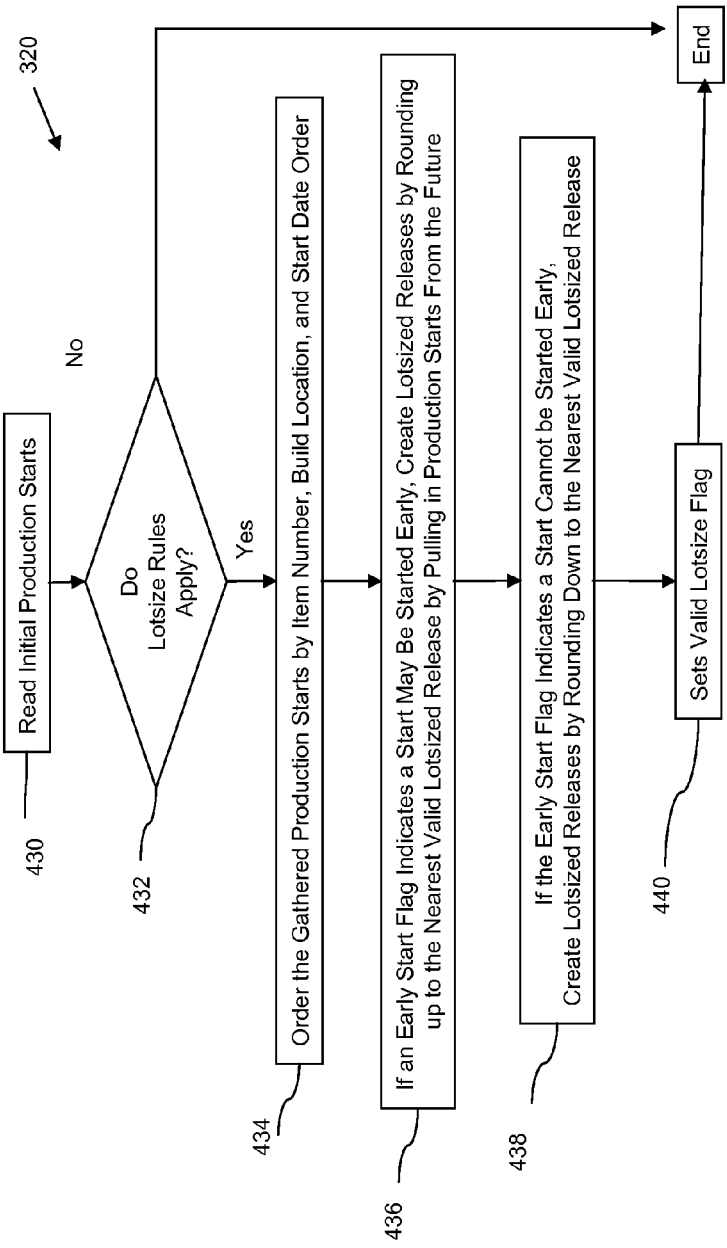

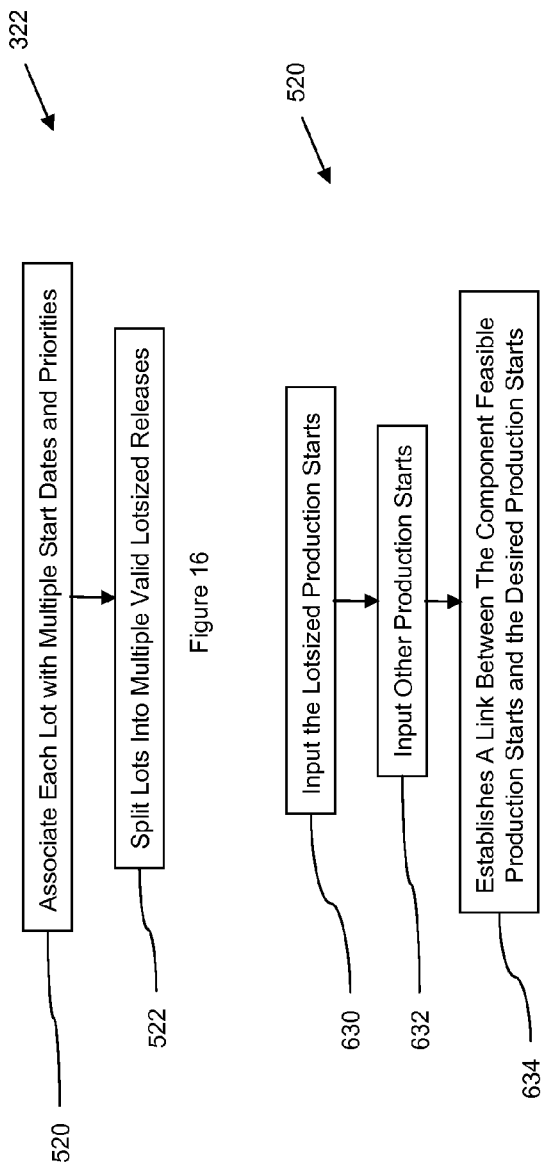
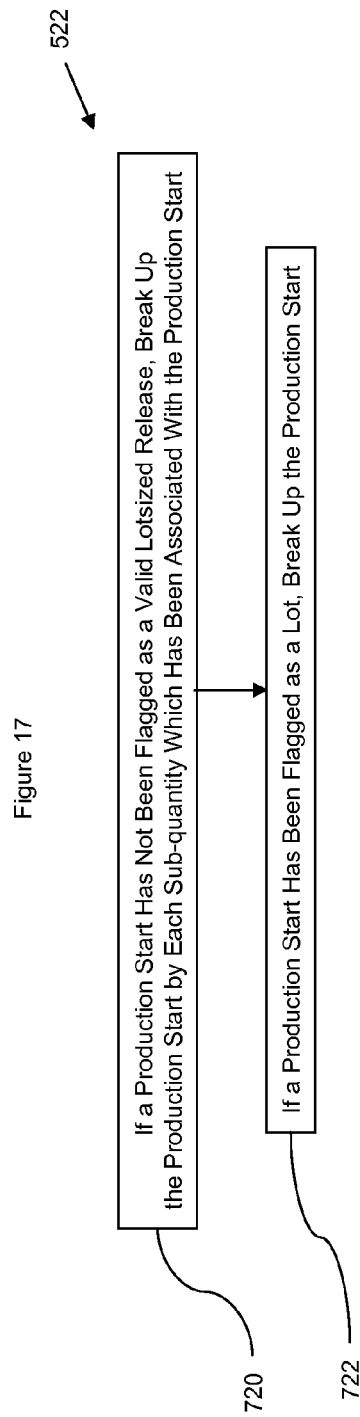
Figure 16
Figure 17
Figure 18

L1, L2 and L3 are supply locations. R1, R2 and R3 are Demand locations

US 7,590,461 B2

LARGE SCALE SUPPLY PLANNING

The present application is related to pending U.S. Patent Publication No. 2007/0239304 A1, published on Oct. 11, 2007 to Robert Orzell, entitled "A Method For Calculating A Materials Requirements Plan For Demands Containing Multiple Demand Dates and Priorities" having (IBM); U.S. Patent Publication No. 2007/0239297 A1, published on Oct. 11, 2007 to Degbotse at al., entitled "Supply Consumption Optimization and Multiple Component Utilization" having (IBM); and U.S. Pat. No. 7,286,889 B1, patented on Oct. 23, 2007 to Orzell and Patil, entitled, "Method For Resource Allocation and Re-Grouping Recognizing Competing Priorities Which Vary By Date" having (IBM). The foregoing applications are assigned to the present assignee, and are all incorporated herein by reference.

BACKGROUND OF THE INVENTION

1. Field of the Invention

The present invention relates to computer implementable decision support systems for resource allocation and for determining optimal supply chain plans based on multiple due date considerations. General methodologies within this field of study include advanced planning systems, optimization and heuristic based methods, constraint based programming, and simulation.

2. Description of the Related Art

A fundamental problem faced in all manufacturing industries is the allocation of material and capacity assets to meet end customer demand. Production lead times necessitate the advance planning of production starts, interplant shipments, and material substitutions throughout the supply chain so that these decisions are coordinated with the end customers' demand for any of a wide range of finished products (typically on the order of thousands in semiconductor manufacturing). Such advance planning depends upon the availability of finite resources which include: finished goods inventory, work in process inventory (WIP) at various stages of the manufacturing system, and work-center capacity. Often, there are alternative possibilities for satisfying the demand. Products may be built at alternative locations and within a location there may be choices as to which materials or capacity to use to build the product. The product may be built directly or acquired through material substitution or purchase. When limited resources prevent the satisfaction of all demands, decisions need to be made as to which demand to satisfy and how to satisfy it. This resource allocation problem is often addressed through linear programming or heuristic methods.

The below-referenced U.S. Patents disclose embodiments that were satisfactory for the purposes for which they were intended. Both the below-referenced prior U.S. Patents, in their entireties, are hereby expressly incorporated by reference into the present invention for purposes including, but not limited to, indicating the background of the present invention and illustrating the state of the art: U.S. Pat. No. 5,971,585, "Best can do matching of assets with demand in microelectronics manufacturing," Oct. 26, 1999; U.S. Pat. No. 6,701, 201, "Decomposition System and Method for Solving a Large-Scale Semiconductor Production Planning Problem," Mar. 2, 2004; U.S. Patent Application 20050171824US1, "Method for simultaneously considering customer commit dates and customer request dates," Aug. 4, 2005; and U.S Patent Application 20020198757US1, "Method for allocating limited component supply and capacity to optimize production scheduling," Dec. 26, 2002.

SUMMARY OF INVENTION

The methodology disclosed herein provides a production planning method that inputs demands for products. The demands have multiple due dates, and the multiple due dates have different priorities. The method performs an explosion process utilizing linear programming and heuristics to identify demands for components that are used to make the products (the explosion process maintains the multiple due dates and corresponding priorities for the components) and performs an implosion process utilizing linear programming and heuristics to assign resources to the components considering the multiple due dates and corresponding priorities.

The explosion process comprises a materials requirement planning methodology that creates production starts considering the multiple due dates and corresponding priorities. The explosion process also comprises determining appropriate sizes of production lots considering the multiple due dates and corresponding priorities. The explosion process uses a bill of material and the assembly part number release information to create dependent demand for the component part numbers, considering the multiple due dates and corresponding priorities.

The implosion process comprises a supply consumption heuristic that produces optimal results for the multiple due dates and corresponding priorities considering supply of a single component. The implosion process also comprises a multiple component utilization heuristic that produces results for the multiple due dates and corresponding priorities, simultaneously considering supply of multiple components. The implosion process groups demands for the components considering the multiple due dates and corresponding priorities.

BRIEF DESCRIPTION OF THE DRAWINGS

FIG. 8 is a flow diagram illustrating a method to calculate required manufacturing production starts;

FIG. 9 is a flow diagram illustrating a method to calculate shipments between locations;

FIG. 14 is a flow diagram illustrating a method of grouping production starts into valid lotsizes.

FIG. 15 is a flow diagram illustrating a method of associating multiple priorities with a lot;

FIG. 16 is a flow diagram further illustrates a detail of FIG. 15;

FIG. 17 is a flow diagram illustrates another detail of FIG. 15;

FIG. 18 is a flow diagram illustrates details of associating priorities with a lot when a lot consists of groups of starts each having multiple priorities;

DETAILED DESCRIPTION

Figure 1:
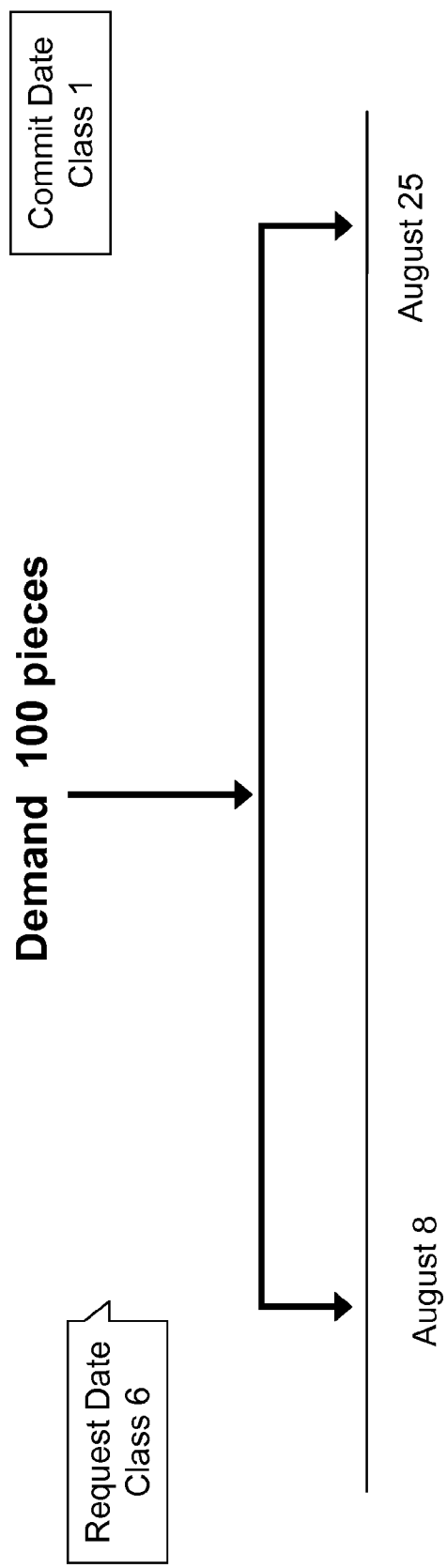
FIG. 1 is a schematic diagram showing an example of a demand with a request due date and a commit due date.

Supply chain planning involves the allocation of limited resources such as material inventories and capacities to best satisfy a prioritized demand statement. Competing needs for resources can be prioritized. However, the business priorities associated with a need can change as a function of when the need is satisfied. For example, FIG. 1 illustrates a demand for 100 pieces which has a requested delivery date of August $8^{th}$ and a committed delivery date of August $25^{th}$. In this example, previously the business committed to deliver the 100 pieces to the customer by August $25^{th}$ and presently the customer is requesting the pieces be delivered by August $8^{th}$. Because it is more important for the business to honor its previous commitment, the demand's commit date is assigned a more important priority (demand class 1) than the demand's request date (demand class 6). In general, a need may not be particularly important at the moment but may become critically important if the need is not met by a certain date (e.g. completing a project by a certain date required by government regulations). The converse is also true in that certain business needs may be critical to be satisfied by a certain date but will lose value if the date is not met (e.g. being first to market). In fact, any given need for a supply may have multiple independent dates associated with it such that supplying the need by those dates would have different value (importance) to the enterprise and hence should be associated with different priorities which either increase or decrease in importance as a function of the delivery date. The invention described solves the problem of how to allocate limited material inventories and capacities to needs (or demand) when priorities associated with the need change as a function of when the need is satisfied.

Figure 2:
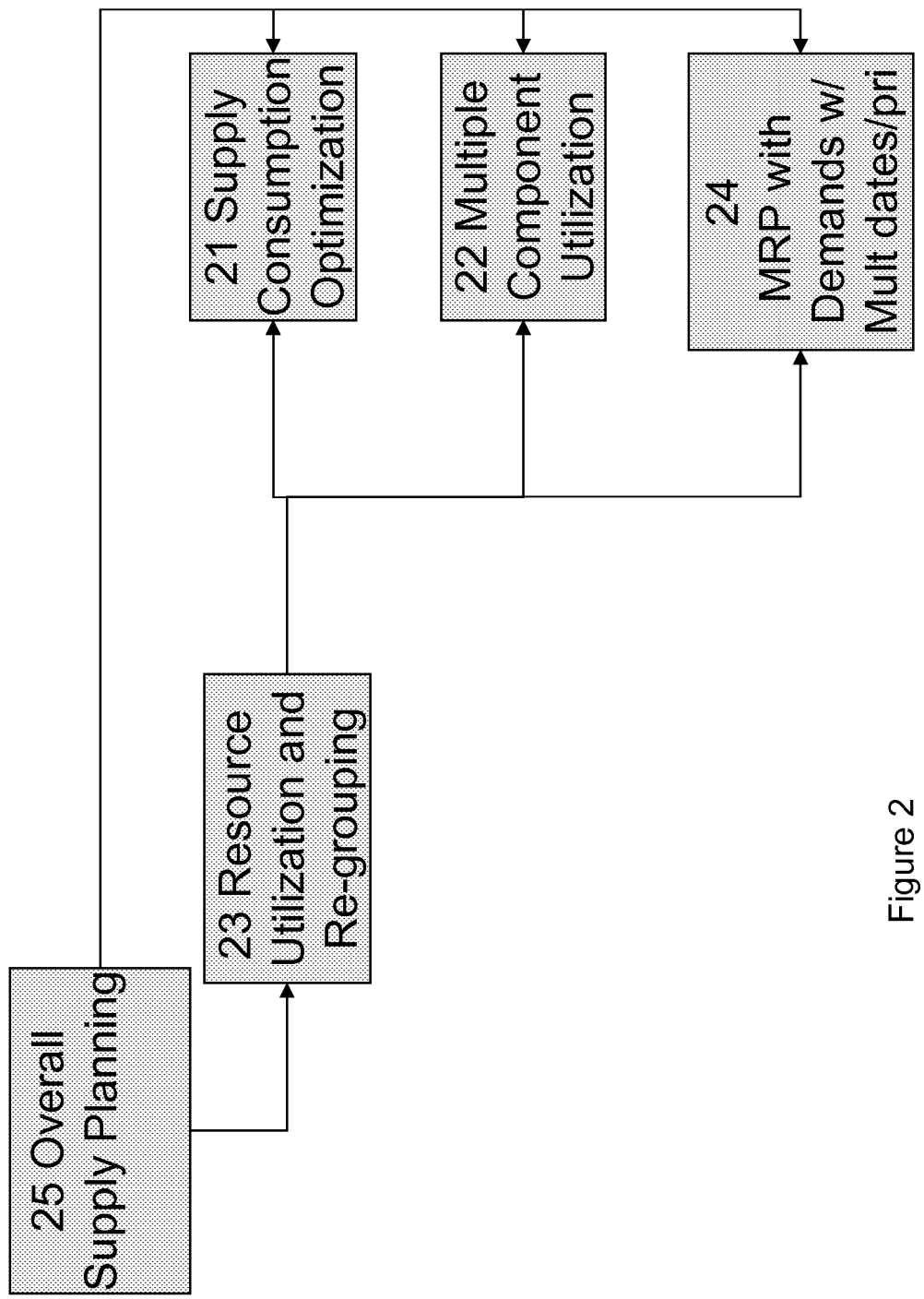
FIG. 2 is a flowchart diagram illustrating one embodiment of the methodology herein.

As shown in FIGS. 2-6, the methodology disclosed herein provides an overall supply planning (production planning) method 25 that inputs demands for products. The demands have multiple due dates, and the multiple due dates each have different priorities. The method performs an explosion process (FIG. 3) utilizing linear programming and heuristics to identify demands for components that are used to make the products (the explosion process maintains the multiple due dates and corresponding priorities for the components) and performs an implosion process (FIG. 5) utilizing linear programming and heuristics to assign resources to the components considering the multiple due dates and corresponding priorities. FIG. 2 indicates aspects of the invention used in order to have supply planning produce desirable results considering the multiple due dates and corresponding priorities.

The present invention builds on the work of U.S. Pat. No. 6,701,201 (which is incorporated herein by reference) to add lotsizing capabilities to product started at the beginning of each manufacturing stage and the ability to best supply given customer demands having a plurality of dates and priorities. U.S. Pat. No. 6,701,201 neither addresses nor instructs how to produce solutions where lotsizing is required or when demands have priorities which vary by date. The present invention builds on U.S. Pat. No. 6,701,201 to provide these additional functional capabilities, as described below.

Figure 3:
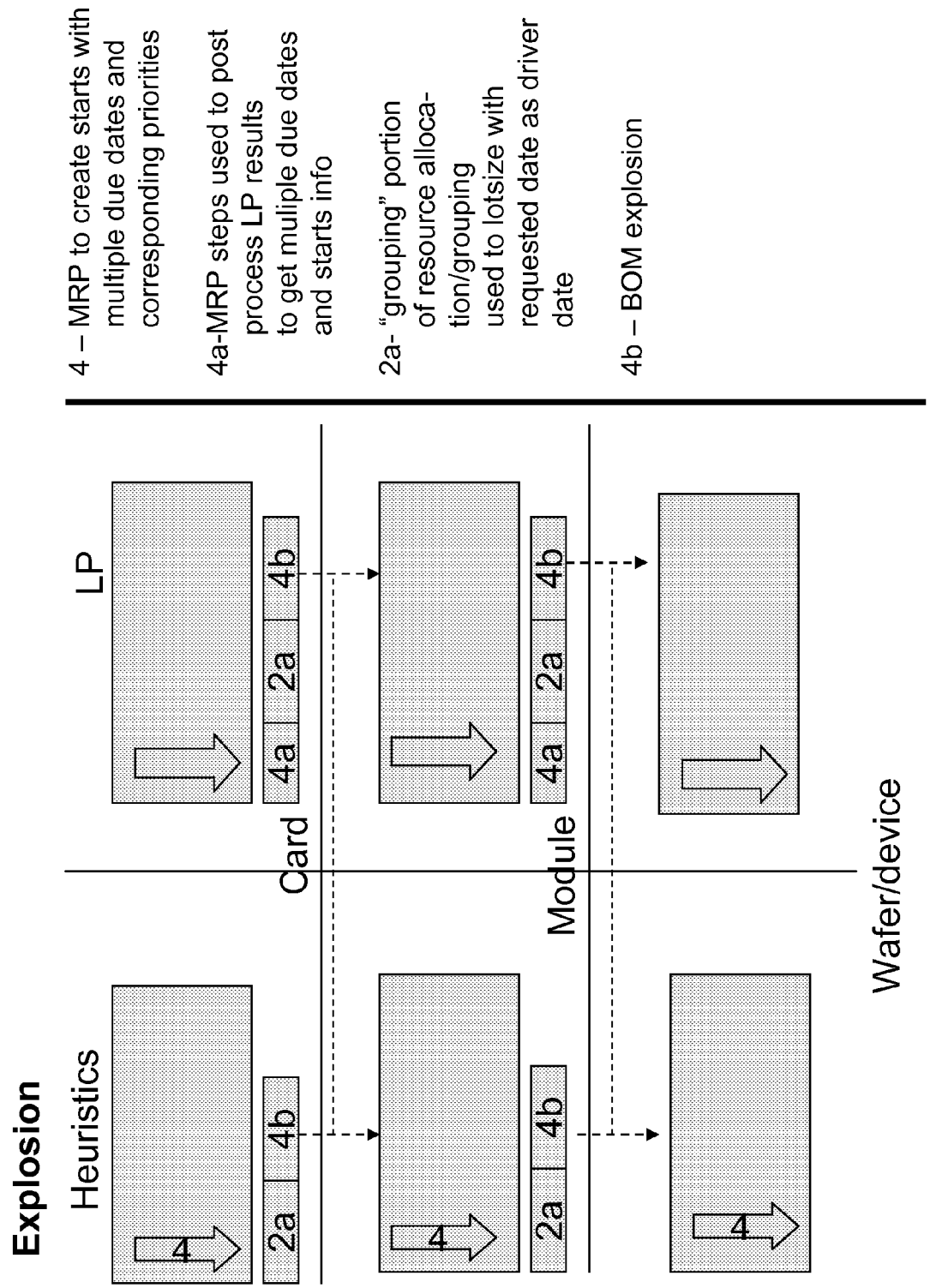
FIG. 3 is a schematic diagram showing an explosion process.

The explosion process shown in FIG. 3 comprises a materials requirement planning (MRP) methodology (item 24 in FIG. 2 and items 4 and 4a in FIG. 3) that creates production starts considering the multiple due dates and corresponding priorities. The details regarding the MRP methodology are explained more fully in FIGS. 7-13 discussed below; however, FIG. 3 generally illustrates the explosion process whereby heuristics and linear programming (LP) explode a given product (e.g., semiconductor card) into its components, which in the example shown in FIG. 3 include a module and wafer/device. The previous sentence is not meant to imply that a finished card is exploded directly into component modules, wafers, and devices. Each card, module, and wafer stage of FIG. 3 represents a collection of part numbers. A single stage may have multiple levels of bills of material. For instance, in FIG. 5 of U.S. Pat. No. 6,701,201, modules parts 1, 2, 3, A, B, C, and finished modules X, Y, and Z would all be parts processed within a module stage. Parts in levels 1-4 of FIG. 5 would be processed in the device/wafer stage. In FIG. 3, item 4 represents the materials requirement planning to create production starts with multiple due dates and corresponding priority information relating to each of the multiple due dates, and item 4a represents the materials requirement planning processes that are used to post-process the linear programming results to create production starts with multiple due dates and corresponding priority information.

In FIGS. 2 and 3, the explosion process also comprises determining appropriate sizes of production lots (lotsizing) considering the multiple due dates and corresponding priorities using items 23 and 2a. The details regarding lotsizing are discussed below respect to FIGS. 14-22; however, item 2a in FIG. 3 illustrates the grouping of a portion of a resource and the allocation/grouping used to determine the appropriate lot size given a requested date as a driver date (see discussion below) when exploding the product (e.g., card) into its constituent components (e.g., module, wafer/device).

Further, the explosion process shown in FIGS. 2 and 3 uses a bill of materials (items 24 and 4b) and considers the multiple due dates and corresponding priorities. Again, the details regarding the MRP methodology are explained more fully in FIGS. 7-13 discussed below; however, item 4b uses the bill of materials as part of the MRP processing during the explosion of the product into its constituent components shown in FIG. 3.

Figure 4:
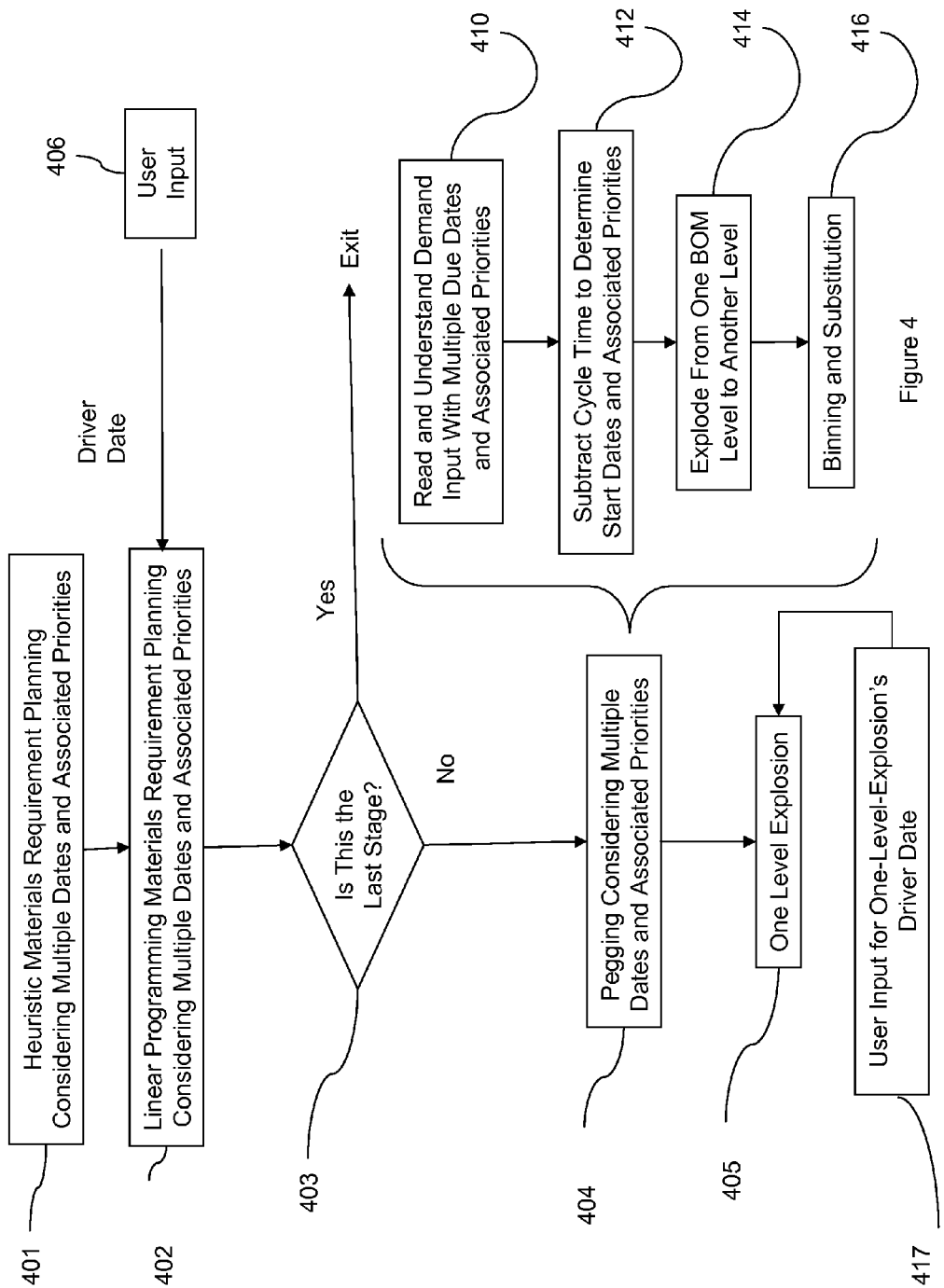
FIG. 4 is a flow diagram illustrating one embodiment of the invention relating to an explosion process.

FIG. 4 shows a flow chart implementing the sub-steps of the explosion function shown in FIG. 3. This figure is similar to FIG. 10 of U.S. Pat. No. 6,701,201 but the present invention combines new methods with old methods in novel ways to add the additional capabilities of lotsizing and consideration of multiple dates and priorities associated with demand; the details of which are discussed below. The logic of FIG. 4 may occur for each stage (for example, for the card, module, and device stages).

In function block 401, a heuristic MRP calculation is performed in the heuristic partition of the current stage. In the present invention, the MRP calculation will pass demand attribute information (e.g., demand priority, booked_or_non_ booked_order_indicator) including multiple dates and associated priorities from the top to the bottom of the BOM for the stage. The demand attribute information is passed by mapping each demand against the assets which satisfy it and then passing this information through the BOMs explosions. This allows the demand attribute information (including multiple dates and associated priorities) of one manufacturing stage to be later passed to subsequent (lower level) stages. The MRP of this invention is thus fundamentally different than the MRP discussed in item 1001 of U.S. Pat. No. 6,701,201. Corresponding to item 4 of FIG. 3, the MRP of this invention contains enhanced methods to calculate and carry through the supply chain build plans (i.e., production starts, shipments, etc.) containing a multitude of dates associated with different priorities. Each demand input to the MRP of this invention can have multiple dates, each with a different priority. For example, a demand can have a request date having one priority and a required date having a different (possibly higher) priority. In response, recommended productions starts and shipments generated by the MRP of the present invention will themselves have multiple priorities and corresponding multiple dates corresponding to what is needed to be built to satisfy the multiple dates and priorities associated with the demands that are input to the MRP. In addition, the MRP of this invention is sufficiently robust to do so in a manner that supports binning and substitution common to semiconductor and process industries. This method accomplishes this by employing the methods shown in FIGS. 7-13 discussed below. FIGS. 7-13 correspond to the novel functionality shown as item 24 in FIG. 2. At the end of block 401, the MRP of this method will have produced recommended production starts each with a multitude of start dates and priorities. This marks the end of the process shown as item 4 in FIG. 3.

In function block 402, an LP is performed in the linear programming partition of the current stage. This linear programming step is similar to item 1002 in FIG. 10 of U.S. Pat. No. 6,701,201. The method of the present invention uses all methods described for item 1002 in U.S. Pat. No. 6,701,201. However, the method of the present invention adds an additional step. The LP in item 1002 of U.S. Pat. No. 6,701,201 addresses use of a solution to determine production starts and shipments corresponding to demands where demands have only one due date. This, however, does not instruct in what to do if each demand can have multiple independent due dates and priorities. The present method resolves this by allowing user input to provide the method with a driver date as shown by item 406. The LP of the present invention will provide a solution based on this driver date. This will generate production starts with only a single date, but a subsequent step described below will then calculate additional start dates and priorities to associate with the calculated starts that will be in synchronization with the multiple dates and priorities that were input in the original demands. The driver date to be selected by the user is generally the date that the business deems important by their business process. For example, if each demand into the process had two dates representing correspondingly the original request date of a customer and the commit date given a customer, the business may deem that it is more critical to meets customer commit dates than attempt to make customer request dates. In that case, the business would likely choose the customer commit date to be used as the driver date for start calculation purposes in this step of the method. At the end of this step, the LP will have produced, among other outputs, production starts at the bottom of the stage corresponding to the driver dates associated with the demands that were input to the process. This corresponds to the end of the process before item 4a is invoked in FIG. 3.

Figure 5:
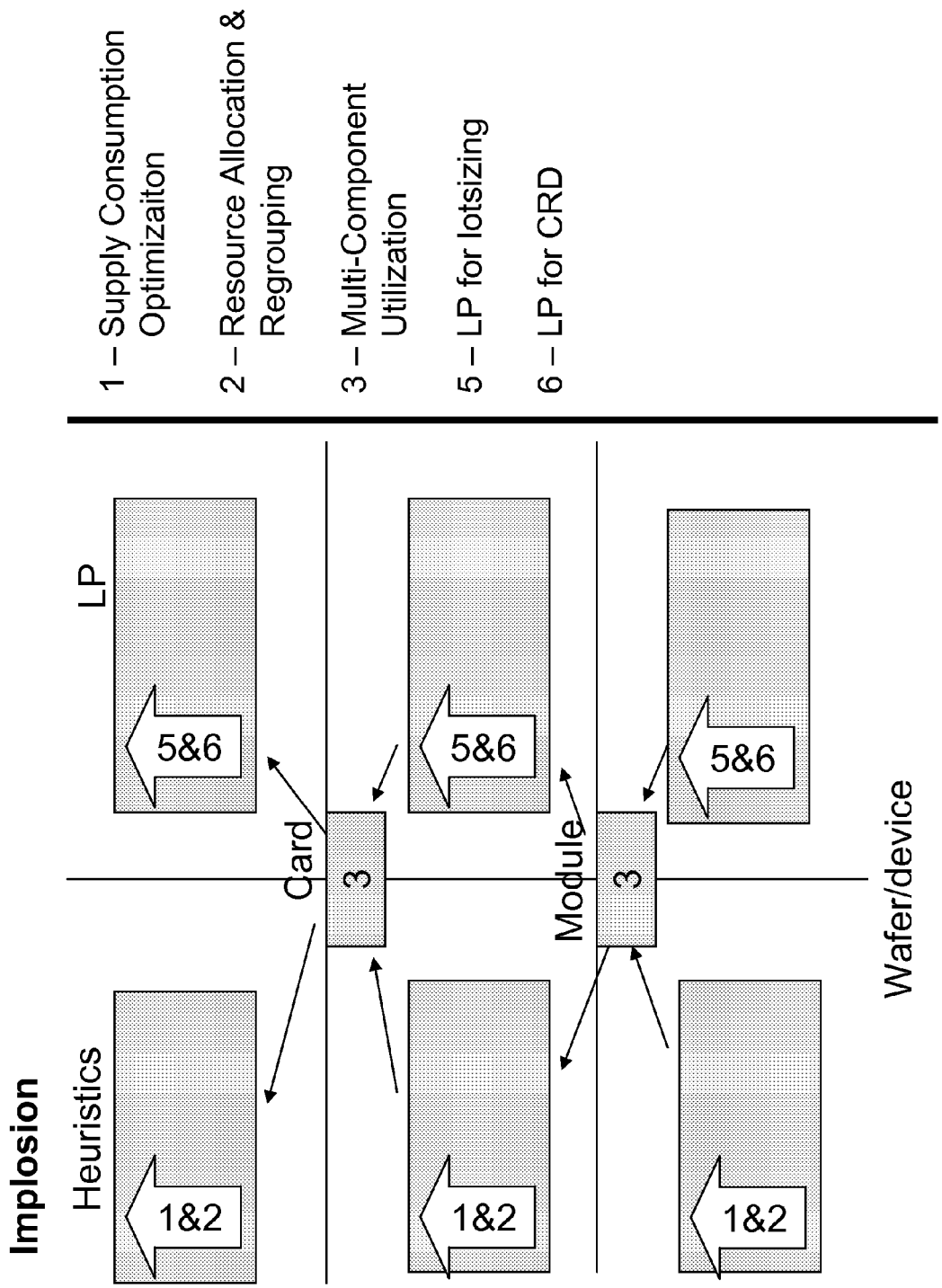
FIG. 5 is a schematic diagram showing an implosion process.

In function block 403, a determination is made as to whether the final stage of explosion processing has completed. As shown in FIG. 3, this is the case when processing of the wafer/device stage has completed. In this case, the implosion portion of the method as illustrated in FIG. 5 will begin. If remaining stages need to be processed in the explosion portion of the method, further preparation is required. This preparation is accomplished by performing pegging calculations in function block 404 and a one-level-explosion in function block 405.

Figure 11:
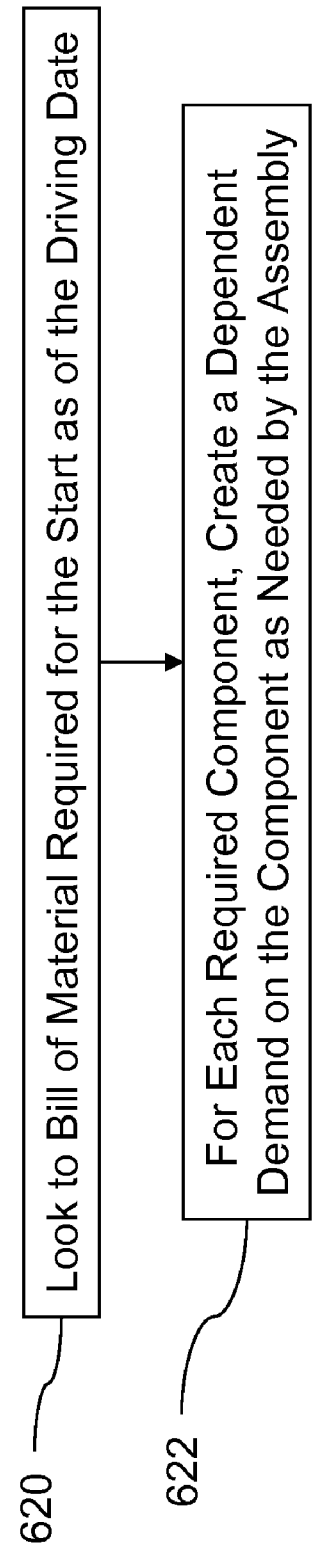
FIG. 11 is a flow diagram illustrating a method to calculate and carry multiple due dates and priorities for components required to build assemblies.

As referenced in step 4a of FIG. 3, after completion of the linear programming step of the explosion process, an additional step is used to add additional information to the starts so calculated at the bottom of the bill of material for the stage. In particular, the production starts will be updated by the method of this invention to reflect the multitude of dates and associated priorities each start must have as needed to reflect the multitude of dates and priorities whose demands will ultimately be satisfied by such starts. This is accomplished in function block 404 where a pegging calculation is performed to pass demand attribute information from the top to the bottom of the stage's bills of materials for the LP partition considering multiple dates and associated priorities. The method to do so employs an extension to the method described in U.S. Pat. No. 6,701,201. U.S. Pat. No. 6,701,201 function block 1004 describes how such a pegging calculation is performed to pass demand attribute information. FIG. 11 of U.S. Pat. No. 6,701,201 and its associated description further elucidates steps in that process. However, U.S. Pat. No. 6,701,201 does not address pegging information where multiple dates and associated priorities are associated with the exit demand.

The method of the present invention builds on the method of the previous patent and extends it so that starts so outputted by the method are associated with multiple priorities and dates consistent with the exit demand. In particular, the method described in U.S. Pat. No. 6,701,201 is extended to read and understand demand input with multiple demand dates and priorities 410, subtract cycle time from multiple independent demand dates to determine multiple start dates associated with each production start along with their appropriate priorities 412, explode this information from one level of bill of material to another 414, and finally handle the difficulty imposed in doing so by processes that have binning and substitution to obtain a minimum stock quantity and multiple due dates and priorities for the component parts 416. These extensions are analogous to extensions that are required of an MRP that is capable of calculating manufacturing releases having multiple start dates and associated priorities from demands with multiple independent due dates and priorities. Methods to accomplish each of the above required extensions are described in detail in FIGS. 7-13 below. This present invention uses the methods of FIGS. 7-13 to extend the method of U.S. Pat. No. 6,701,201 so that the function of block 404 passes appropriate information level to level and through binning points so that each start at the bottom of the stage has multiple start dates and priorities as necessary to support demands having multiple due dates and priorities.

In function block 405, the manufacturing releases at the bottom of the bills of materials in the current stage are exploded to create dependent demand for parts at the top of the BOM in the next (lower level) manufacturing stage. The manufacturing releases from both the Heuristic and LP partitions are combined and then exploded to downstream partitions. The method to do so employs an extension to the method described in item 1005 of U.S. Pat. No. 6,701,201. U.S. Pat. No. 6,701,201 function block 1005 describes a method where components required for manufacturing releases in a stage are calculated and are created to resemble independent demand on subsequent manufacturing stages. However, U.S. Pat. No. 6,701,201 covers neither lotsizing nor the ability to have multiple start dates assigned to a start each with different priorities. In addition, embodiments herein can include a one-level-explosion that is based off a "driver date" (which value is typically different than the driver date of 406). Thus, block 417 on FIG. 4 contains "User Input for one-level-explosion's driver date.

The method of this invention adds additional steps to group the production starts prior to the explosion process and to pass multiple dates and priorities from the production starts to the component demands used by subsequent stages. In particular, the present invention considers lotsizing when exploding demand to the next stage so that the next stage receives enough demand to be able to build to any minimum size required of the lotsizing rules. This corresponds to step 2a shown in FIG. 3. For example, if minimum lotsize requirements for an item were 100 pieces, the method should not pass back a requirement for, say, 30 pieces to the next stage. Nothing less than a lot of 100 pieces can be built and the next stage needs to process based on that understanding. The present invention gathers the planned manufacturing production starts for items at the bottom of the bill of material in the current manufacturing stage. By nature of the preceding steps, the manufacturing production starts will have a multitude of start dates and corresponding priorities associated with them. In order to perform required grouping of starts, the method relies on the lotsizing described in FIGS. 7-13, discussed below. The details described in FIGS. 7-13 show how lotsizing can be done to a driver date and how the resultant can be used to explode to downstream processes.

The present invention allows user input to control the driver date chosen specific to this step. This driver date is chosen by the business as the date it wants to attempt to drive downstream processes to build to given available supply. For example, take the case where a given production start can have two dates and associated priorities, the earliest date representing when the start must be made to meet customer request date and the later date representing the date the start must be made to meet commit dates given the customer. The business may determine that the date associated with the earlier customer request date should be used when lotsizing is performed to drive downstream processes to meet the earlier desired date if supply exists to make it possible. Finally, the present method extends the method of U.S. Pat. No. 6,701, 201 to create component demand for the next stages each containing a multitude of dates and priorities corresponding to the dates and priorities associated with the lotsized production starts. The present method employs the bill of material explosion methods explained in FIGS. 7-13 to perform this function. This corresponds to step 4b in FIG. 3. At the end of this step, component demands necessary to support the starts needed by the present stage will be calculated and the method can proceed to function block 401 of the next manufacturing stage.

Referring now to FIG. 5, the implosion process is performed by the method to determine feasible supply considering demands whose priorities vary by date given component and capacity availability. Proceeding from manufacturing stages lower in the bill of material, a supply is generated against demands input to the stage considering the demands have priorities that vary by due date. Supply from one manufacturing stage is then used as components available when considering demands at the next manufacturing stage upstream in the bill of material. More specifically, during the implosion process, the various components are combined together to produce the final product. The implosion combines component supplies to produce each part number in the supply chain, i.e., all intermediate parts, not just the final part number product. In the example shown in FIG. 5, the wafers are produced first, then they become devices which in turn are combined together to form modules and finally combined form the cards.

The implosion process of the method comprises a heuristic that for each manufacturing stage produces supply results considering demands whose priority varies by demand date. The heuristic incorporates a supply consumption optimization method as shown in item 1 of FIG. 5 and item 21 of FIG. 2. This method, discussed in greater detail below, accomplishes the task of assigning supply in an optimized manner to competing demands for the supply, such demands having priorities which vary by due date. The heuristic also incorporates a resource allocation and lotsizing method as shown in item 2 for FIG. 5 and item 23 of FIG. 2. This method, discussed in further detail below, performs the function of capacitating and lotsizing in a manner sensitive to starts whose priorities vary by start date.

In FIG. 5, item 5 represents the linear programming that is utilized for lot sizing and item 6 represents the linear programming that is utilized for customer requirement dates (CRD). One example of the methodology for determining appropriate lot sizes (item 5) is disclosed in copending U.S. patent application Ser. No. 10/605,854, which is incorporated herein by reference. An example of linear programming that is utilized for customer requirement dates (item 6) is disclosed in pending U.S. Patent Publication 2005/0171824, which is incorporated herein by reference.

The implosion process also comprises a multiple component utilization heuristic in items 3 and 22, in FIGS. 5 and 2, respectively, which transfers materials to support the multiple due dates and corresponding priorities, simultaneously considering supply of multiple components. Again, the details of such features are discussed below.

Figure 6:
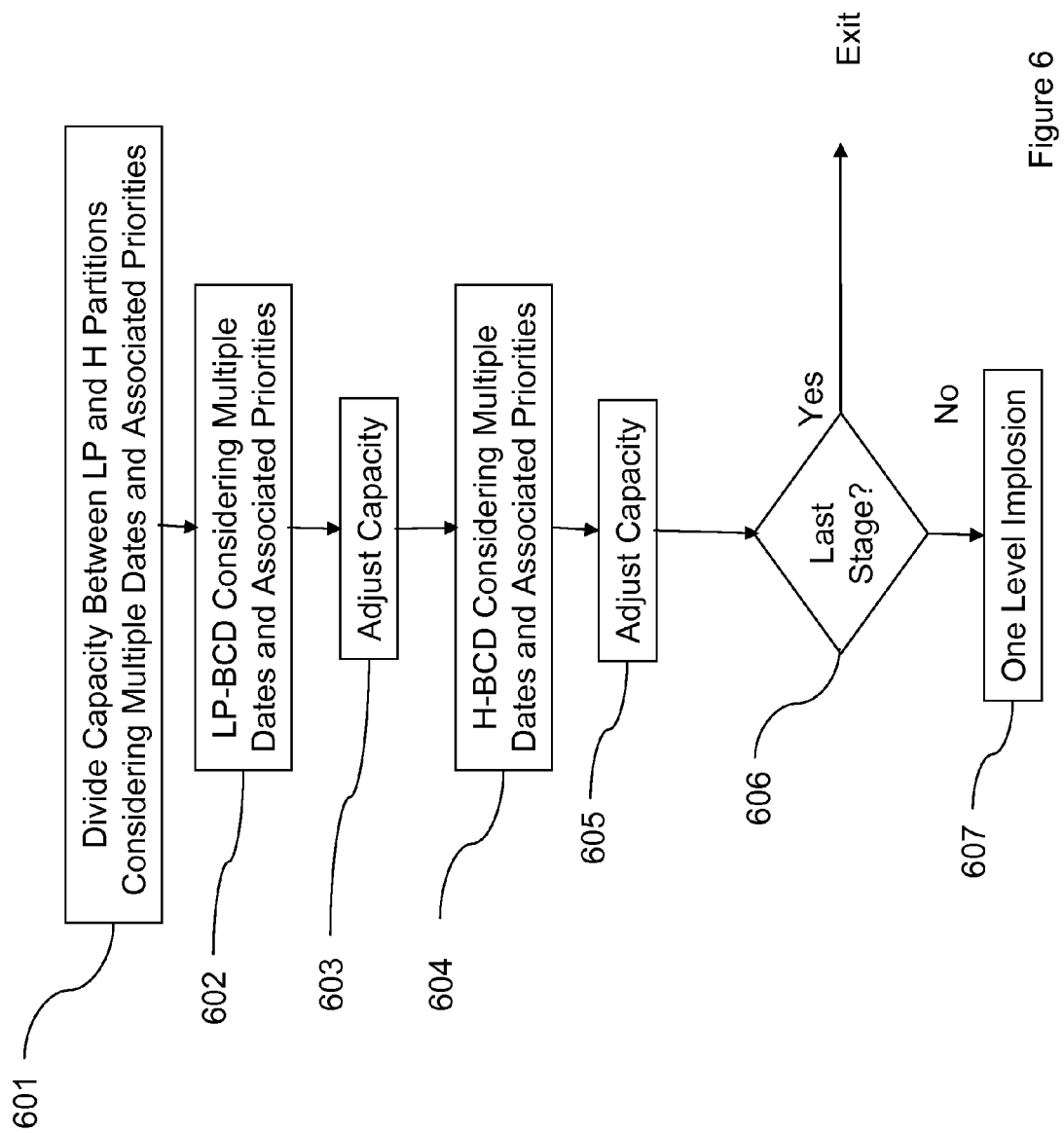
FIG. 6 is a flow diagram illustrating one embodiment of the invention relating to an implosion process.
Figure 7:
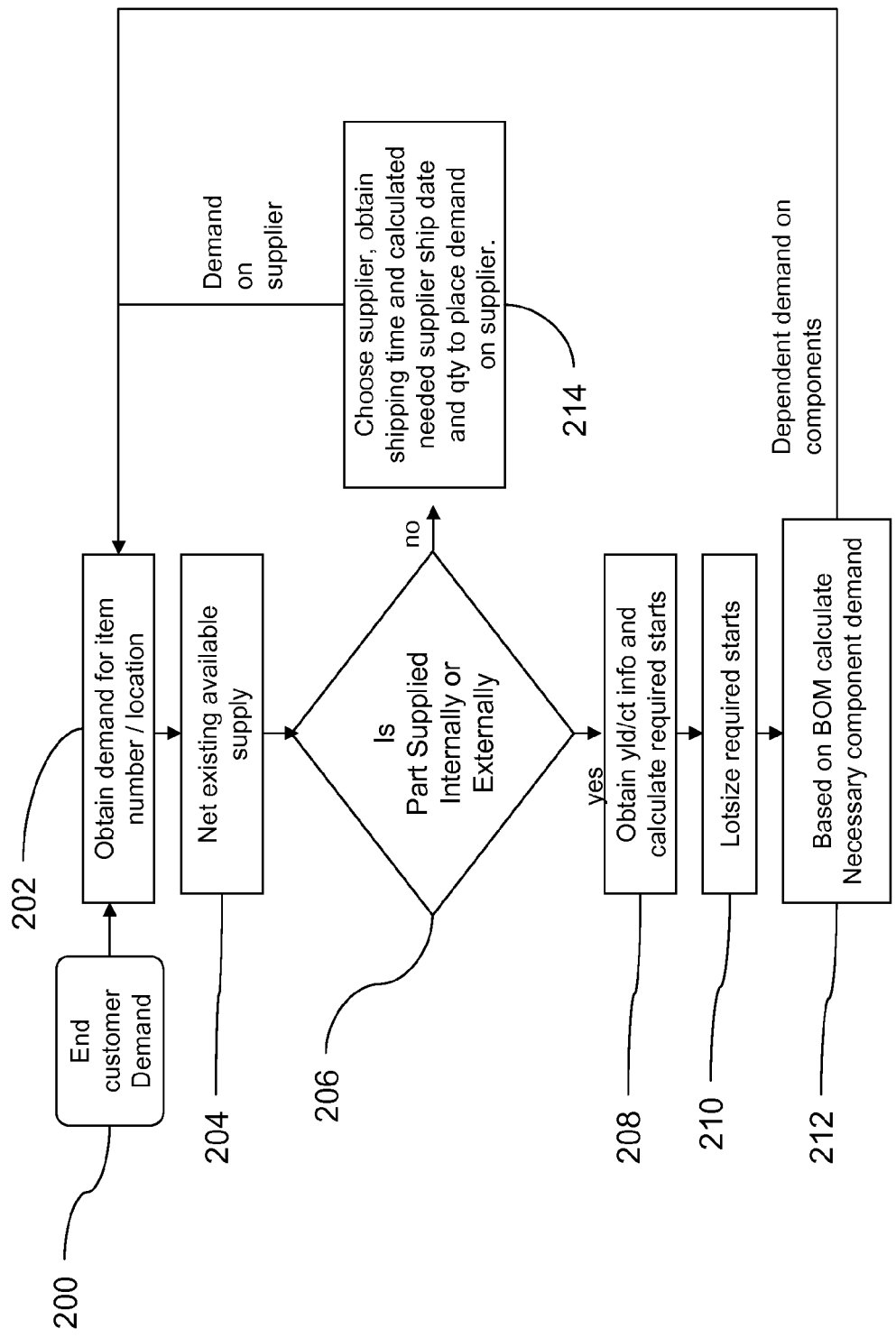
FIG. 7 is a flow diagram illustrating one method embodiment of the invention.

Shown in FIG. 6 is a flowchart implementing the implosion logic where either a Heuristic-Best-Can-Do (H-BCD) or an LP is run at each stage and the appropriate information is passed upwards between the stages. This figure is similar to FIG. 13 of U.S. Pat. No. 6,701,201 but the present invention combines new methods with old methods in novel ways to add the additional capabilities of lotsizing and consideration of multiple dates and priorities associated with demand; the details of which are discussed below. This logic occurs for each stage (for example, for the Card, Module, and Device stages).

In function block 601 of FIG. 6, the capacity is divided between that available for the LP partition and that available for the heuristics partition, given the plurality of dates and corresponding priorities associated with each of the desired production starts at the assembly stage. The present method uses but then extends the methods described in U.S. Pat. No. 6,701,201 item 1301 to divided capacity between the LP and heuristic partitions. The method of U.S. Pat. No. 6,701,201 does not address partitioning capacity based on needed starts when each given start may be associated with multiple start dates associated with multiple priorities. In partitioning available capacity between the LP partition and for the heuristic partition, the present method addresses the difficulty associated with the fact that a given planned manufacturing start has a plurality of dates associated with it. Therefore, the method decides when estimating when capacity will be consumed for a given start which of a plurality of dates should be used. The method does so by allowing user input to declare a driver date specific to this process. This generally will be the date that is considered most critical in making capacity priority decisions. As an example, if each manufacturing start was associated with a date to meet a desired customer request date and another date to meet a desired customer commit date, the business may choose the date to designate the desired commit date as the driver date since failure to supply to customers based on commitments made to them would be seen as a worse problem than failure to improve to customer request date. The method allows the business to choose the driver date based on desired business processes. Once chosen, the driver date is used as the basis for estimating when capacity consumption would occur for purposes of dividing capacity available between the LP and heuristic partitions. Given a chosen driver date, the present method uses starts associated with this date with the method of U.S. Pat. No. 6,701,201 to divide capacity between the partitions In function block 602 of FIG. 6 of the present invention, an LP is performed in the linear programming partition of the current stage, considering the plurality of dates and corresponding priorities associated with each of the desired production starts at the assembly stage. The results of this LP run will be feasible.

While having similar characteristics to the LP described in item 1302 of U.S. Pat. No. 6,701,201, the LP step in this invention uses an LP that is fundamentally enhanced beyond the description of the method of U.S. Pat. No. 6,701,201. In particular the LP used in block 1302 did not specify ability to lotsize nor did it address the ability to produce a build plan that best considered how to use available supply and capacity to satisfy demand considering demands whose priorities vary by date. The present method employs an LP with the above capabilities not addressed in U.S. Pat. No. 6,701,201. The LP employed by the present method has capability to turn off lotsizing and/or addressing demands with multiple dates/priorities based on user input. These capabilities are turned off in the explosion step discussed earlier as unnecessary to the process but are turned on in the implosion portion of the method. The method thus works by providing inputs to the linear programming method instructing it to turn on lotsizing functionality and functionality that allows it to optimally supply against demands having a multitude of dates and associated priorities during this step of the process. With lotsizing turned on, this method employs the methods described in pending patent application Ser. No. 10/605,854, "Lot-sizing Production starts in a Linear Program". In turning on function to support best supply of demands each consisting of multiple dates and associated priorities, this method employs the methods described in U.S. Patent Publication 2005/0171824 entitled "Method for simultaneously considering customer commit dates and customer request dates" the complete application of which is incorporated herein by reference. Employment of this additional functionality within the LP in this step of the invention is shown as items 5 and 6 in FIG. 5.

At this point, the LP will have provided a best can do supply to fit demand considering the multiple priorities which vary by due dates for that particular stage.

In function block 603, the capacity required to support the manufacturing releases generated by the LP in function block 602 (given the plurality of dates and corresponding priorities associated with each of the desired production starts at the assembly stage) is calculated. These capacity requirements are subtracted from the total capacity available and provided as a new capacity available file for the heuristic to use in function block 604.

In function block 604, the Heuristic Best-Can-Do (H-BCD) is performed for the current manufacturing stage. Similarly to block 602, the heuristic implode step also considers lotsizing, capacitating, and multiple dates and priorities associated with demands. U.S. Pat. No. 6,701,201 function block 1304 describes a function where a heuristic Best Can Do operates to create a build plan considering capacity. However, the function block in 1304 does not address lotsizing nor does it address capacitating when capacitating needs to be prioritized considering multiple dates and priorities associated with a start. Neither does it address the need to optimally use planned supply against competing demands for the supply when such demands are associated with multiple dates having multiple priorities. The present invention creates methods to appropriately handle each of these needs. To do this, the present invention employs the methods discussed below.

More specifically, for lotsizing and capacitating considering multiple start dates and priorities, this invention employs the methods for resource allocation and re-grouping recognizing competing priorities which vary by date employing the methods described in FIGS. 14-22, discussed below. This results in an appropriate conversion of unlotsized and uncapacitated planned manufacturing production starts to lotsized and capacitated planned manufacturing production starts such that their creation appropriately responded to the plurality of dates and priorities associated with the original production starts. For appropriately utilizing supply against competing demand associated with multiple demand dates and priorities, this invention employs the methods described in FIGS. 23-27, discussed below. At the end of function block 604, the heuristics will have generated supply considering demands whose priorities vary by due date.

The manufacturing releases generated by the H-BCD are then used in function block 605 to calculate the capacity required to support those manufacturing releases. These capacity requirements will then be subtracted from the remaining available capacity so that any subsequent stages will, preferably, have only that remaining capacity available for their processing.

In function block 606, a determination is made as to whether the final (topmost) stage of implosion processing has been performed. If so, then the implosion activities implied are completed. If not, then there are remaining stages to implode and preparations are made for those other stages. These preparations are made by performing a "one level implosion" calculation in function block 607.

The one level implosion of function block 607 first takes the customer shipment files of the LP and Heuristic partitions at the current stage and consolidates them into a single customer shipment file. This file may be thought of as component supply useable for assembling at the next (higher level) stage. This component supply is then allocated to manufacturing releases for the next stage assembly. The resulting feasible assembly manufacturing releases are then reformatted for the next level stage heuristic partition as fixed manufacturing releases and are fed to the next level stage LP partition as receipts associated with a dummy PN which is inserted into the BOMs for the next stage as a sole component of the original assembly PN. This is performed because the H-BCD, processing one PN at a time, cannot do any better in determining the release schedule than the one level implosion; the LP, however, may simultaneously consider multiple bills of materials levels of PNs and thus may want to re-optimize slightly differently than that done by the one level implosion. For more details on the logic of one level implosion, see U.S. application Ser. No. 09/891,850 assigned to the common assignee and incorporated herein by reference in their entirety. The above application, however, does not address assigning component supply to be used in assemblies at the next stage considering such assemblies have priorities which vary by date. This present invention thus extends the methods of the previous invention by employing the methods discussed with respect to FIGS. 23-27, to utilize components available at the end of the current stage in a manner that best considers the multitude of dates and priorities associated with the desired assembly starts.

With respect to the materials requirement planning that is briefly mentioned above in items 4, 4a, 4b, and 24, FIGS. 7-13 discuss the materials requirement planning in greater detail. One embodiment of the invention is shown in flowchart form in FIG. 7. In item 200, end customer demand is fed as input into the MRP. In item 202, the MRP obtains demand employing a method which understands that each demand will be associated with a plurality of due dates and corresponding priorities. Thus, in item 200, there is presented a method to obtain demands, each of which is associated with a plurality of due dates and priorities. In this method, MRP processing proceeds with the understanding that any demand can be associated with a plurality of due dates and associated priorities. Any systems supporting this method allow for reading and storing the multiplicity of due dates and priorities as required by this invention.

In item 204, the MRP nets available supply against the demand. The following processing is performed assuming that not enough supply exists to cover the demand. In item 206, the method determines if the item is to be supplied internally or externally. Internally means, the same plant will make the part. Externally means the part will be supplied from another plant. If the part is built internally, processing proceeds to item 208 in which the method obtains corresponding yields and cycle times and determines when (and the quantity of) manufacturing production starts that must be built to cover the corresponding demand. In item 208, the method associates a plurality of start dates and associated priorities with each calculated production start corresponding to the plurality of due dates and associated priorities of the demands that are covered by the production start. Item 208 is explained in greater detail with respect to the discussion of FIG. 8, below.

In item 210, the method adjusts the sizes of the production lots (e.g., lotsizes the calculated production starts) by combining/splitting them into quantities for best manufacturing efficiency. The method ensures that the lotsize process considers and appropriately preserves the plurality of dates and priorities which must be passed to downstream processes. This is explained in greater detail below in the discussion of FIG. 10.

Figure 12:
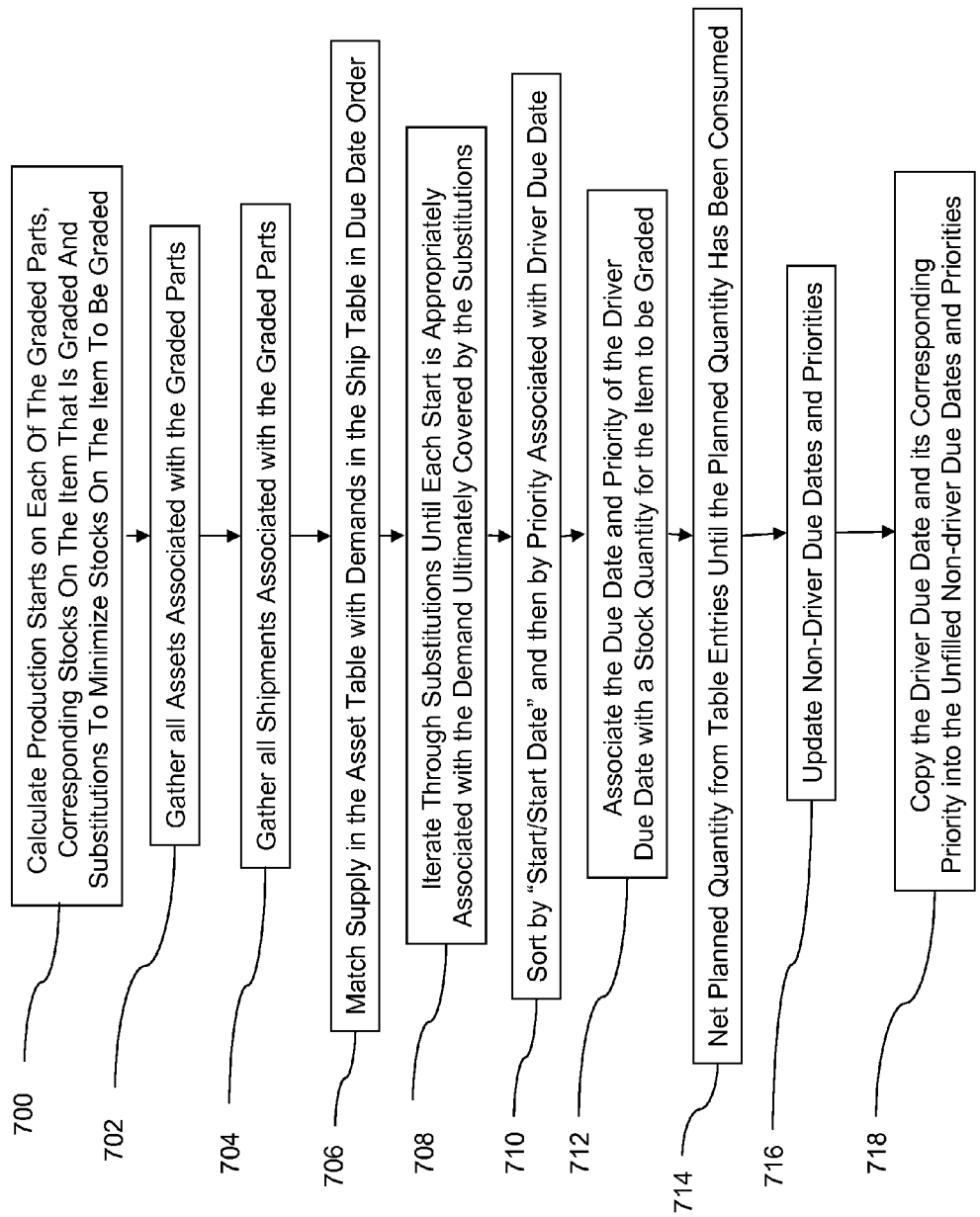
FIG. 12 is a flow diagram illustrating is a method to calculate and carry multiple due dates and priorities for production that is binned or where substitutions can occur.

In item 212, if the calculated production start requires components in order to build it, the method calculates dependent demand to drive the supply of those components. This dependent demand ultimately is returned to the MRP for further processing. In item 212, the method passes multiple due dates and priorities on to the component demands corresponding to the plurality of start dates and priorities associated with the start. This is explained more fully in FIGS. 11 and 12 below. FIG. 12 covers the especially challenging case where binning and substitution take place.

In item 214, if the part is built externally, the method chooses a supplier, finds the shipping time between the supplier and the receiver, calculates when and how much the supplier must supply, and places this demand onto the MRP for processing in a subsequent iteration. In item 214, the method passes a demand with a plurality of due dates and associated priorities corresponding to netted demands to the supplier. The processing in item 214 is shown in FIG. 9 and discussed below. Furthermore, it may be desirable that the shipments from suppliers be lotsized, as explained in the discussion of FIG. 10.

Figure 10:
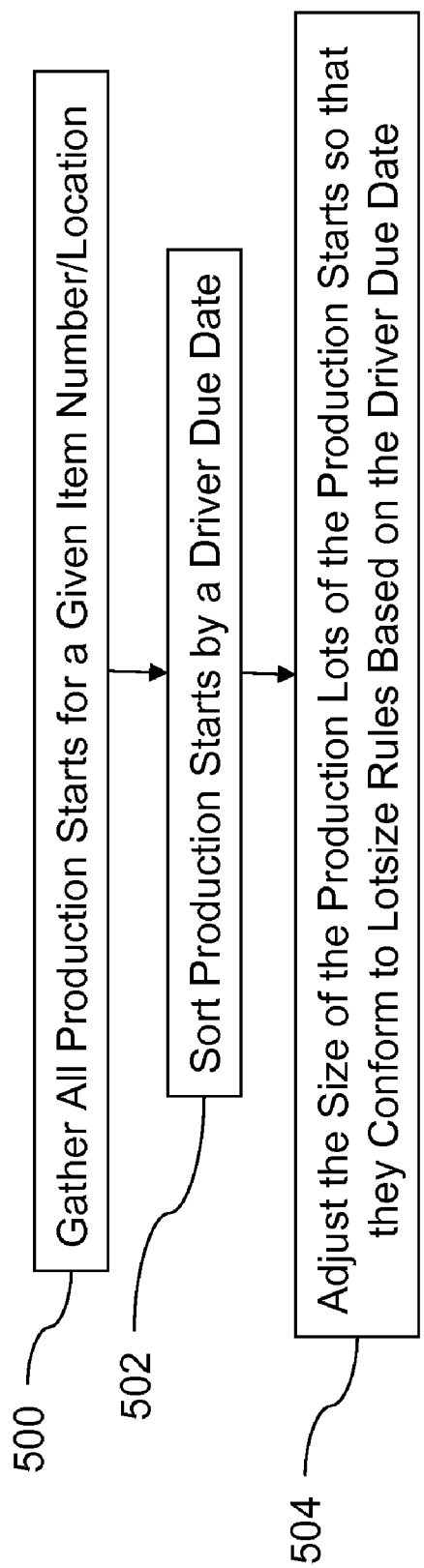
FIG. 10 is a flow diagram illustrating a method to calculate and carry multiple due dates and priorities through points in the manufacturing line.
Figure 13:
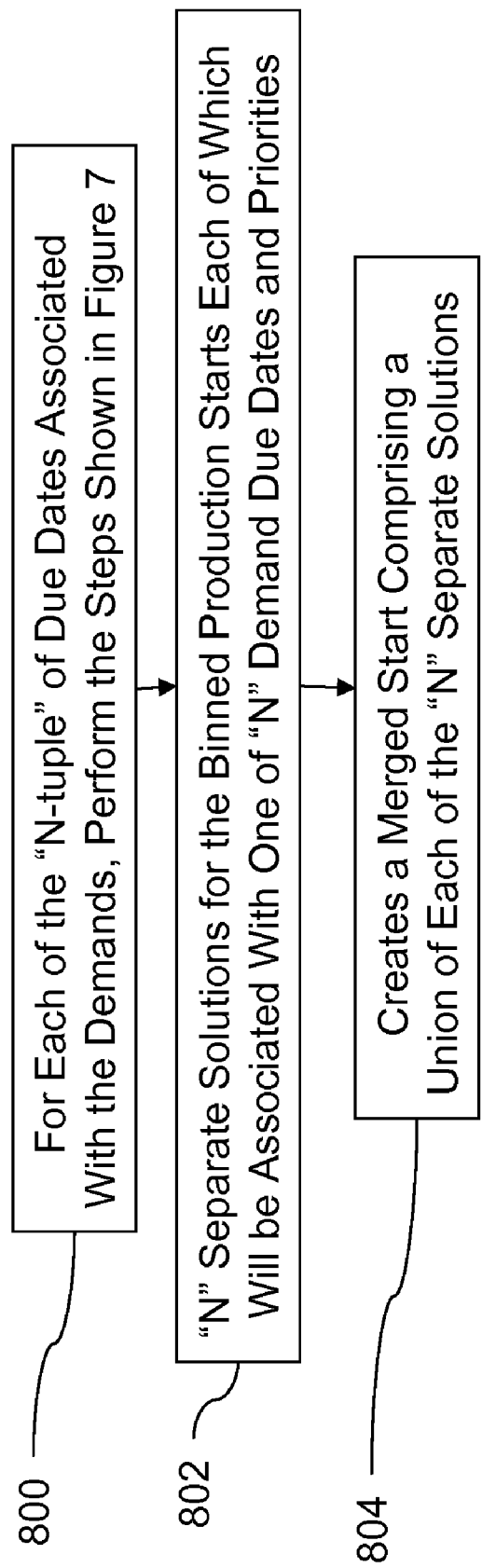
FIG. 13 is a flow diagram illustrating one embodiment of the invention.

Thus, FIGS. 8-13 below illustrate the following aspects of the invention. FIG. 8 illustrates a method to calculate required manufacturing production starts such that planned production starts carry multiple due dates and priorities; FIG. 9 discloses a method to calculate shipments between locations such that planned shipments carry multiple due dates and priorities; Shown in FIG. 10 is a method to calculate and carry multiple due dates and priorities through points in the manufacturing line which have a lotsizing process where required production starts to support exit demand can be combined or broken up to fit lotsizing requirements. FIG. 11 demonstrates a method to calculate and carry multiple due dates and priorities for component demands required to build assemblies each having multiple due dates and priorities. In FIG. 12, illustrated is a method to calculate and carry multiple due dates and priorities through binning points where, in addition to a test and grading process, substitutions where one item number can be used in place of another can take place. FIG. 13 illustrates a method to calculate production starts on a binned part without the assumption of a driving date. While the present disclosure illustrates how each of the foregoing is used in a specific combination, each process/method stands on its own and any combination of such elements or one, some, or all can be used to achieve any specific desired goal.

Each of the methods disclosed below concerns itself with appropriately calculating MRP planning data throughout the supply chain when multiple due dates and priorities are associated with demand or stock quantities. Many of the methods make use of the fact that one of the set of due dates can be chosen as a "driving" date. For most business applications, this will usually be the due date associated with the most important priority although the methods do not preclude other methods being used for choosing a driving date. The driving date is the due date that is considered the most critical due date that has to be met in terms of driving the path of supply that must be built to supply demand. In the methods below, where use of differing due dates would cause alternate planning paths and parameters to be chosen when creating the Materials Requirements Plan, the methods choose to use the paths associated with the driving date as the due date chosen to be the most important due date of the plurality of due dates associated with a particular demand or stock quantity.

Thus, FIG. 8 illustrates a method to calculate required manufacturing production starts such that planned production starts carry multiple due dates and priorities. Traditional MRPs calculate a required manufacturing start date by obtaining a given required stock date and offsetting the stock date by cycle time to calculate the corresponding required start date. This method extends this traditional MRP method by allowing for the required stock to be associated with multiple due dates with multiple priorities. For each required stock and for each stock date and associated priority associated with the stock, the method obtains cycle time to be applied based on the specific stock date being processed in item 300 (a driving date is not required for this process) and, in item 302 calculates the corresponding required start date corresponding to the priority by offsetting the required stock day by the cycle time found in item 300. After looping through each due date and priority associated with the required stock, the method creates a corresponding start with a multitude of start dates and priorities corresponding in a 1 to 1 manner with the multitude of stock dates and priorities of the required stock.

FIG. 9 illustrates a method to calculate shipments between locations such that planned shipments carry multiple due dates and priorities and providing corresponding multiple shipping dates with associated priorities. Satisfying end customer demands often requires transfer of either end item or component parts from one plant to another in the supply chain. A traditional MRP calculates shipments which need to be received from a supply plant to satisfy demands on the item at the receiving location. In this method, the traditional MRP calculation are extended by associating the calculated planned shipment with multiple ship dates and priorities to multiple demand due dates and priorities associated with the demands on the receiving plant.

More specifically, as with conventional MRP processing, it is assumed that there is an unsatisfied demand on an item in the receiving location which needs to be satisfied through a shipment from a supplying plant. For this method, in item 420, it is assumed that one demand on the receiving plant will be covered by one shipment from the supplying plant. The case where one shipment can cover one or more demands or conversely one demand can be covered by one or more shipments is covered in the method shown in FIG. 10, which is discussed below. In item 424, the driving date (discussed earlier) is used when determining which supplying plant to use between receiving and supplying location. In item 426, for each demand due date and priority associated with the demand to be covered by the shipment from the supplying location, the method calculates a required arrival due date and required ship date of the shipment for that demand due date and priority. Item 426 results in multiple due dates and priorities being associated with a single shipment corresponding to the multiple due dates and priorities associated with the demand the shipment is supplying.

FIG. 10 illustrates a method to calculate and carry multiple due dates and priorities through points in the manufacturing line which have a lotsizing process where required production starts to support exit demand can be combined or broken up to fit lotsizing requirements. In many points in the manufacturing line, product can be lotsized. For example, manufacturing production starts and shipments can both be lotsized. Lotsizing means combining or splitting required production starts or shipments to conform to given rules designed for manufacturing efficiency. For example, product may be manufactured or shipped with restrictions on minimum quantity or maximum quantity per lot. Some industries may have product where lots must be in multiples of a given quantity. Traditional MRP provides methods for either combining or splitting non-lotsized production starts or shipments to create a valid lot conforming to lotsize rules associated with one due date and quantity. Such combining or splitting methods require processing production starts or shipments of a given item in start date or ship date order, respectively. Traditional MRP does not address how to handle lotsizing when the resultants must combine entities which have a multitude of due dates and corresponding priorities associated with them. This method goes beyond traditional MRP logic to carry multiple due dates and associated priorities through the combining and splitting that takes place in the lotsizing process.

For purposes of illustrating the inventive method, the following example refers to lotsizing manufacturing production starts below. However, as would be understood by one ordinarily skilled in the art, the method can equally be applied to all other MRP subjects, such as planned shipments between locations, etc. The method proceeds by performing the items shown in FIG. 10. In item 500, the method gathers all production starts for a given item number/location and, in item 502, sorts the production starts by a driver due date. In item 504, the method adjusts the size of the production lots (e.g., lotsizes the production starts) so that they conform to lotsize rules based on the driver due date using any acceptable lotsizing method known to the art. The method expands on conventional methodologies by calculating and carrying forward sub-elements of the lot associated with all of the due dates and priorities. The method is illustrated by the simple example below which is used only as an example to demonstrate the method where two due dates and priorities are associated with each start.

| | Original unlotsized production starts | | | |
|---|---|---|---|---|
| Quantity | Due date 1 | Priority 1 | Due date 2 | Priority 2 |
| 33 | 02/01 | 1 | 01/12 | 2 |
| 26 | 02/02 | 1 | 01/15 | 2 |
| 52 | 02/10 | 1 | 02/01 | 3 |
| 34 | 02/15 | 1 | 02/15 | 4 |

In this example, the method uses lotsize rules where production starts must be >=25, <=50 and in multiples of 25. Due date 1 represents the driver due date. The goal of the lotsizing method in this case is to combine quantities from the above table to create lots as close to 50 without going over. Production starts of 25 are permissible if production starts remaining to be combined have quantities <=25. The particular lotsizing methodology is unimportant. One benefit of the present method is the ability to apply lotsizing while preserving the original multiple start dates and priorities in the results. The following describes the steps for this.

Step 1.) If no unlotsized production starts remain, quit the process. Otherwise, proceed through remaining unlotsized production starts adding rows of production starts together until either the maximum is equaled or exceeded or no more production starts remain. If the maximum is achieved or exceeded, create a lotsized release of maximum keeping track of the individual rows which were used in creating the combined lot. If maximum is not reached, create a lot of the least size which respects minimum and multiple rules. Net the quantity of the lotsized release from the rows in the original unlotsized table. Associate a priority to the lotsized release created consisting of the highest priority associated with the driver due date from the rows used to create the lot. Similarly, associate a start date with the lot consisting of the earliest due date associated with the driver due date from the rows used to create the lot.

In this case, the method proceeds through rows 1 and 2. Adding the production starts of 33 and 26 together, the method gets 59 which exceeds the maximum of 50. The method creates a lotsized release of the maximum quantity following the rules of step 1 leaving the following:

| Lotsized releases (all associated with same Lot # represent sub-elements of same lot.) | | | | | | | |
|---|---|---|---|---|---|---|---|
| Lot Priority | Lot Due date | Lot # | Sub # | Sub Qnty | Due date 1 | Priority 1 | Due date 2 | Priority 2 |
| 1 | 02/01 | 1 | 1 | 33 | 02/01 | 1 | 01/12 | 2 |
|  |  |  | 2 | 17 | 02/02 | 1 | 01/15 | 2 |

Remaining unlotsized releases are as follows after netting of the lotsized release:

| Original unlotsized production starts | | | | |
|---|---|---|---|---|
| Quantity | Due date 1 | Priority 1 | Due date 2 | Priority 2 |
| 0 | 02/01 | 1 | 01/12 | 2 |
| 9 | 02/02 | 1 | 01/15 | 2 |
| 52 | 02/10 | 1 | 02/01 | 3 |
| 34 | 02/15 | 1 | 02/15 | 4 |

The method repeats step 1. In this case the method applies the method to rows 2 and 3 where production starts 9+52=61 exceed maximum. Applying the method as before the method gets:

| Lotsized releases (all associated with same Lot # represent sub-elements of same lot.) | | | | | | | |
|---|---|---|---|---|---|---|---|
| Lot Priority | Lot Due date | Lot # | Sub # | Sub Qnty | Due date 1 | Priority 1 | Due date 2 | Priority 2 |
| 1 | 02/01 | 1 | 1 | 33 | 02/01 | 1 | 01/12 | 2 |
|  |  |  | 2 | 17 | 02/02 | 1 | 01/15 | 2 |
| 1 | 02/02 | 2 | 1 | 9 | 02/02 | 1 | 01/15 | 2 |
|  |  |  | 2 | 41 | 02/10 | 1 | 02/01 | 3 |

Remaining unlotsized releases are as follows after netting of the lotsized release:

| Original unlotsized production starts | | | | |
|---|---|---|---|---|
| Quantity | Due date 1 | Priority 1 | Due date 2 | Priority 2 |
| 0 | 02/01 | 1 | 01/12 | 2 |
| 0 | 02/02 | 1 | 01/15 | 2 |
| 11 | 02/10 | 1 | 02/01 | 3 |
| 34 | 02/15 | 1 | 02/15 | 4 |

The method again repeats step 1. Proceeding through rows 3 and 4 the method combines production starts of 11+34=45 and then must stop as more unlotsized production starts exist. The method creates a lotsized release of 50 as it is the smallest start>=45 which conforms to the minimum and multiple rule. As the method must build 50 to satisfy lotsize but only 45 are necessary, the method creates a row in the lotsized release table associated with the lot for 5 pieces with a flag that these pieces are unneeded except for lotsizing purposes. The method then obtains the following results:

| Lotsized releases (all associated with same Lot # represent sub-elements of same lot.) | | | | | | | |
|---|---|---|---|---|---|---|---|
| Lot Priority | Lot Due date | Lot # | Sub # | Sub Qnty | Due date 1 | Priority 1 | Due date 2 | Priority 2 |
| 1 | 02/01 | 1 | 1 | 33 | 02/01 | 1 | 01/12 | 2 |
|  |  |  | 2 | 17 | 02/02 | 1 | 01/15 | 2 |
| 1 | 02/02 | 2 | 1 | 9 | 02/02 | 1 | 01/15 | 2 |
|  |  |  | 2 | 41 | 02/10 | 1 | 02/01 | 3 |
| 1 | 02/10 | 3 | 1 | 11 | 02/10 | 1 | 02/01 | 3 |
|  |  |  | 2 | 34 | 02/15 | 1 | 02/15 | 4 |
|  |  |  | 3 | 5 | unneeded |  | unneeded |  |

Remaining unlotsized releases are as follows after netting of the lotsized release:

| Original unlotsized production starts | | | | |
|---|---|---|---|---|
| Quantity | Due date 1 | Priority 1 | Due date 2 | Priority 2 |
| 0 | 02/01 | 1 | 01/12 | 2 |
| 0 | 02/02 | 1 | 01/15 | 2 |
| 0 | 02/10 | 1 | 02/01 | 3 |
| 0 | 02/15 | 1 | 02/15 | 4 |

The method again repeats step 1. As there are no more remaining unlotsized production starts, the process stops. Therefore, in this example the final output of step 1 is:

| Lotsized releases (all associated with same Lot # represent sub-elements of same lot.) | | | | | | | |
|---|---|---|---|---|---|---|---|
| Lot Priority | Lot Due date | Lot # | Sub # | Sub Qnty | Due date 1 | Priority 1 | Due date 2 | Priority 2 |
| 1 | 02/01 | 1 | 1 | 33 | 02/01 | 1 | 01/12 | 2 |
|  |  |  | 2 | 17 | 02/02 | 1 | 01/15 | 2 |
| 1 | 02/02 | 2 | 1 | 9 | 02/02 | 1 | 01/15 | 2 |
|  |  |  | 2 | 41 | 02/10 | 1 | 02/01 | 3 |
| 1 | 02/10 | 3 | 1 | 11 | 02/10 | 1 | 02/01 | 3 |
|  |  |  | 2 | 34 | 02/15 | 1 | 02/15 | 4 |
|  |  |  | 3 | 5 | unneeded |  | unneeded |  |

Thus, the step 1 process lotsizes production starts and creates a lot start date and lot priority for a lot while retaining all of the individual multiple start dates and priorities associated with a lot. The quantity associated with a lot is the sum of all sub-quantities associated with the same lotnumber. At this point in the method, reporting is possible identifying the sub-quantities with corresponding priorities and due dates that make up the lot.

Step 2.) There is one more step that is performed in this process. The method demonstrated so far has taken production starts input where production starts are associated with 2 due dates and priorities and ended up with production starts which are associated with 3 due dates and priorities, the extra due date being for the due date and priority associated with the lot itself in addition to what is in its sub-components. In general if the input production starts had n-tuple due dates associated with it, the method so far would have created production starts with (n+1)-tuple due dates. Although, this (n+1)-tuple information may be useful for reporting purposes, the present lotsize process must finally produce production starts with the same number of n-tuples of due dates as its inputs as this will be expected by downstream MRP processes. The final process in the method thus converts the results of lotsizing back to production starts with the correct n-tuples of due dates which can be subsequently processed correctly by downstream MRP processes. The present lotsizing process required that one of the due dates in the n-tuple be identified as a driver due date. (In the present example, the driver due dates were the due dates under the Due date 1 column.) As the present process drove lotsizing to group correctly to the driver due dates, the method now creates lotsized production starts, each containing n-tuples of due dates, by substituting the lot due dates and priorities for the driver due date and priorities and eliminating any separate references to the lot due dates or priorities. Downstream MRP processes will thus drive to make shipments, components, downstream production starts for enough product to meet the lotsizing requirements of the driving date. Using the output from the present example for the previous step, by applying this final process, the method obtains the following.

Change driver due date Due date 1 due dates and priorities to match the lot due date and priorities:

| Lotsized releases after conversion of driving date and priority to lot due date and priority. Lot information can be ignored from this point on in downstream MRP processes. | | | | | | | | |
|---|---|---|---|---|---|---|---|---|
| Lot Priority | Lot Due date | Lot # | Lot Sub # | Sub Qnty | Due date 1 | Priority 1 | Due date 2 | Priority 2 |
| 1 | 02/01 | 1 | 1 | 33 | 02/01 | 1 | 01/12 | 2 |
|  |  |  | 2 | 17 | 02/01 | 1 | 01/15 | 2 |
| 1 | 02/02 | 2 | 1 | 9 | 02/02 | 1 | 01/15 | 2 |
|  |  |  | 2 | 41 | 02/02 | 1 | 02/01 | 3 |
| 1 | 02/10 | 3 | 1 | 11 | 02/10 | 1 | 02/01 | 3 |
|  |  |  | 2 | 34 | 02/10 | 1 | 02/15 | 4 |
|  |  |  | 3 | 5 | 02/10 | 1 |  | unneeded |

Final lotsized results for downstream processing does not include separate lot information:

| Lotsized production starts from Due date 1 as driver due date perspective | | | | |
|---|---|---|---|---|
| Quantity | Due date 1 | Priority 1 | Due date 2 | Priority 2 |
| 33 | 02/01 | 1 | 01/12 | 2 |
| 17 | 02/01 | 1 | 01/15 | 2 |
| 9 | 02/02 | 1 | 01/15 | 2 |
| 41 | 02/02 | 1 | 02/01 | 3 |
| 11 | 02/10 | 1 | 02/01 | 3 |
| 34 | 02/10 | 1 | 02/15 | 4 |
| 5 | 02/10 | 1 |  | Unneeded |

Note that the output of this process contains sufficient information so that the same process can be applied to the output to lotsize to a different driving date. Should the method have needed to do so, the method could have taken the output of this process and using the same method re-lotsized to using due date 2 as the driving date. Hence, based on user rules, the method can be applied to lotsize based on one of the n-tuples of due dates or another due date or by repeated use of the method where the output of one iteration feeds another, the method can be used to simultaneously lotsize from the viewpoint of all of the n-tuples of due dates. At this point, the start information contains information to appropriately drive downstream MRP processes to provide enough material to meet lotsizing needs.

FIG. 11 demonstrates a method to calculate and carry multiple due dates and priorities for components required to build assemblies each having multiple due dates and priorities. Given a planned start for an assembly requiring components, this method will carry multiple start dates and priorities associated with the start to become multiple due dates and priorities associated with corresponding dependent demand on the components needed for the start. The method comprises, for each planned start, the following processes shown in FIG. 11. In item 620, the method looks for Bill of Material (BOM) required for the start as of the driving date. The driving date can be any due date the user picks but is usually the most critical due date. If lotsizing is employed and a single driving date is used in that process (see FIG. 10 above) it would normally be expected that the same driving date is used to obtain the bill of material.

In item 622, if the BOM shows components are required, for each required component, the method creates a dependent demand on the component as needed by the assembly. The method will place a corresponding demand due date and priority for each start date and priority associated with the assembly start in a 1 to 1 manner. The specifics of how to create a dependent demand due date on a component corresponding to an assembly start is well known in the art. This method differs from conventional methods because this method is applied to each of the multiple due dates and priorities associated with the assembly start. The result is a single component demand associated with multiple demand due dates and priorities corresponding to the multiple start dates and priorities associated with the corresponding assembly start. Note that the methods shown in FIG. 11 do not apply if the start is derived from a binning process. Instead, FIG. 12 below describes the method to follow if such is the case.

Again, FIG. 12 illustrates the method to calculate and carry multiple due dates and priorities through binning points where test and grading processes take place, additionally supporting substitutions where one item number can be used in place of another. In several industries, at certain points in the supply chain, items are tested and graded into different items depending on the results of the test. This process is often called binning or sorting. An example of such a process exists in the semi-conductor industry where a chip is tested and graded according to speed. Often times, the results of this binning process create items which can be substituted for one another. For example, in the semi-conductor industry a higher speed chip can often be substituted for a slower speed chip.

In a traditional MRP, the graded parts that are the results of the binning process have needed production starts consisting of a single due date and quantity and the MRP has to calculate the stock that has to be tested to support required graded production starts. This invention expands on this to provide a method to handle the much more complicated case where each of the graded production starts have multiple start dates and priorities associated with them and may in a user selectable manner be substituted for one another. This method calculates the correct multiple due dates and priorities to associate with the stock to be tested and graded so that the due dates and priorities associated with the stock are consistent with graded items which will consume the stock.

It should be noted that the stock quantity of a part that is to be graded may supply the needs of multiple n-tuples of demand due dates and priorities. The method therefore defines what are the "correct" demand due dates and priorities to be associated with a quantity that is to undergo a binning process. Take a simple example where there is only one due date field and one priority. Say 60% of PN1 becomes PN2 and 40% of PN1 becomes PN3 as a result of the binning process. Say the method builds 100 pieces of PN1 which becomes 60 pieces of PN2 which is used to cover a priority 1 demand and which becomes 40 pieces of PN3 which is used to cover a priority 2 demand. What is the priority to be associated with the 100 pieces of PN1? Mathematically, 100 pieces of PN1 are required to support the 60 piece priority 1 PN2 demand and the same 100 pieces of PN1 are required to support the 40 piece priority 2 PN3 demand. For MRP purposes, the method associates the 100 pieces of PN1 with the highest priority demand being covered. When multiple due dates and quantities are involved, the method requires that a driver due date and priority be selected. When a binned start covers multiple priorities associated with a driver due date, like the example above, the method will associate the highest priority with the item to be binned. For all other non-driver due dates and priorities that are being supplied by the quantity that is to be binned, when the quantity to be binned covers multiple due dates and priorities, the method will associate the quantity with the earliest corresponding due dates and highest priorities being supplied by the quantity to be binned.

The method is illustrated by a simple example showing a single start which bins into two other parts where the method does a single simple substitution. The method describes a process where item PN1 is tested and graded. Statistically, the method plans for 60% of PN1 being graded to become PN2 and 40% of PN1 being graded to become PN3. The example being illustrated allows item PN3 to substitute for item PN2.

Items PN2 and PN3 have the following demand due dates and corresponding priorities associated with them.

Demands on graded items with associated due dates and priorities

| Item | Dem # | Quantity | Due date 1 | Priority 1 | Due date 2 | Priority 2 |
|------|-------|----------|------------|------------|------------|------------|
| PN2  | DEM1  | 70       | 02/01      | 1          | 01/15      | 5          |
| PN3  | DEM2  | 30       | 02/01      | 2          | 01/10      | 4          |

The method shown in FIG. 12 proceeds in the following manner. In item 700, as a starting point, the method first solves the above system to calculate production starts on each of the graded parts, calculate corresponding stocks on the item that is graded and calculate substitutions to minimize stocks on the item to be graded solely using the driver due date for the calculations. Such solutions, using single dates for each start and stock, represent conventional art and can be made heuristically or more appropriately employing linear programming. U.S. Pat. Nos. 5,971,585 and 6,701,201 (incorporated herein by reference) describe a linear programming solution to the problem.

For the present illustration, the optimal way to solve the system is to build 100 pieces of PN1 on 02/01 which then is graded into 60 pieces of PN2 and 40 pieces of PN3. The method then substitutes 10 pieces of PN3 for PN2. This is illustrated in the table below where Start, Start Qty, Stock Qty and Stock date represent assets which add to inventory, Demand, Demand Qty and Demand Due date represent shipments or consumption of inventory and Ending Inventory represents ending inventory as of the due dates indicated. Solely for ease of illustration, the method assumes the graded items have 100% yield and zero cycle time.

SOLUTION TABLE

PN2

| Start | Start Qty | Stock Qty | Stock date | Demand | Demand Qty | Demand Due date | Ending Inventory |
|-------|-----------|-----------|------------|--------|------------|-----------------|------------------|
| PL0001 | 60 | 60 | 02/01 | | | | |
| SUB001 | 10 | 10 | 02/01 | DEM1 | 70 | 02/01 | 0 |

| Start | Start Qty | Stock Qty | Stock date | Demand | | Demand Due date | Ending Inventory |
|-------|-----------|-----------|------------|--------|--|-----------------|------------------|

PN3

| PL0001 | 40 | 40 | 02/01 | SUB001 | 10 | 02/01 | 30 |
|        |    |    |       | DEM2   | 30 | 02/01 | 0  |

PN1

| BIN001 | 100 | 100 | 02/01 | PL0001-PN2 | 60 | 02/01 | 60 |
|        |     |     |       | PL0001-PN3 | 40 | 02/01 | 0  |

The present method now needs to associate a multitude of due dates and priorities to PN2 production starts PL0001, PN3 production starts PL0001 and PN1 stocks PL0001-PN2 and PL0001-PN3.

Next in item 702, the method gathers all assets associated with the graded parts.

This corresponds to the portion of the tables associated with "Start, Start Qty, Stock Qty and Stock date" and sort by item stock date.

ASSET TABLE

| Item | Start  | Start Qty | Stock Qty | Stock date |
|------|--------|-----------|-----------|------------|
| PN2  | PL0001 | 60        | 60        | 02/01      |
| PN2  | SUB001 | 10        | 10        | 02/01      |
| PN3  | PL0001 | 40        | 40        | 02/01      |

In item 704, the method gathers all ships (or consumption) associated with the graded parts. This consists of original demands with associated due dates and priorities plus any substitutions appearing the solution table above. Note, that at this stage of the process, the method has no knowledge of priorities associated with substitutions.

SHIP TABLE

| Item | Dem # | Quantity | Due date 1 | Priority 1 | Due date 2 | Priority 2 |
|---|---|---|---|---|---|---|
| PN2 | DEM1 | 70 | 02/01 | 1 | 01/15 | 5 |
| PN3 | SUB001 | 10 | 02/01 | N/A | N/A | N/A |
| PN3 | DEM2 | 30 | 02/01 | 2 | 01/10 | 4 |

In item 706, for each graded part, the method matches supply in the asset table with demands in the ship table in due date order using the stock dates in the Asset Table and driver due date (Due date 1) in the Ship Table. The table below shows how the results of this mapping for the example data our illustration has been using.

MATCH TABLE

| Item | Start | Start Qty | Stock Qty | Stock date | Dem # |
|---|---|---|---|---|---|
| PN2 | PL0001 | 60 | 60 | 02/01 | DEM1 |
| PN2 | SUB001 | 10 | 10 | 02/01 | DEM1 |
| PN3 | PL0001 | 10 | 10 | 02/01 | SUB001 |
| PN3 | PL0001 | 30 | 30 | 02/01 | DEM2 |

At this point, if the method has an association between "PLxxxx" type production starts and demands of type "DEMx" then the method has an association between the "PLxxxx" production starts and the multitude of due dates and priorities associated with the "DEMx" type demands. However, the method does not without further work know what multitude of demands to associate with "PLxxxx" production starts covering "SUBxxx" type demands in the table. The method solves this by utilizing the correspondence between the "SUBxxx" demands which consume an asset for substitution and the "SUBxxx" assets which add assets to inventory. The method iteratively proceeds through the above table looking for demands of type "SUBxxx". When one is found with a non-zero quantity, the method looks for corresponding assets entries in the table. The method than adds entries to the table where the asset associated with the original SUBxxx demand becomes associated with the demands corresponding to assets currently matched where SUBxxx is an asset. The method then nets from the original table entry where the SUBxxx was found. The method repeats this until there are no more "SUBxxx" type demands with non-zero quantities. For example, row 3 above contains a demand of SUB001. The method looks in the table the table where assets of SUB001 are covering demands. In this case, 10 pieces of such an asset is covering demand DEM1. The method creates a new entry in the table with the original asset covering the SUB001 demand (PN3/PL0001) now covering the demand associated with SUB001 as an asset (DEM1) with a quantity containing the smaller of the quantity associated with demand row or the quantity associated with asset row. The method then nets this quantity from the original table entry with the SUB001 demand and the entry where SUB001 was an asset. This gives us the following result:

MATCH TABLE

| Item | Start | Start Qty | Stock Qty | Stock date | Dem # |
|---|---|---|---|---|---|
| PN2 | PL0001 | 60 | 60 | 02/01 | DEM1 |
| PN2 | SUB001 | 0 | 0 | 02/01 | DEM1 |
| PN3 | PL0001 | 0 | 0 | 02/01 | SUB001 |
| PN3 | PL0001 | 30 | 30 | 02/01 | DEM2 |
| PN3 | PL0001 | 10 | 10 | 02/01 | DEM1 |

Thus, item 708 of the method discovered in this example that, because of substitution, part of PN3 demand is used to supply demand DEM1 of PN2 and hence needs to be associated with the multitude of due dates and corresponding priorities associated with that demand. In general, item 708 iterates through substitutions until each start is appropriately associated with the demand ultimately covered by the substitutions. At that point, since the method knows the demand associated with each of the production starts, the method knows the due dates and priorities to associate with the production starts as shown in the table below. This table can now be saved as containing appropriate due dates and priorities associated with production starts resulting from the binning process of this particular Start/Start date.

Merge table with explicit due dates and priorities

| Item | Start | Start Qty | Stock Qty | Stock date | Dem # | Due date 1 | Priority 1 | Due date 2 | Priority 2 |
|---|---|---|---|---|---|---|---|---|---|
| PN2 | PL0001 | 60 | 60 | 02/01 | DEM1 | 02/01 | 1 | 01/15 | 5 |
| PN3 | PL0001 | 30 | 30 | 02/01 | DEM2 | 02/01 | 2 | 01/10 | 4 |
| PN3 | PL0001 | 10 | 10 | 02/01 | DEM1 | 02/01 | 1 | 01/15 | 5 |

At this point the method is able to associate the production starts of each graded product with appropriate multiple due dates and priorities corresponding to the demands that are being supplied. The method now needs to calculate the due dates and priorities to associate with the item to be graded (PN1) in item 710. To do so, in item 710, the method first sorts the above table by "Start/Start date" then by priority associated with driver due date. At the end of this step, the method will have successfully associated n-tuples of due dates and priorities with the production starts corresponding to the items which result after the grading process (PN2 and PN3, in the present example). In the present example, this step results in:

Merge table with explicit due dates and priorities

| Item | Start | Start Qty | Stock Qty | Stock date | Dem # | Due date 1 | Priority 1 | Due date 2 | Priority 2 |
|---|---|---|---|---|---|---|---|---|---|
| PN2 | PL0001 | 60 | 60 | 02/01 | DEM1 | 02/01 | 1 | 01/15 | 5 |
| PN3 | PL0001 | 10 | 10 | 02/01 | DEM1 | 02/01 | 1 | 01/15 | 5 |
| PN3 | PL0001 | 30 | 30 | 02/01 | DEM2 | 02/01 | 2 | 01/10 | 4 |

The method now calculates the n-tuple of due dates/priorities to place on the part which is being graded by this process (PN1 in the present example) in items 712-718. To more clearly illustrate the method, the illustration shown below shows an example where the lead times for the outputted graded parts are zero and where their yield is 100%. Often in reality the due dates associated with the item which is being graded will need to be offset by the cycle time of the graded parts and yield applied. This is easily accomplished by taking the merge table from item 710 above, offsetting each due date by cycle time to find due dates associated with start date and by using yielded start quantity in the processes below.

For each "Start/Start date", the method proceeds through the table in the order of sort provided by step 6 looking for non-zero entries. If no non-zero entry is found, this step ends. If a non-zero entry of quantity x is found, in item 712, the method creates a stock quantity for the item to be graded (where the stock quantity is x divided by planned distribution, where planned distribution is the planned percentage of the item to be graded that becomes the graded part found) and associates the due date and priority of the driver due date with this stock quantity. The method marks all other non-driver due dates and priorities marked as unfilled for now.

In item 714-718, for each graded product which is created from the graded process, the method calculates the planned quantity the graded products will receive as a result of binning the stock quantity of the item to be binned. More specifically, in item 714, the method proceeds through entries for the Start/Start date, netting this planned quantity from the table entries until the planned quantity has been consumed.

If during the netting process in item 714, a non-zero entry is found in the table, the method checks to see if any of the non-driver due dates currently associated with the stock quantity of the part to be graded need to be updated and updates the corresponding non-driver due date in the stock quantity record if there exists a non-driver due date in the Merge table above whose due date differs from the driver due date in Merge table row and the non-driver due date is earlier in time than the corresponding due date currently associated with the stock quantity of the item to be graded (in item 716). Similarly, in item 716, the method updates the corresponding priority in the stock quantity record if there exist a non-driver due date in the Merge table row whose due date differs from the driver due date in the Merge table row and the priority associated with the non-driver due date is more important than the priority currently associated with the corresponding non-driver due date in the stock quantity record associated with the item to be graded.

In item 718, if any of the non-driver due dates and corresponding priorities in the stock quantity record that was created remains unfilled, the method copies the driver due date and its corresponding priority into the unfilled non-driver due dates and priorities.

An example of the method shown in FIG. 12 proceeds as follows. With respect to item 712, the method finds the first non-zero entry in the first row of the Merge table above. The method calculates stock quantity for the part to be graded as 60/0.60=100. The method associates the corresponding driving date and priority of the Merge table row being processed with the driving date and priority of the stock quantity the method calculated on the part to be graded.

Stock quantity for item to be graded

| Item | Start | Stock Qty | Stock date | Due date 1 | Priority 1 | Due date 2 | Priority 2 |
|---|---|---|---|---|---|---|---|
| PN1 | BIN001 | 100 | 02/01 | 02/01 | 1 | unfilled | unfilled |

For item 714, for graded product PN2, 100*0.60=60 pieces need to be netted from the merge table. This quantity can be found from the first row in the table. The netting process leaves:

Merge table with explicit due dates and priorities

| Item | Start | Start Qty | Stock Qty | Stock date | Dem # | Due date 1 | Priority 1 | Due date 2 | Priority 2 |
|---|---|---|---|---|---|---|---|---|---|
| PN2 | PL0001 | 0 | 0 | 02/01 | DEM1 | 02/01 | 1 | 01/15 | 5 |
| PN3 | PL0001 | 10 | 10 | 02/01 | DEM1 | 02/01 | 1 | 01/15 | 5 |
| PN3 | PL0001 | 30 | 30 | 02/01 | DEM2 | 02/01 | 2 | 01/10 | 4 |

As due date 2 differs from Due date 1, item 716 is performed. As any due date is considered earlier than an "unfilled" due date, the method replaces the due date associated with due date 2 in the stock quantity record with this Due date 2 value. Similarly, the method replaces the Priority 2 field of the stock quantity record with the Priority 2 value from this row in the merge table giving:

Stock quantity for item to be graded

| Item | Start | Stock Qty | Stock date | Due date 1 | Priority 1 | Due date 2 | Priority 2 |
|------|-------|-----------|------------|------------|------------|------------|------------|
| PN1  | BIN001| 100       | 02/01      | 02/01      | 1          | 01/15      | 5          |

Items 714 and 716 are repeated for graded part PN3. For graded product PN3, 100*0.40=40 pieces need to be netted from the merge table. The method first nets from the 10 pieces found in the second row of the merge table. This zeroes the merge table entry for the row and leaves 30 remaining to be netted from later table entries. As non-driver due date Due date 2 differs from the driver due date, the method checks to see if Due date 2 is earlier in time than the corresponding Due date 2 entry associated with the stock quantity in the Stock quantity table. That is not the case, so the method does not update the Stock quantity due dates. Similarly, there is no need to update the Priority 2 field of the stock quantity. This process leaves:

Merge table with explicit due dates and priorities

| Item | Start  | Start Qty | Stock Qty | Stock date | Dem # | Due date 1 | Priority 1 | Due date 2 | Priority 2 |
|------|--------|-----------|-----------|------------|-------|------------|------------|------------|------------|
| PN2  | PL0001 | 0         | 0         | 02/01      | DEM1  | 02/01      | 1          | 01/15      | 5          |
| PN3  | PL0001 | 0         | 0         | 02/01      | DEM1  | 02/01      | 1          | 01/15      | 5          |
| PN3  | PL0001 | 30        | 30        | 02/01      | DEM2  | 02/01      | 2          | 01/10      | 4          |

Stock quantity for item to be graded

| Item | Start | Stock Qty | Stock date | Due date 1 | Priority 1 | Due date 2 | Priority 2 |
|------|-------|-----------|------------|------------|------------|------------|------------|
| PN1  | BIN001| 100       | 02/01      | 02/01      | 1          | 01/15      | 5          |

The method now needs to net the remaining 30 pieces from PN3 entries in the Merge table. Row 3 of the merge table has 30 pieces. As non-driver due date Due date 2 differs from driver due date Due date 1 in the row, the method checks if the due date in Due date 2 of the record is less than the Due date 2 entry associated with the stock quantity in the stock table. It is, so the method replaces Due date 2 in the stock quantity table with this earlier due date. Similarly, the method replaces Priority 2 in the stock quantity table with the higher priority found in the Due date 2 field of the Merge table entry being netted. This results in:

Merge table with explicit due dates and priorities

| Item | Start  | Start Qty | Stock Qty | Stock date | Dem # | Due date 1 | Priority 1 | Due date 2 | Priority 2 |
|------|--------|-----------|-----------|------------|-------|------------|------------|------------|------------|
| PN2  | PL0001 | 0         | 0         | 02/01      | DEM1  | 02/01      | 1          | 01/15      | 5          |
| PN3  | PL0001 | 0         | 0         | 02/01      | DEM1  | 02/01      | 1          | 01/15      | 5          |
| PN3  | PL0001 | 0         | 0         | 02/01      | DEM2  | 02/01      | 2          | 01/10      | 4          |

Stock quantity for item to be graded

| Item | Start | Stock Qty | Stock date | Due date 1 | Priority 1 | Due date 2 | Priority 2 |
|------|-------|-----------|------------|------------|------------|------------|------------|
| PN1  | BIN001| 100       | 02/01      | 02/01      | 1          | 01/10      | 4          |

In item 714, as all Merge table entries for the Start/Start date are all zero, the process stops for this particular Start/Start date. The Stock quantity information can now be saved as having the appropriate due dates and associated priorities to be associated with the stock quantity of the part to be graded for this particular Start/Start date.

This method assumed that one of the plurality of due dates associated with demands and production starts will be considered a driving date of most importance. An alternative embodiment, shown in FIG. 13, is also included herein to calculate production starts on the binned part without the assumption of a driving date. More specifically, in item 800, for each of the "n-tuple" of due dates associated with the demands, perform the steps shown in FIG. 12. However, only one due date will be associated with the binned production starts for each of these iterations. Therefore, in item 802, after the processing in FIG. 12 is completed, there will be "n" separate solutions for the binned production starts each of which will be associated with one of "n" demand due dates and priorities. Thus, in item 804, the method creates a merged start comprising a union of each of the "n" separate solutions (each of which is associated with one of "n" demand due dates and priorities).

As shown in FIG. 14, the invention employs fast heuristics to achieve the foregoing. More specifically, in item 320, the method initially groups the production starts into production lots (e.g., lotsizes the production starts) so that the production lots conform to given minimum, maximum and multiple lot-size rules. In item 322, the method assigns one or more priorities to the production lots of item 320, such priorities varying by date. By the actions of item 322, each production lot will be associated with multiple dates, each such date associated with a priority for capacitating purposes. In item 322, the lots may be split to more logically fit competing priorities provided a given lot can be split into two or more lots each of which conform to lotsize rules. Then, in item 324, the method capacitates each of the lots by calculating when the lots can be started without exceeding capacity based on the multiple dates and priorities associated with a lot. Again, in item 324, the lots can be split into two or more lots to most efficiently utilize capacity provided each of the split lots conform to the lotsize rules. Each of the above steps is described in more detail below.

FIG. 15 illustrates step 320 in greater detail. Initial production starts will be input. These production starts may not be lotsized and may be infeasible. Such production starts may come from a variety of sources. The simultaneously submitted related application "Supply Consumption Optimization and Multiple Component Utilization" BUR92006004US1 describes one method of calculating such production starts which can be used to create the initial production starts which form the input to this method. BUR920060004US1 defines a method of creating planned production starts based on component availability but the results of that method are neither lotsized nor adjusted to fit available capacity. Alternatively, the initial production starts used as input could also have been calculated from a traditional MRP system or as an intermediate step by any planning system. While these examples of how required inputs to this invention have been provided, this invention is not dependent on the source of the production starts or how they are calculated.

FIG. 15 illustrates that the method reads the initial production starts in item 430. Such production starts will contain a recommended start date when the production start may be made and a quantity. This start date may represent the earliest date a start can be made based on component availability or it may simply represent a desired start date. Initial production starts should have a flag indicating whether or not the capacitating process is allowed to start earlier than the date associated with the start. As an example of usage, production starts at the bottom of the bill of material supply chain may be started earlier to help relieve capacitating problems as they will not be dependent on the availability and timing of components. Production starts at mid-levels of the bill of material may not be able to start earlier than the date indicated as they will be constrained by component availability if the present invention is used in the context of an "implosion" of available assets.

In item 432, the method determines if lotsize rules apply to the production starts just read. If so, processing proceeds to apply the rules in item 434 below. Otherwise, if there are no rules to apply, item 320 is complete and processing can proceed to item 322, as discussed above with respect to FIG. 14.

In item 434, the method processes (sorts, orders) the gathered production starts in item number, build location, and start date order, and item 434 outputs valid lotsized production starts.

If an early start flag indicates a start may be started early, the method creates lotsized releases by rounding up to the nearest valid lotsized release by pulling in production starts from the future as shown in item 436. If no production starts are available to pull in from the future to make a valid lotsized release, the method rounds up to the next valid lotsized release anyway.

| Example lotsizes must be in multiples | Production starts can be moved to start early | | | |
|---|---|---|---|---|
| | Start date | | | |
| of 25 | 2/01 | 2/05 | 2/09 | 2/15 |
| Original production starts | 16 | 18 | 37 | 22 |
| Lotsized production starts | 25 | 25 | 25 | 25 |

If the early start flag indicates that a production start cannot be started early, the method creates lotsized releases by rounding down to the nearest valid lotsized release and pushing any remainder to the next production start as shown in item 408. The last start may not be convertible to a valid lotsized release. In this case, the method leaves the last start without a lot size (unlotsized).

| Example lotsizes must be in multiples | Production starts cannot be started early due to component availability | | | |
|---|---|---|---|---|
| | Start date | | | |
| of 25 | 2/01 | 2/05 | 2/09 | 2/15 |
| Original production starts | 16 | 18 | 37 | 22 |
| Lotsized production starts | No start made | 25 | 25 | 25, 18 |

Finally, in item 440, this method sets a valid lotsize flag to indicate that the lots created by this process are valid lotsized releases. One exception occurs in the event the last production start could not be made into a valid lotsized release, in which case the valid lotsize flag is not set for the last production start.

FIG. 16 illustrates item 322 in greater detail which, as described above, assigns priorities and associated start dates to the lotsized releases, thereby splitting lots into finer lotsized releases to allow the inventive method to make better priority assignments. As previously described, the production starts calculated by the process shown in FIG. 15 have a recommended start date and quantity attached to them at the beginning, but have no priority information associated with them governing the sequence of capacity processing. In this processing shown in FIG. 16, the method associates a series of dates and associated priorities with the production starts indicating how the capacitating process is to proceed. By doing this, the method allows priority of capacitating to vary as a function of the start date of a production start. In order to illustrate the method, for clarity, the following demonstrates the case where each start can be associated with two dates having different priorities; however, the invention is not limited to just two dates and, instead, as would be understood by one ordinarily skilled in the art in light of this disclosure, there is no limit as to the number of start dates and due dates that can be associated with each production start or each demand. As such the method will use the term "pair" of dates and priorities below. The method is extendable to supporting any number of dates with associated priorities. As such, the word "n-tuple" may be substituted in any place below where "pairs" is used.

The processing of item 322 in FIG. 14 is illustrated in greater detail in FIG. 16. More specifically, in item 520, the method associates each lot with multiple n-tuples of start dates and priorities. The details occurring in item 520 are shown in greater detail in FIG. 17. This method is not dependent on any particular method for associating multiple n-tuples of dates and priorities with the lotsized releases. The method can accept any algorithm a business process may require to associate a lot with multiple n-tuples of dates and priorities. The result will be that any given lot can be associated with sub-lots, each sub-lot being associated with priorities which vary by start date such that the sum of the quantities of the sub-lots equal the quantity of its lot.

Example 1 below illustrates a method of associating such priorities useful in the situation where a planning engine is being fed component feasible (but not necessarily capacity feasible) production starts and the planning engine can also obtain true production starts needed to supply all demand and such production starts are associated with priorities which change by date. Thus, the example provides a method to prioritize inputted production starts to best satisfy the needs of the business by comparison against the true production starts needed to supply all demand, such true production starts each being associated with multiple dates and priorities, say representing priorities for making customers' desired dates versus priorities for making customers' commit dates.

Example 1 is a case where the invention can be used to support attempting to better supply to customers' desired dates but drives to customer commit dates with a higher priority. For a given item number, plant/warehouse, the method gathers in (inputs) the lotsized production starts from the processing shown in FIG. 17 above in item 630. Next, in item 632, the method gathers (inputs) production starts calculated from another method which identifies production starts required to meet all exit demands on-time. This differs from the production starts in FIG. 15 above in that the production starts from FIG. 17 may be delayed because of component availability problems in the supply chain. The production starts in item 632 reflect the needed production starts to meet all demands on time regardless of component availability or similar problems. These needed production starts also reflect priorities associated with multiple dates. The simultaneously submitted related patent application "A Method For Calculating A Materials Requirements Plan For Demands Containing Multiple Demand Dates and Priorities" BUR920060003US1, identifies a methodology for calculating needed production starts capable of associating multiple dates with multiple priorities with the needed production starts. However, the method of this disclosure would work with any method which can associate needed production starts with multiple dates and priorities.

Then, in item 634, the method establishes a link between the component feasible production starts of item 630 and the desired production starts of item 632. The simultaneously submitted related patent application entitled "Supply Consumption Optimization and Multiple Component Utilization" BUR92006004US1 describes a method which can be used to associate the component feasible production starts with the needed production starts. More specifically, in item 634, the invention applies the methodology described in the related patent application BUR920060004US1 treating the component feasible production starts as "supply" and the needed start as "demand" using the function of the related application which matches demands with available supply. The methodology will result in each component feasible lot being associated with one or more needed production starts together with their priorities which vary by date and use of the method in the related patent application guarantees a best fit.

The following tables illustrate a simplified example of the three above steps. Although the method can accommodate any number of dates, for clarity, the illustration below demonstrates the method using two dates which in this example will be called request date and commit date.

Item 600: read feasible lotsized production starts
(min = 25, max = 100, mult = 25)

| Quantity | Available Date | Flag |
|---|---|---|
| 100 | 03/01 | Cannot start early |
| 75 | 03/15 | Cannot start early |

Item 602: get needed production starts with associated priorities by date

| Quantity | Request Date | Request Priority | Commit Date | Commit Priority |
|---|---|---|---|---|
| 33 | 02/20 | 5 | 03/01 | 1 |
| 110 | 02/25 | 4 | 03/05 | 2 |
| 15 | 03/10 | 7 | 03/15 | 3 |
| 17 | 03/20 | 5 | 03/20 | 1 |

Item 604: associate each feasible lotsized release with multiple pairs of dates/priorities

| Quantity | Available Date | Flag | Sub-quantity | Request Date | Request Priority | Commit Date | Com Priority |
|---|---|---|---|---|---|---|---|
| 100 | 03/01 | Not early | 33 | 02/20 | 5 | 03/01 | 1 |
|  |  |  | 67 | 02/25 | 4 | 03/05 | 2 |
| 75 | 03/15 | Not early | 43 | 02/25 | 4 | 03/05 | 2 |
|  |  |  | 15 | 03/10 | 7 | 03/15 | 3 |
|  |  |  | 17 | 03/20 | 5 | 03/20 | 1 |

The above example demonstrates an embodiment of accomplishing item 604. above using related patent applications in using this invention where both available production starts (say based on component availability) are known and desired production starts (to meet all demand) are known. However, as stated earlier, any business method which allows lots to be broken into sub-lots each with multiple priorities which change by date may be used in this step.

As mentioned above, the processing of item 322 in FIG. 14 is illustrated in greater detail in FIG. 16. More specifically, in item 522, the method of item 322 splits lots into multiple valid lotsized releases, if needed and if possible, to better prioritize lots for the capacitating process in item. The process shown in item 522 is shown in greater detail in FIG. 18. At the start of this process, shown in FIG. 18, the method receives, as input, lotsized releases, broken down into sub-quantities each with their associated n-tuple of dates and priorities (from item 520). At the end of the process shown in FIG. 18, the method outputs valid lotsized releases each with a single valid lotsized quantity and a single n-tuple of dates/priorities associated with that valid lotsized quantity (to allow processing in item 324 to commence).

More specifically, in item 720, if a start has not been flagged as a valid lotsized release, the method breaks up the start by each sub-quantity which has been associated with the production start. To the contrary, in item 722, if a start has been flagged as a lot, the method will attempt to break up the start to provide better prioritized lots for the subsequent capacitating process. This is beneficial because, as in the case where lotsizing applies, resource allocation prioritization will be done based on priorities associated with a lot as opposed to individual subsets that make up the lot. With the inventive method only one n-tuple of dates and associated priorities can be associated with each lot. Also, if a lotsized release is split, all the resultant split lots are valid lotsized releases according to the governing lotsize (or grouping) rules.

Figure 19:
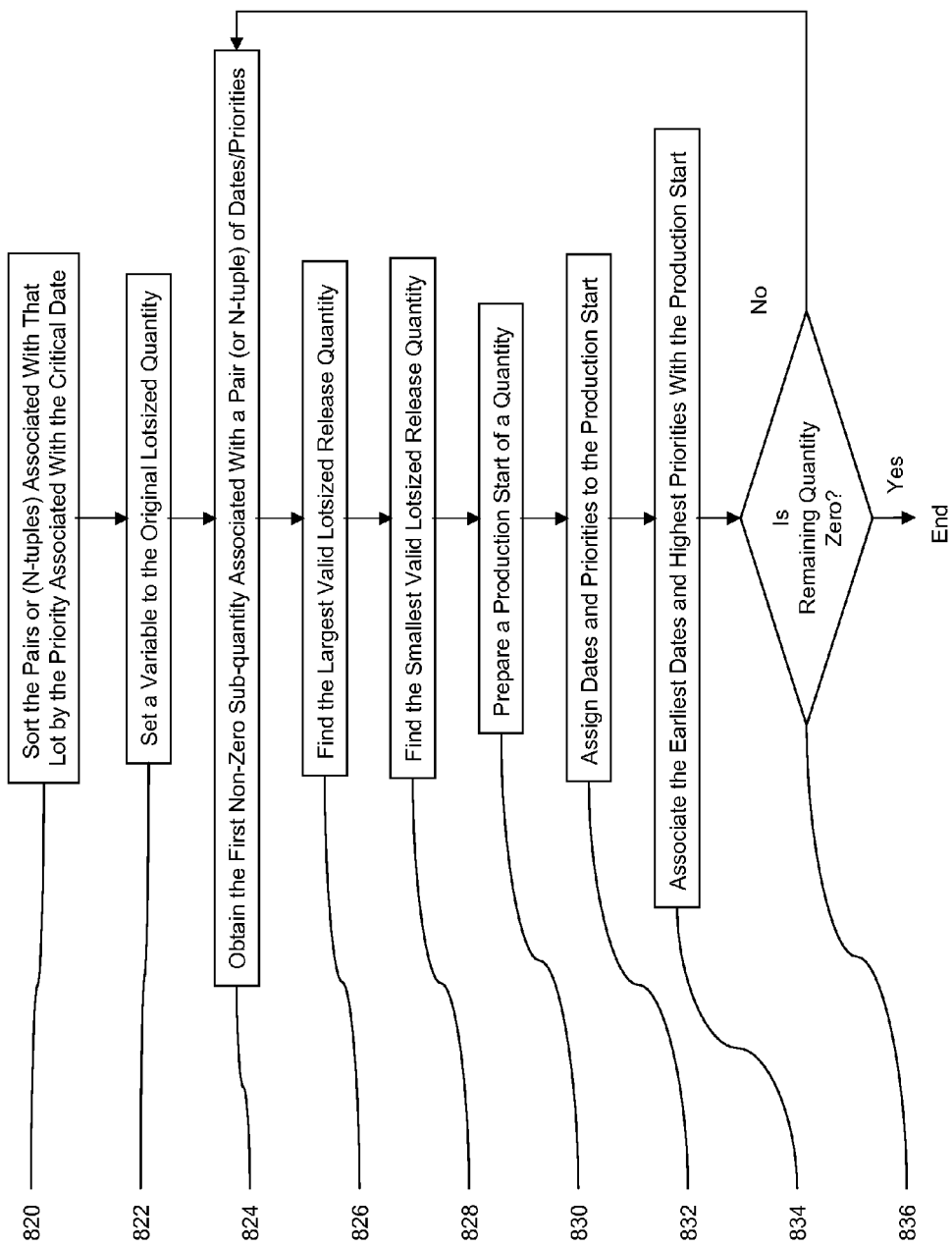
FIG. 19 is a flow diagram illustrating a method of resource allocation handling priorites which vary by date.

FIG. 19 illustrates one example of how the invention breaks up the production starts in items 720 and 722. These steps can be done for each production lot. The method assumes that one of the dates and its associated priority will represent the "critical date" for the production start. In general, the critical date for a production start is the date with the highest priority and represents the date that will have greatest impact if production starts cannot be made by that date.

As shown in item 820, for each lot, the method sorts the n-tuples of dates and priorities associated with that lot by the priority associated with the critical date. In item 822, the method creates a variable, which could be called REMAINING_QUANTITY, and initially sets it to the original lotsized quantity. In item 824, the method obtains the first non-zero sub-quantity associated with an n-tuple of dates/priorities associated with the production lot being currently broken up. The method then finds the largest valid lotsized release quantity x>0, such that x<=sub-quantity and (REMAINING_QUANTITY-x) is also a valid lotsized quantity or zero in item 826. If no such x exists from item 826, the method finds the smallest valid lotsized release quantity x>0, such that x>=sub_quantity and (REMAINING_QUANTITY-x) is also a valid lotsized quantity or zero in item 828. (Note: such an x must always exist as REMAINING_QUANTITY itself must be a valid lotsized release.)

In item 830, the method prepares a production start of quantity x and sets the REMAINING_QUANTITY to REMAINING_QUANTITY-x. In item 832, the method assigns dates and priorities to this production start by netting quantity x from non-zero sub-quantities associated with the lot. As this netting process proceeds, the method associates with the production start the earliest dates and highest priorities found from the items being netted in item 834. In item 836, if REMAINING_QUANTITY=0, the process ends for this lot. Otherwise, the process is repeated starting at item 824.

The following simplified example illustrates the process for one lot using tables. As before, although the method can accommodate any number of dates, for clarity, the illustration below uses two dates which vary by priority which will be called request date and commit date.

lotsize: min = 25, max = 100, mult = 25: sub-quantities sorted by commit priority as commit date is the driving date in this example.

| Quantity | Available Date | Flag | Sub-quantity | Request Date | Request Priority | Commit Date | Com Priority |
|---|---|---|---|---|---|---|---|
| 100 | 03/01 | Not early | 33 | 02/20 | 5 | 03/01 | 1 |
| | | | 67 | 02/25 | 4 | 03/05 | 2 |

Item 822: Remaining_quantity is set to 100.

Item 824: The sub-quantity of 33 pieces represents the first n-tuple of dates and priorities associated with the lot.

Items 826 and 830: 25 pieces is the largest valid lotsize that<33. Furthermore (remaining_quantity-x)=(100-25)=75 which is a valid lotsized release.

Item 832: The method nets 25 from the remaining quantity and the remaining sub-quantities leaving:

lotsize: min = 25, max = 100, mult = 25: sub-quantities sorted by commit priority as commit date is the driving date in this example.

| Rem Quantity | Available Date | Flag | Sub-quantity | Request Date | Request Priority | Commit Date | Com Priority |
|---|---|---|---|---|---|---|---|
| 75 | 03/01 | Not early | 8 | 02/20 | 5 | 03/01 | 1 |
| | | | 67 | 02/25 | 4 | 03/05 | 2 |

Current Output of process

| Quantity | Available Date | Flag | Sub-quantity | Request Date | Request Priority | Commit Date | Com Priority |
|---|---|---|---|---|---|---|---|
| 25 | 03/01 | Not early | 25 | 02/20 | 5 | 03/01 | 1 |

Item 824: The sub-quantity of 8 pieces represents the first non-zero n-tuple of dates and priorities associated with the lot.

Item 826: does not yield an x>0 in this case.

Items 828 and 830: 25 pieces is the smallest valid lotsize that is >=8. Furthermore (remaining_quantity-x)=(75-25)=50 which is a valid lotsized release.

Item 832: The method nets 25 from the remaining quantity and the remaining sub-quantities leaving:

lotsize: min = 25, max = 100, mult = 25: sub-quantities sorted by commit priority as commit date is the driving date in this example.

| Rem Quantity | Available Date | Flag | Sub-quantity | Request Date | Request Priority | Commit Date | Com Priority |
|---|---|---|---|---|---|---|---|
| 50 | 03/01 | Not early | 0 | 02/20 | 5 | 03/01 | 1 |
| | | | 50 | 02/25 | 4 | 03/05 | 2 |

Current Output of process. Note the method netted from each of the sub-quantity entries in the table above. Request priority = 4 was the highest priority request date found among the entries netted and is associated with the start. Similarly, for the other date and priority fields the earliest dates and highest priorities found while netting were associated with the release.

| Quantity | Available Date | Flag | Sub-quantity | Request Date | Request Priority | Commit Date | Com Priority |
|---|---|---|---|---|---|---|---|
| 25 | 03/01 | Not early | 25 | 02/20 | 5 | 03/01 | 1 |
| 25 | 03/01 | Not early | 25 | 02/20 | 4 | 03/01 | 1 |

Items 824: The sub-quantity of 50 pieces represents the first non-zero n-tuple of dates and priorities associated with the lot.

Items 826: 50 pieces is the largest valid lotsize <=50.

Item 828: Does not apply.

Items 830 and 832: The method nets 50 from the remaining quantity and the remaining sub-quantities leaving:

Step 6: lotsize: min = 25, max = 100, mult = 25: sub-quantities sorted by commit priority as commit date is the driving date in this example.

| Rem Quantity | Available Date | Flag | Sub-quantity | Request Date | Request Priority | Commit Date | Com Priority |
|---|---|---|---|---|---|---|---|
| 0 | 03/01 | Not early | 0 | 02/20 | 5 | 03/01 | 1 |
|  |  |  | 0 | 02/25 | 4 | 03/05 | 2 |

Step 6: Current Output of process. Date and priority information taken from the only sub-quantity entry which was netted in this iteration.

| Quantity | Available Date | Flag | Sub-quantity | Request Date | Request Priority | Commit Date | Com Priority |
|---|---|---|---|---|---|---|---|
| 25 | 03/01 | Not early | 25 | 02/20 | 5 | 03/01 | 1 |
| 25 | 03/01 | Not early | 25 | 02/20 | 4 | 03/01 | 1 |
| 50 | 03/01 | Not early | 50 | 02/25 | 4 | 03/05 | 2 |

As remaining quantity is zero at this point, the process ends.

At this point, each row in the table represents a single valid lotsized release quantity associated with a single n-tuple of dates and priorities. Previous non-lotsized sub-quantities have been eliminated by the above processing (items 320 and 322).

Figure 20:
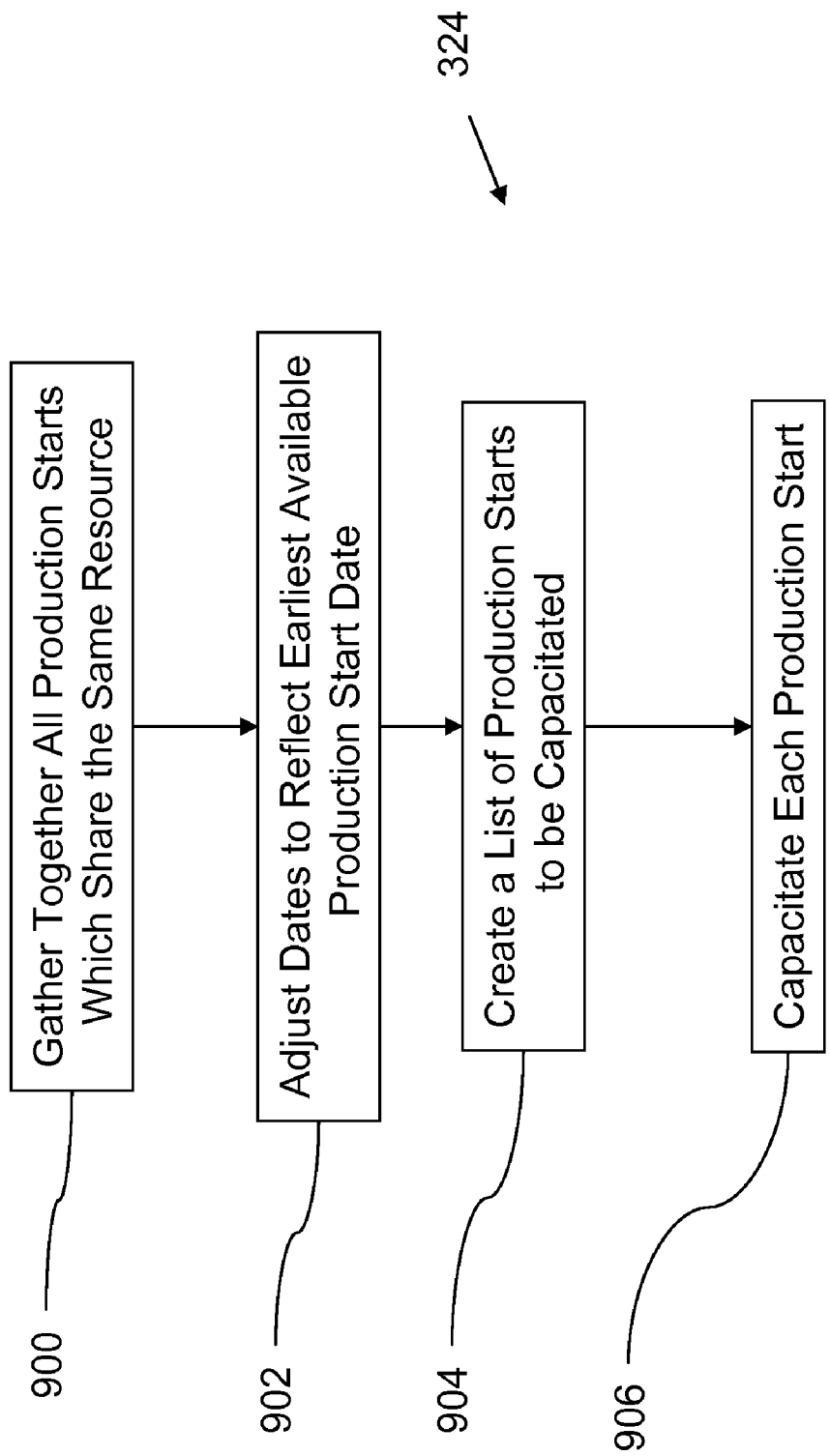
FIG. 20 is a flow diagram illustrating a specific detail of FIG. 8 relating to resource allocation.
Figure 21:
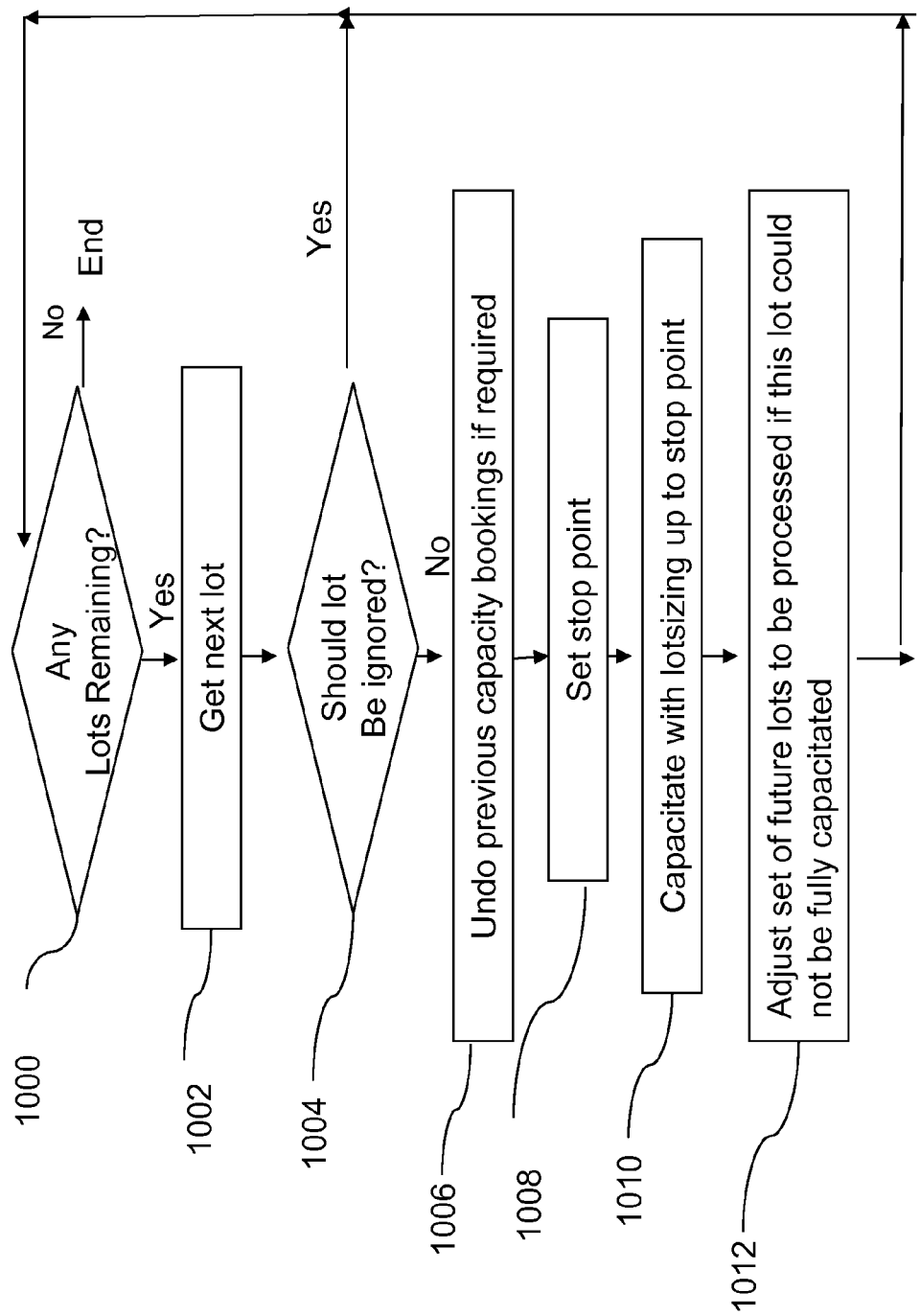
FIG. 21 is a flow diagram illustrating a further detail of FIG. 9 relating to a method of finding available resource.

FIG. 20 illustrates the processing in item 324 in greater detail. As shown above with respect to FIGS. 15-19 above, the method creates valid lotsized production starts and associates each such start with multiple priorities which vary by start date. While the processing represents a method of associating multiple priorities to lotsized releases which vary by date the processing flow in FIG. 20 is not dependent on this particular methodology. Step 900 starts with an input of lotsized releases associated with priorities which vary by date and operates appropriately independently of the method used to create such input.

Essentially, the operations shown in FIG. 20 adjust the production starts in terms of quantity and start date so that the production starts are capacity feasible. The capacitating method has the capability to perform its processing consistent with the multiple priorities by start date which have been associated with the production starts and its results conform to lotsizing rules.

All production starts from step 322 above, which share a same resource, are gathered together and processed together by the method as shown in item 900. By example, U.S. Pat. No. 6,584,370 "Method of calculating low level codes for considering capacities" which was co-invented by the author of this disclosure and is fully incorporated herein by reference, demonstrates a method for determining which item numbers are to be processed together because of shared capacity resources. This invention, however, is not dependent on any specific algorithm which is used to partition production starts sharing the same resources together.

In item 902, the earliest available production start date is determined. If the do not start early flag previously discussed in the detailed description indicates that the production start cannot be made early, an availability date is associated with the lot's recommended start date and the capacitating process cannot release a start earlier in time than this availability date. If the lot is not flagged as being prevented from being started early, the method sets the availability date to the earliest date for which it is permissible to make a capacitated start corresponding to this start. In this case, the availability date may be the first day of the plan or may be later in time if it is desirable to constrain the method from making production starts too early in resolving capacity problems. In any case, the method will adjust the dates associated with the priorities associated with the lots to ensure none of these dates are earlier in time than the lot's given availability date. The method proceeds by examining each of the dates associated with priorities for a given lot. If any one of these dates is earlier in time than the availability date, the date being examined is changed to the availability date. Thus, at the end of this process, none of the dates associated with the multiple priorities of the lots will be less than the availability date.

Item 902 is illustrated by continuing with the previous example in which lots were each associated with 2 priorities called request date and commit_date. The following would be input to item 902.

Lots entering item 902 with availability date information and multiple priorities associated with multiple dates

| Quantity | Availability Date | Flag | Sub-quantity | Request Date | Request Priority | Commit Date | Com Priority |
|---|---|---|---|---|---|---|---|
| 25 | 03/01 | Not early | 25 | 02/20 | 5 | 03/01 | 1 |
| 25 | 03/01 | Not early | 25 | 02/20 | 4 | 03/01 | 1 |
| 50 | 03/01 | Not early | 50 | 02/25 | 4 | 03/05 | 2 |

As each of the three lots in the above table are flagged as not being able to start early, the method adjusts the dates associated with the multiple priorities for each lot so that none are less than the availability date. This results in:

Lots exiting item 902 with availability date information and multiple priorities associated with multiple dates

| Quantity | Availability Date | Flag | Sub-quantity | Request Date | Request Priority | Commit Date | Com Priority |
|---|---|---|---|---|---|---|---|
| 25 | 03/01 | Not early | 25 | 03/01 | 5 | 03/01 | 1 |
| 25 | 03/01 | Not early | 25 | 03/01 | 4 | 03/01 | 1 |
| 50 | 03/01 | Not early | 50 | 03/01 | 4 | 03/05 | 2 |

In item 904, the method creates a list of production starts to be capacitated, each containing one priority and one associated "required" date. One record containing multiple priorities and dates exiting from step 902 may become multiple records each with one date and priority by the method of item 904. The method proceeds by examining each lot from item 902. For each unique date associated with a priority for a lot, the method will create a lot with one "required date" and one priority where the priority corresponds to the date from the original lot. In the case where the original lot has multiple entries for the same date, the lot created by this record for the corresponding date will contain the highest priority associated with that date in the original lot. In addition, the method of item 904 creates a link between multiple records associated with an original single lot so that future processes in the method can know when multiple entries refer to the same lot and should not be assigned duplicate capacitated production starts. Finally, the method in item 904 sorts the above created records by priority/required date.

The following illustrates item 904 with a simple case continuing the previous example wherein the following lots would be input into item 904.

| | Lots exiting item 902 with availability date information and multiple priorities associated with multiple dates | | | | | | |
|---|---|---|---|---|---|---|---|
| Quantity | Availability Date | Flag | Sub-quantity | Request Date | Request Priority | Commit Date | Com Priority |
| 25 | 03/01 | Not early | 25 | 03/01 | 5 | 03/01 | 1 |
| 25 | 03/01 | Not early | 25 | 03/01 | 4 | 03/01 | 1 |
| 50 | 03/01 | Not early | 50 | 03/01 | 4 | 03/05 | 2 |

As explained in the description of item 904, the above information will be transformed into records having one date and priority and linkages to identify which records originated from a single original lot. Each input lot will convert to one or more entries depending on how many unique dates are associated with its priorities. In this case, as only the last lot is associated with multiple dates, only it will be associated with multiple entries. In the example below, identification of output originating from the same original lot is identified by having the same lot ID but the method accepts any method chosen that identifies multiple records originating from the same lot.

| Quantity | Availability Date | Required Date | Priority | Lot ID |
|---|---|---|---|---|
| 25 | 03/01 | 03/01 | 1 | 1 |
| 25 | 03/01 | 03/01 | 1 | 2 |
| 50 | 03/01 | 03/01 | 4 | 3 |
| 50 | 03/01 | 03/05 | 2 | 3 |

Finally, the method of 904 would sort the records of our example by priority/date which would output the following in this case:

| Quantity | Availability Date | Required Date | Priority | Lot ID |
|---|---|---|---|---|
| 25 | 03/01 | 03/01 | 1 | 1 |
| 25 | 03/01 | 03/01 | 1 | 2 |
| 50 | 03/01 | 03/05 | 2 | 3 |
| 50 | 03/01 | 03/01 | 4 | 3 |

Next in item 906, the method capacitates each production start in the order created by item 904. The processing occurring in item 906 is shown in greater detail in FIG. 21. More specifically, in item 1000, the method determines if there are any remaining lots to capacitate. If the answer is no, the method ends. Otherwise, the method proceeds to item 1002.

In item 1002, the method acquires the next lot from the sorted list created by item 904 that has yet to be capacitated.

In item 1004, the method determines whether this lot needs to be processed for capacitate. The same lot may have already been previously processed under a higher priority. The method thus proceeds to search if the given lot has already been capacitated earlier by the process. If there exists a case where the lot has already been capacitated and it was capacitated in response to a required date that is less than or equal to the present required date to be processed then the present record is ignored. Furthermore, the present record is deleted and cannot be further referenced as a linked lot and the method returns to step 1000. If corresponding to the present record, there either exists no previous processing of the lot or previous processing was done for a required date greater than the required date of the present record processing proceeds on to item 1006 described below.

In item 1006, the method first determines if it has to undo any previous capacitating bookings that were associated with the lot if it was previously processed. If the method determines this same lot was previously capacitated by the method under a higher priority with a later required date, the method undoes the capacity that was previously booked for the lot. That is, it deletes any calculated capacitated lotsized releases previously calculated for the lot and frees up corresponding capacity consumption. This is done in order to prevent double booking of capacity and manufacturing starts for the same required lot quantity. Note that if the method undid capacity at this point, it unbooked capacity that was available to the lot corresponding to a required date later in time and higher priority than the present record being processed. Therefore, although the method attempts to capacitate the lot earlier in time corresponding to a lower priority, the resulting booking of capacity can do no worse than the original booking. That is, in the worse case, the capacity that was just unbooked can be used to satisfy the present iteration of the lot. This method thus ensures that any attempt to satisfy the lot at an earlier point in time corresponding to a lesser priority cannot adversely impact the booking of the capacity possible to meet more important priorities processed earlier. The method next proceeds to item 1008.

In item 1008, the method sets a "stop point" which represents a date where capacitating will cease for this iteration if the lot being processed has not been totally capacitated by this date. The intent is, if a lot cannot be made to fit into the manufacturing schedule by a certain point in time, the priority for capacitating the lot may be lower. The "stop point" is thus a date wherein capacitating must proceed at a lower priority. To determine the stop point, the method examines future records to be processed to determine if there exist any more required dates associated with the lot having required dates later than the present required date being processed. If one or more such records exist, the method sets the stop date to be the earliest of these dates. If no such record existed, the method sets the stop date to a date indicated as default by the user as a date past which capacitating should no longer occur. The method then proceeds to the main capacitating step in item 1010.

Figure 22:
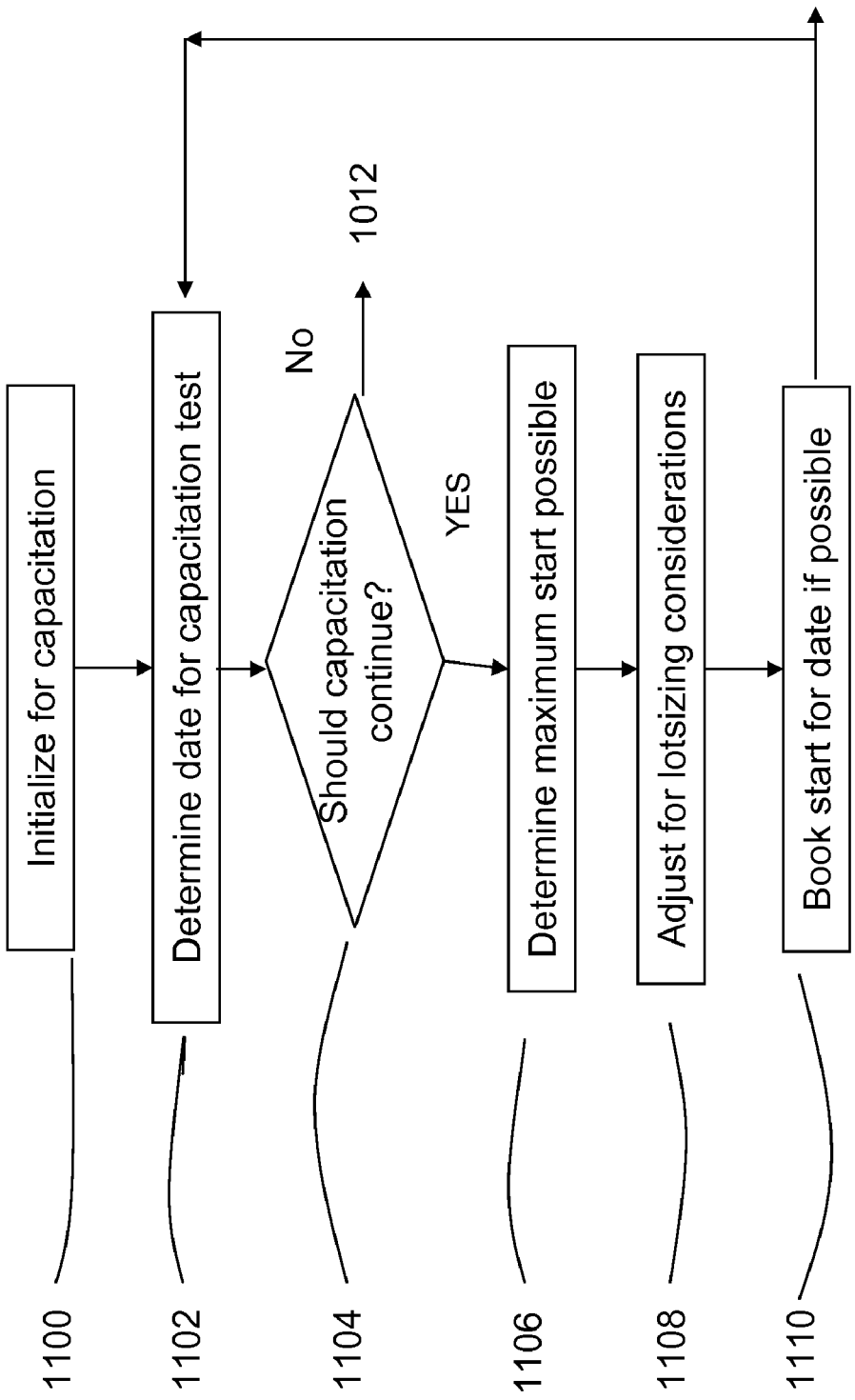
FIG. 22 is a flow diagram illustrating one embodiment of the invention relating to supply consumption optimization.

In item 1010, the lot is capacitated. Put more generally, the lot is potentially split into other valid lotsized releases and scheduled on day or over a period of days such that it does not consume more capacity resources than are available. In the case of manufacturing starts, a given lot may be broken up into separate manufacturing releases on multiple days and the sum of these manufacturing releases would produce product equivalent in quantity to the original lot. Therefore, the output of this step is a list of manufacturing releases having valid lotsizes the totality of which does not exceed available capacity. Please note that this step, as is all others, is extendable to the realm of providing services. In this realm, a lot would correspond to a packaged service and the resulting manufacturing releases would correspond to the scheduling of individual work necessary to perform the service. Lotsizing in the service world would correspond to activity where there may be minimum billing time. FIG. 22 illustrates the capacitating step in further detail and will be described below.

At the end of step 1010, the method proceeds to step 1012. At this point, one of two states will have been reached. In the first state, all of the lot will have been capacitated and converted to manufacturing releases. In this case the method proceeds to item 1000 to determine if there are additional lots to be processed. In the second state, all or part of the lot will not have been capacitated because the "stop point" set in item 1006 will have been reached before all the lot could be capacitated. There will be quantities x>=0 and y>0 such that x+y=the original lot record quantity where x will be the amount that was successfully capacitated and y will be the amount that could not be capacitated. The method proceeds to break up the lot being processed to appropriately deal with the portion that could be capacitated and the portion that could not be capacitated. First the method changes all entries currently linked to this lot to have a quantity of x. By this action and the processing in item 1004, the method will not later process any lower priorities against this portion of the lot if the required dates of those lower priority lots are greater than the present required date being processed. For the y portion of the lot, the method in some cases will be required to process lower priority required dates of the lot where the required dates are later than the required date presently being processed. The method creates dummy lots to force this action as follows. The method creates a dummy lot ID that is unique. For each lot entry corresponding to the present lot which is yet to be processed by the method, the invention creates a new corresponding record with matching date and priority but with quantity y and associates it with the dummy lot ID generated. Hence the method creates a linked set of dummy lots corresponding to the y quantity that were not capacitated during this step for future processing by the method. Additionally, if in step 1006 of the method, capacity was undone, the method creates an additional dummy record of quantity y with the dummy lot ID corresponding to the later required date and high priority of the record whose capacity was undone in step 1006 and links it with the other dummy lots created. By doing this last step, the method ensures that capacitating previously done to satisfy the higher priority need will not be lost and will be handled; the next iteration of step 1000 will create starts needed to support the higher priority date. The method then adds these new records to lots read by step 1000 and sorts the records appropriately to ensure the records to be processed maintain priority/date order. During this sort/merge process, the method also deletes any records found with quantity zero which may have resulted if x was 0. Next the method proceeds to step 1000.

FIG. 22 illustrates item 1010 in greater detail. At the start of 1100, a lot for a specific date, quantity and priority is ready to be capacitated. The method initializes variables "current_lot_quantity" to the quantity associated with the lot, "current date" to the required date of the lot and "try earlier" to true. The method also holds the availability date associated with the lot.

In item 1102, the method determines the date for which a capacitating test is to be done. This corresponds to the "current date" referred to in the description of item 1100. If this is the first time this step of the method has been entered for the lot/required date being processed, the method goes immediately to item 1104. Otherwise, if "try earlier" is set to true, the method determines if the present current_date is less than or equal to availability date. If so, the method sets "try earlier" to false, sets current-date to the original required date of the lot plus one day and goes to item 1104. Otherwise, the method subtracts one day from current_date and goes on to item 1104. Otherwise, "try earlier" was originally set to false so one day is added to current_date and the method proceeds to item 1104. By performing the above, if the method cannot capacitate the lot fully on the required date, the method next attempts to find capacity to do a manufacturing start by starting early if possible. If this is not possible, it looks for capacity later than the required date.

In item 1104, the method determines whether it must continue to attempt to capacitate the current_lot_quantity. The method ends at this point and returns to item 1012 if "current_lot_quantity" is zero or "current date" is greater than or equal to stop date. Otherwise the method goes on to item 1106.

In item 1106, the method uses any capacitating method appropriate to determine the "possible capacitated starts" corresponding to the maximum amount of current_lot_quantity that can be built on current_date without exceeding available capacity. The method proceeds to item 1108.

In item 1108, the method performs calculations that must be done if the lot must be lotsized. If the lot being processed is a lotsized lot, the method finds the largest possible start x that can be made that is a valid lotsize which is <="possible capacitated starts" such that (current_lot_quantity−x) is also a valid lotsized start or zero. If the current start does not require lotsizing, the method sets x=the "possible capacitated starts" returned from the capacitating method.

In item 1110, manufacturing starts are created and available capacity resources are appropriately decremented if it is possible to make a valid manufacturing start on the current_date. If x is greater than zero, the method creates a manufacturing release of quantity x for date current_date and links it with the lot/required date being processed. This linkage will be used in item 1006 of the method to undo capacitating and booked starts when needed. The method decrements available capacity as required by the manufacturing release that was created in this step. Finally, the method subtracts x from "current_lot quantity". The method then proceeds to item 1102.

The details of the general method thus explained, its utility to specific business problems is easily seen. For example, a business with long lead time products may wish to make manufacturing starts to meet a customer's desired (or request)_date but not at the expense of missing the customer's (or another customer's) commit_date. In this case, two dates would be associated with manufacturing starts, one corresponding to the earlier in time customer request date with lower priority and another corresponding to a later customer commit date with higher priority. The method, as demonstrated, would perform resource allocations (capacitating) in a manner to best preserve customer commit date while attempting to better to customer request date. The method accomplishes this by first capacitating production starts to the higher priority commit date. The corresponding lower priority request date is processed subsequently and before it is processed, the production starts and capacity consumed by the corresponding higher priority commit_date is undone by item 1006, above. When capacitating for the request date is performed, it is then possible that capacitated production starts can be made earlier in time in response to the request_date if available capacity exists. In no case will production starts be later in time than that originally assigned to the higher priority commit date as the method will, in the worst case, be able to create production starts using the capacity made available when the resources associated with the higher priority start were returned to the method in item 1006. Therefore, the method supports the business goal of allowing production starts to be made to support request date provided higher priority commit dates are not impacted.

As a further example of the utility of the method in practice, take a case where a business can be awarded bonus money for delivering product by a certain date. In this case, the business would want to drive production starts early to a high priority but if a capacitated start could not be made before a date guaranteeing delivery by the bonus date, the business would want to reduce the priority of the start to be consistent with other production starts. The method supports this by allowing a start to be associated with an initial higher priority and with a later date with a lower priority indicating it is beyond the point when the bonus date can be met. The method will first attempt to create capacitated releases to the earlier higher priority date but by the actions of items 1108 and 1110 where "stop date" is employed, if manufacturing releases cannot be done by the second date, capacitating at that point will be done at lower priority when competing for available resources.

Figure 24:
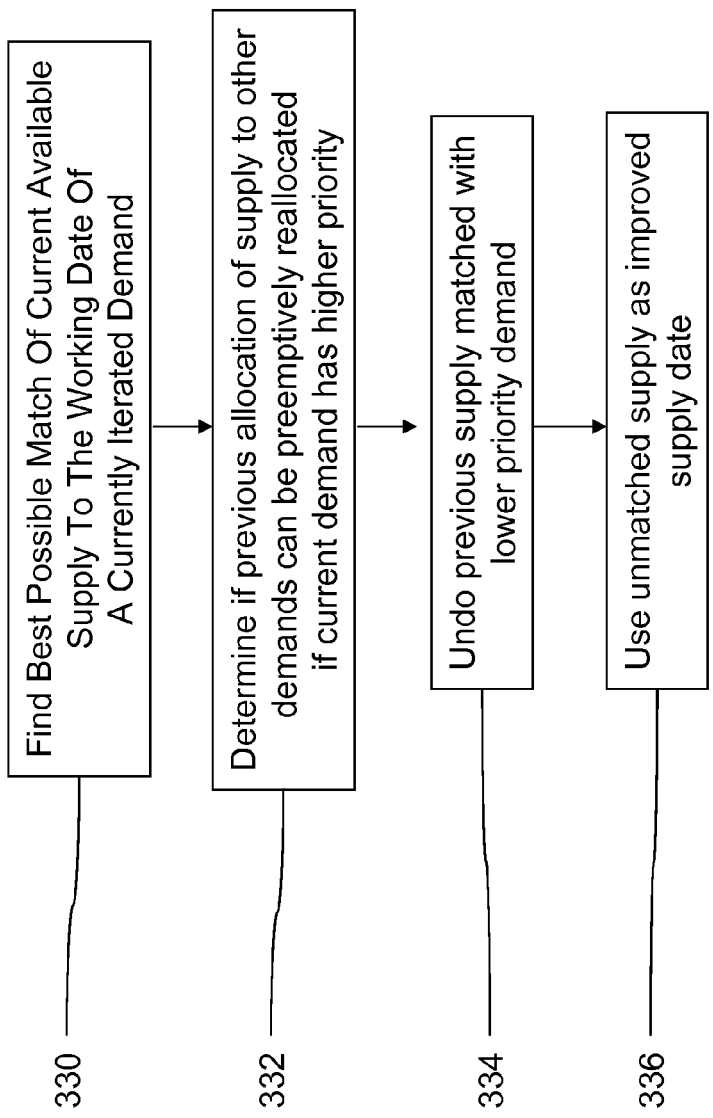
FIG. 24 is a diagram further illustrating the details of a block in FIG. 23.
Figure 25:
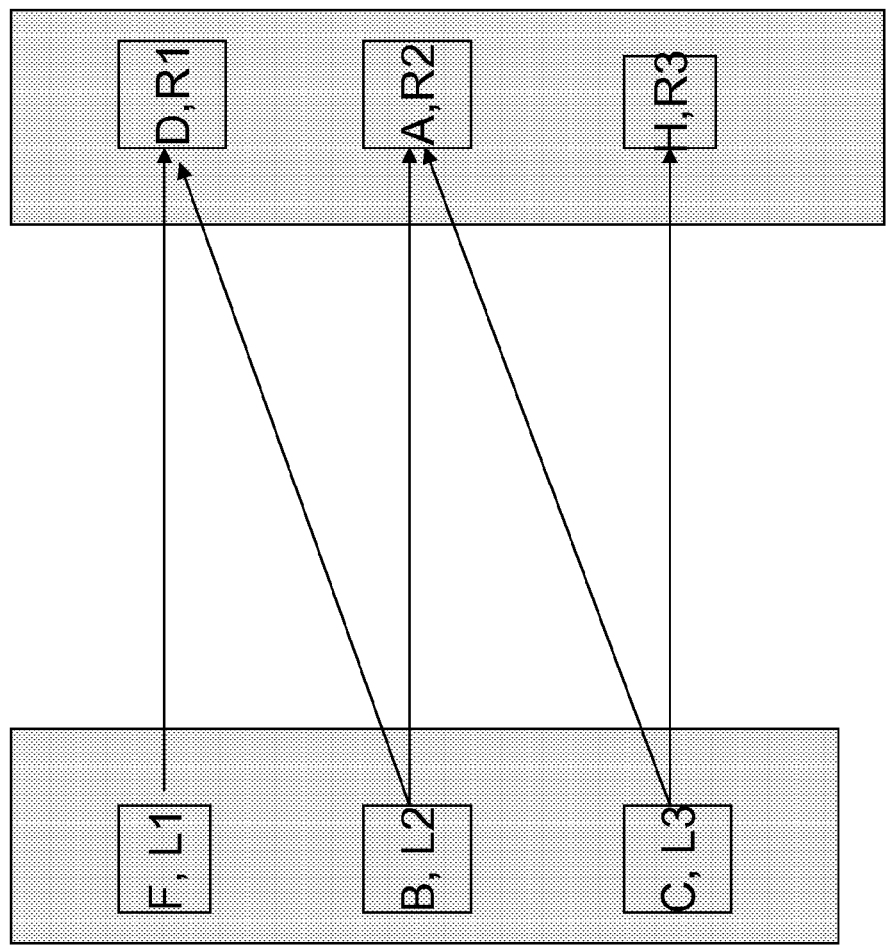
FIG. 25 is a diagram illustrating a typical supply demand relationship.

With respect to the supply consumption optimization that is briefly mentioned above in items 1 and 21, FIGS. 23-27 discuss the supply consumption optimization in greater detail. FIG. 25 shows a typical supply demand relationship. In the FIG. 25 example, supply locations L1, L2, and L3 ship product to demand locations R1, R2, and R3. In the figure, component parts F and B are shipped from locations L1 and L2 to location R1 where they are assembled to create part D. Similarly, components B and C are shipped from L2 and L3 to location R2 where they are assembled to produce part A, and part C is shipped to R3 where it is further manufactured to create part H.

This problem is a variant of the transportation problem where there are multiple supply locations (source) and multiple demand locations (sink). The general objective is to match sets of multiple components' supply from the different sources to demands at different locations in the most efficient way possible. The present invention extends the prior art by solving this problem when demand attributes change as a function of delivery date. In particular, the method illustrates how changing priorities as a function of delivery date and perishing demand quantities as a function of delivery date are handled.

Generally, the method uses the expression delivery date to refer to the time the customer receives shipment of the product. However, the invention applies as well to situations where the delivery date represents some time earlier than customer receipt of the shipment (e.g., the delivery date may indicate the time of customer receipt minus transportation time or other lead time). Similarly, while the method describes the invention according to dates, the method applies as well to any other units of time (e.g., month, week, two day period, hour, minute, second, millisecond of a day) and further that the time period increments may vary across time.

One idea behind the invention revolves around the transformation of demand records in a manner which does not lose visibility to the original demand information. For each demand record, the method creates a record for each desired delivery time (generally a date) and matches priority of the demand if not delivered on that date. For example, if the demand has two dates—a commit date and a request date—then the method would create two records: one for the commit date and the other for the request date, each with its associated demand priority. Another example of an attribute which may change as a function of the delivery date is the demand quantity. The present invention illustrates this aspect by allowing each demand to have a set of "perish quantities" over time. These are the quantities of the demand which perish (i.e., vanish) if not supplied (fulfilled) by the specified "perish dates." If the total of all perish quantities for a demand exceeds the quantity demanded, then an error message is produced and the latest perish quantities are reduced until the sum of all perish quantities equals the quantity demanded.

Another idea of the method is the transformation of supply into initial period ending inventories. The method transforms the supply by generating the cumulative sum of supply over the periods for which supply is available for each of the multiple components. This transformation of the supply is one key to resolving supply assignments for the multiple demand dates and demand class priorities. After the initial cumulative supply is calculated, it is reduced by consumption as it is allocated to demands. The resulting transformed supply gives a view of the period ending inventory under the assumption that inventories have been consumed only by those demands allocated thus far. For example, the period ending inventory at time i of a component part number would be the cumulative quantity supplied of that part number by at the end of period i reduced by its cumulative demand consumption through that period. Therefore, any demand satisfied in period i from the transformed supply could have been supplied by any of the actual supply availabilities on or before period i. Of course, when period ending inventory is used in the method to satisfy (fulfill) demand, the period ending inventory is never allowed to drop below zero at any point in time.

Figure 26:
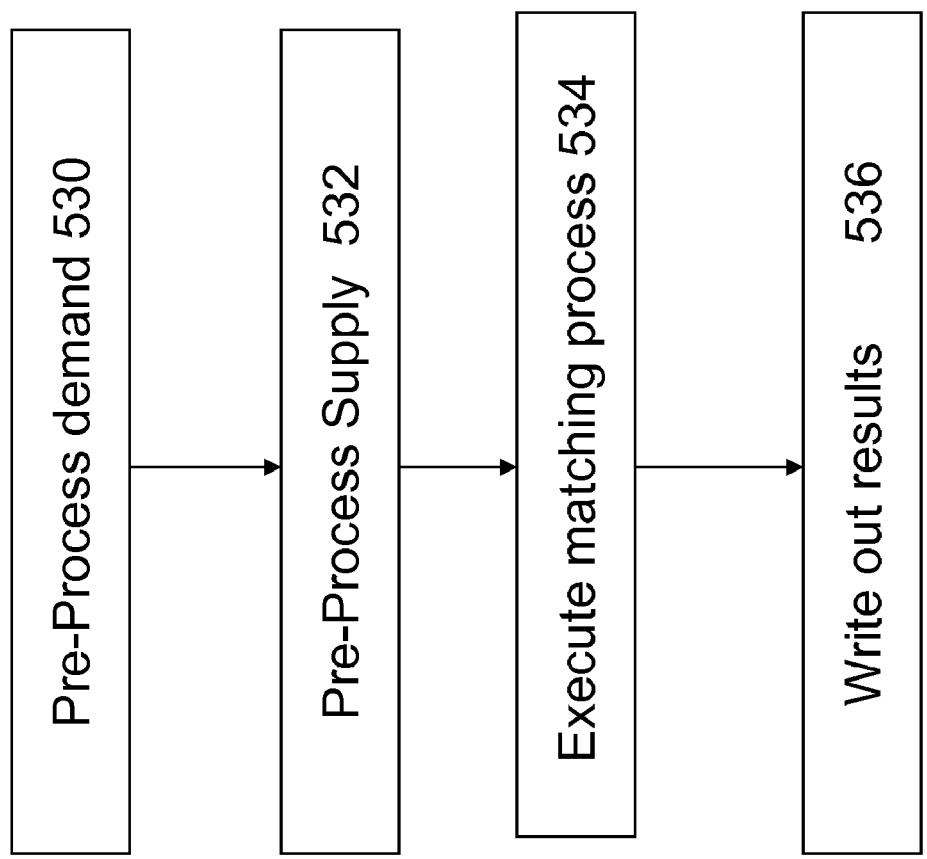
FIG. 26 is a diagram illustrating one embodiment of the invention relating to supply consumption optimization.
Figure 27:
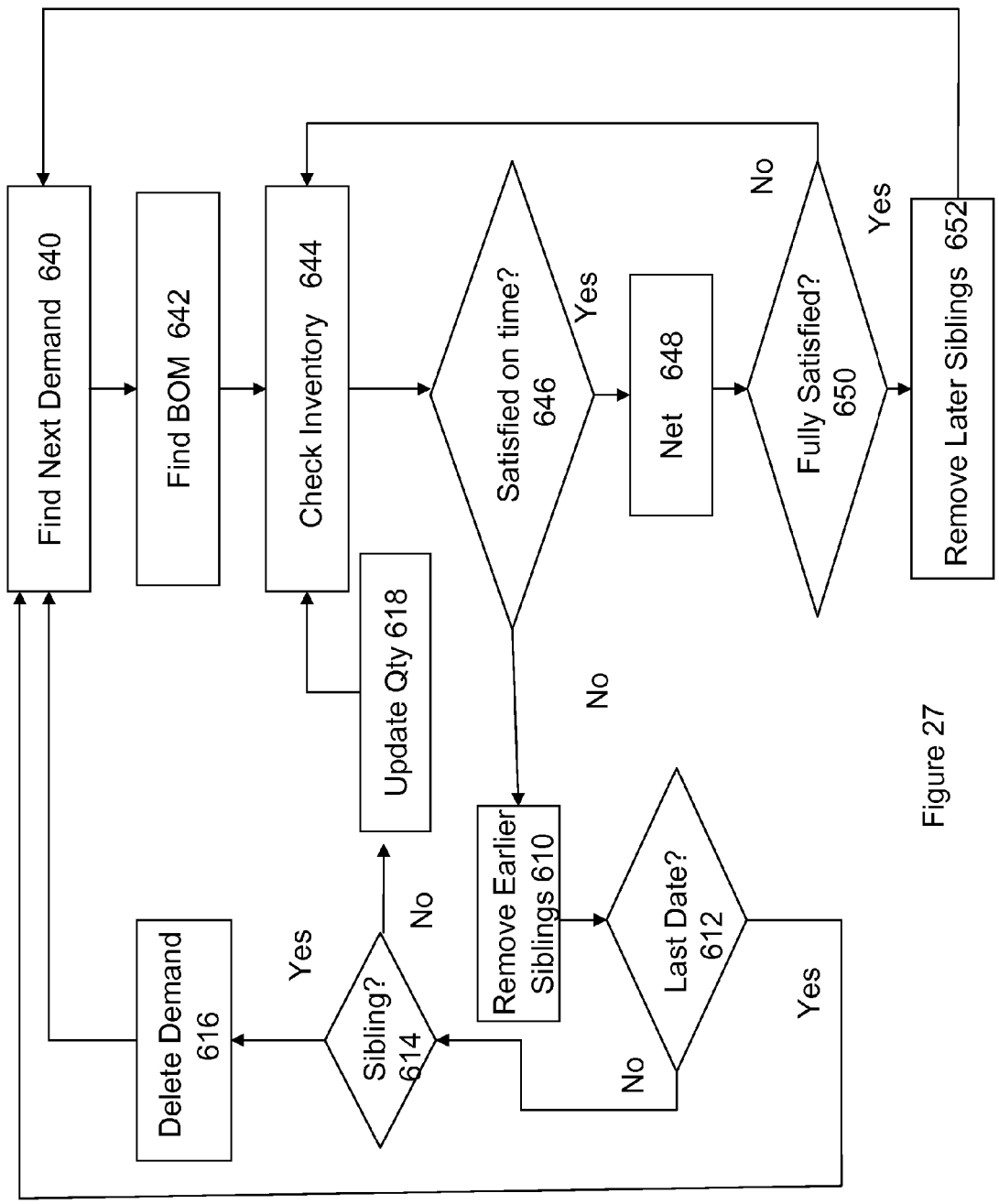
FIG. 27 is a diagram illustrating an embodiment of the invention related to the process of matching component inventories against assembly demands.

One Embodiment of the invention is outlined in FIG. 26. Block 530 transforms the demand creating multiple demand records for each associated priority. Block 532 creates an initial transformation of the supply by accumulating the raw component supply records into a period ending inventories under the initialization under the assumption that none of this supply has yet to be consumed. Block 534 executes the matching process which allocates the period ending inventories resulting from the component supply against the assembly demands. The demands are assigned in 534 in priority sequence. Because the demands are allocated against the projected inventories, the raw supply records contributing towards that inventory are unspecified at the time of demand allocation. This allows the underlying raw supply records to be allocated to demands implicitly at a later stage of the algorithm based on the needs of other demand priorities. For example, suppose that raw supply records of a single required item are available on March 3 (10 pieces) and March 9 (another 10 pieces) and a demand for 10 pieces with a commit date of March 17 is processed. Presuming no other demands have been processed yet, there are 20 pieces of period ending inventory available on March 17 when the committed demand requires. The method consumes 10 of those pieces of transformed supply on March 17 without specifying whether the underlying supply comes from the March 3 or March 9 raw supply. Depending upon the timing needs of subsequent demands processed, the underlying supply implicitly consumed by the March 17 demand will either be the March 3 or March 9 raw supply. By delaying this decision on raw supply allocation, the method is able to provide a better allocation (i.e., more demands fulfilled closer to their desired delivery dates) during the processing of later demands. Suppose that the demand committed for March 17 had a request date of March 4. In this case, if the priority of the request is important enough relative to the importance of competing demands, then the March 3 raw supply should be allocated to it. Conversely, if the priority of the request is not important enough relative to priorities of other demands competing for the March 3 supply, then the demand with a commit date of March 17 and request date of March 4 will get the March 9 raw supply. Because the demand commitment of March 17 is initially allocated supply from the period ending inventory, the decision on whether it is supported by the March 3 or March 9 raw supply is delayed until after less important demand priorities are considered. This approach allocates raw supply in a manner which is effective in meeting the goal of on time delivery with respect to demand priorities. Furthermore, because the demands are matched to period ending inventory in a sequential manner—without the need for reprocessing (no backtracking)—the method is fast as well as effective. The details of blocks 530, 532, and 534 are discussed further below.

Block 530 transforms the demand creating multiple demand records for each associated priority of an original demand. Each of these created records has its own target delivery date. Refer to the set of demand records created from a single original demand record as a family of demand records, and multiple records in a same family as siblings. The invention retains information on the sibling relationships throughout the processing so that when the method processes one demand record in a family, information on its siblings is readily known. For clarity of explanation, this patent application is written under the (reasonable) presumption that no records in a same family share a same target delivery date, recognizing that those skilled in the art know how to check for this condition.

There is a single set of perish quantities associated with each family. Each of these perish quantities has a date (time) at which the amount of perish quantity perishes (vanishes) if the demand is not fulfilled by that date (time). In block 530, the created demand records are assigned a quantity equal to the original demand quantity reduced by the total of all perish quantities which have perished by the date of the demand's priority. For example, if a demand for 100 pieces has priorities of 1, 2, and 3 on June 20, June 10, and June 30 respectively and perish quantities of 10 and 15 on June 15 and June 25 respectively, then the created demands would be for 100 pieces on June 10 with priority 2, 90 pieces on June 20 of priority 1, and 75 pieces of priority 3 on June 30.

After creating the demand records, block 530 then sorts the demand records according to the sequence of desired processing. In one embodiment, the demand records are sorted in sequence of priority (most important priorities first), date (earliest target delivery date first), demand part number (typically an assembly part number which is made from components), location (e.g., plant location), and (in ascending sequence) demand quantity. In the example of the preceding paragraph, presuming that lower priority numbers indicate a higher priority (e.g., priority 1 more important than priority 2), the demands would be sorted into the sequence: 90 pieces of priority 1 on June 20, 100 pieces of priority 2 on June 10, and 75 pieces of priority 3 on June 30.

Block 532 creates an initial transformation of the supply by accumulating the raw component part number supply records into a period ending inventory under the assumption that none of this supply has yet to be consumed. The raw supply includes all existing and projected supply expected to be available. This raw supply information is sorted by part number (typically a component part number), supply location, and availability date at the supply location (earliest dates first).

The raw supply is transformed into an initial period ending inventory by cumulating the supply over time under the presumption that (so far) none of the inventory has been consumed. At this point in the method, the period ending inventory resulting from the supply is known. For example, if the raw supply is 100, 100, and 50 on August 15, August 18, and August 20 respectively, then the initial period ending inventory would be 100, 200, and 250 on August 15, August 18, and August 20 respectively.

The period ending inventory is then sorted by part number, supply location, and date (in sequence of latest dates first). Continuing with the preceding paragraph's example, the period ending inventories would be sequenced as 250 on August 20, 200 on August 18, and 100 on August 15. Although this sorting sequence is not essential, it does facilitate efficient calculations further in the method.

Following the sorting of the period ending inventory, it may be convenient to create a list of unique component supply part numbers and locations. These parts are typically components of an assembly part number, but the method loses none of its applicability if the component and the assembly are the same part number. Similarly, the component supply location may or may not be at the same location as the assembly part number.

Block 534 executes the matching process which allocates the period ending inventories resulting from the component supply against the assembly demands. Recall that both the demand and period ending inventory have been sorted previously above with the demands sorted so as to have the most important demands first. The logic of block 534 is exemplified in FIG. 27. Block 640 finds the next demand from the sorted list (i.e. the most important demand to process next). This is the demand which will be allocated (component) period ending inventory by the process illustrated in FIG. 27.

Block 642 accesses the bills of materials data to determine all component part numbers required to supply the demand's part number at the demand's location. The demand part number is typically an assembly part number but could be the same part number as a component part number. For clarity of explanation, the method will be described under the assumption that the bills of material does not change over time, recognizing that those skilled in the art will know how to adjust for this if required. Block 642 will also find all component supply locations and determine the transportation time from each component supply location to the assembly location and also the transportation cost.

Components may have a single supply location. However, when block 644 searches for available inventory of a component which has multiple supply locations, the supply location to be selected will be one which fulfills the demand on time or as close to on time as possible, accounting for any transportation time. When multiple such locations exist, the location with the lowest transportation cost will be selected. When multiple locations of a component can fulfill a demand on time (or as close to on time as possible) and have a same transportation cost, ties will be broken in favor of the location with the lowest transportation time. If ties remain, the method assigns the supply location which is able to satisfy as large a percentage of the demand quantity as possible. If further ties remain, then the method assigns the location arbitrarily. Those skilled in the art will recognize that the preferential sequencing described in this paragraph for determining the component supply location can be adjusted (re-sequenced) if warranted by the particular operating environment. As one example, avoiding partial shipments may be more important than meeting the demand on time or may even be prohibited altogether. In other environments, it will be permissible to combine partial shipments from multiple locations of a component and thus assign multiple component locations for fulfilling a particular demand. It is presumed that this is the case in the remaining discussion.

Block 644 determines the quantity of demand to be satisfied (QS) on the demand date as follows.

QS=quantity of the demand which will be satisfied by the demand on the demand date.

QD=quantity of the demand p=time period containing the demand date (time)

c=index for component part number

N=last period ending date in the horizon $TT_c$=transit time from the location where component c will be supplied to the assembly location $QTYPER_c$=bill of material quantity (quantity of component c per assembly part a released)

$I_{ct}$=period ending inventory of component c at the end of time period (date) t $AS_{cs}$=available supply of component c at the preferred component location in period s which is being tentatively reserved for a higher priority sibling of the current demand. This value of $AS_{cs}$ is calculated based on the (tentative) assumption the sibling consumes the latest supply possible which supports the sibling being fulfilled as planned during its prior processing during the method.

The quantity of demand to be satisfied (QS) on the demand date is calculated from the above information as follows.

$$QS=\text{Min}\{QD,\text{Min}_{c,t=(p-TTc)\text{to}N}(\{I_{ct}+\Sigma_{s=1 \text{ to } t}AS_{cs}\}/QTYPER_c)\}$$

Block 646 checks to see if at least some portion of the demand was satisfied on time. If QS is zero, then block 646 passes control to block 610 and otherwise to block 648. Block 648 subtracts the satisfied demand quantity (QS) from the full demand quantity. Block 648 also subtracts from the period ending inventory of the present demand period (offset by transportation time) and from all future periods a quantity equal to the amount of QS for which the supply on that demand period—or earlier—was not previously implicitly allocated for supply to a higher priority later sibling of the demand. Furthermore, any amount of QS which had been previously implicitly allocated for supply to a higher priority later sibling at a different component location than that being used in fulfilling the demand must be added to the period ending inventory of said different component location for the period of its previously implicitly allocated supply availability and all future time periods.

If the demand quantity has not been fully satisfied, then block 650 will return control to block 644 to check additional possibilities for satisfying the demand on time (e.g., using component inventory from another location). If the demand has been fully satisfied, then block 650 will invoke block 652. Block 652 will remove records for any siblings of the demand which have a later demand date than the demand. Any such later demands will have a lower priority than the demand. Since their higher priority, earlier sibling has been fully satisfied, there is no reason they need to be processed. This is why they may be removed from the demands to be processed. Once this has been done, block 652 will return control to block 640 which will find the next demand to process.

When block 610 has been invoked, this means that the demand has not been satisfied on its demand date. Among other things, this means that any of its siblings which have demand dates earlier in time (which must have lower priority than the demand since they were not yet processed) will not be satisfied. Consequently, all such earlier sibling demands will be removed from the demands remaining to be processed. After this has been done, block 610 will update the demand date of the demand to the next demand date. In one embodiment, this next demand date could simply be the next day in the calendar. However, in one embodiment, this next demand date will be the earliest of the following three dates: 1) the earliest date of the demand's later siblings 2) the earliest date after the present date when the demand perishes or partially perishes, and 3) the earliest time period z after the present demand date at which time the following expression becomes strictly greater than zero . . .

$$\text{Min}_c\{I_{c(z-TTc)}+\Sigma_{s=1 \text{ to } z-TTc}AS_{cs}\}$$

Block 612 will check if the resulting next demand date is beyond the demand horizon. If so, it will not be satisfied and control will return to block 640 to process the next demand; otherwise, control is passed to block 614 which checks to see if there is a sibling demand with that next demand date. If there is such a sibling demand, then block 616 will remove (delete) the demand which has been identified as needing a next demand date since the demand's property priority and quantity will be that of its sibling which will be later processed. After this has been done, block 616 will return control to block 640 which will find the next demand to process. If block 614 does not find any such sibling demand on the next demand date, block 618 will update the demand quantity to reflect any quantity which has perished. If the perish quantity is of equal or greater magnitude as the demand quantity, then the demand will be removed and the perish quantity reduced by the demand quantity and control will return to block 640. Otherwise, the demand quantity is reduced by the perish quantity and the perish quantity set to zero and control will return to block 644 which will check for inventory available on the next demand date and proceed as described earlier.

A special case of the problem solved occurs when supply exists for a single item (as an example, a part number at a single location) and is allocated to a need or demand of a single item (as an example for the same part number at the same single location or a potentially different part number at a potentially different location). In this situation, an alternative embodiment of the above method may be utilized. Whether the previously described method or this alternative embodiment is used to solve this special case problem, either method may also be applied to project selection and rationing of constrained materials and services as described below in addition to demand supply network problems.

Thus, as shown above, in business, one often has to determine how to use an available supply (anything that has a value and projected availability dates) against competing needs (or demands) which consume the supply. Competing needs for a given supply can be prioritized. Often, however, business priorities associated with a need can change as a function of delivery time. In general, a need may not be important at the moment but may become critically important if the need is not met by a certain date (e.g., completing a project by a certain date required by government regulations). The converse is also true in that certain business needs may be critical to get done by a certain date but lose value if the date is not met (e.g., being first to market). In fact, any given need for a supply may in reality have multiple dates associated with it such that supplying the need by those dates would have different value to the enterprise and hence should be associated with different priorities. The embodiment described solves the problem of how to assign supply to needs (or demand) when priorities associated with the need change as a function of when the supply can be delivered.

This invention can be applied to a variety of business situations such as supply chain decision support. In supply chain business process, one often has to determine how to supply demands given available supply. Various demands can compete for the same supply and supply can be allocated to demand based on demand dates and demand priorities. Business problems exist where there is a need to supply demand given demand priority changes as a function of delivery date. As one example of this, consider an industry with considerable lead times for making their product. In such a situation, a customer may contact a supplier to obtain a commitment against a requested order. Depending on available supply, the supplier may not be able to satisfy the order when the customer requested it but will give the customer a committed supply date that is later than the customer's desired request date. As time passes, due to other order cancellations or due to improved available supply, the current available supply may be able to satisfy the order earlier than the previously committed supply date. It would be beneficial to the business to have a methodology which would supply the customer's demand closer to original desired date provided it did not impact others' commit dates. This invention can provide a solution to this business need by associating with each demand two dates, a customer request date and a customer commit date and then assigning appropriate priorities to correspond to the request date and commit date. By so doing, this invention will assign supply to demand which will attempt to satisfy lower priority customer request date but not at the expense of higher priority commit date.

The invention is also applicable to project selection. It is often the case that businesses have to make project selection choices based on need and available cash flow. In using this invention, projects (or phases of projects) could be defined as entities consuming available money. Given projected available cash as supply, potential projects with estimates of cash required could be defined with priorities which change over time. The value of a project to the business entity can often change over time. Its priority can change from "would be nice to get done early" to "critical to make by this date." This is often the case for projects performed to meet regulatory requirements and for projects with predetermined commitment dates. Projects can also change from an "important to make by date" priority to an "opportunity passed" priority wherein a project is of value if it can beat a competitor by completing by a given date but of less value if it the date is past. This invention can be applied to best utilize predicted cash flow to best select projects which will consume the available cash supporting a decision process where projects have priorities which change over time.

The invention is applicable to rationing of constrained services or physical supplies. The invention can be used in any situation where rationing is required. That is, in any situation where available services or supplies are less than required to meet all consumers of the service or supply, this invention will best supply consumers of the service or supply, supporting a prioritization process where individual consuming requests have priorities which change as a function of consumption date. Plentiful examples exist of where this invention would have value. For one example, take environments where demand for health care specialist time is in such demand that their time must be rationed. Consumers of this service (i.e. patients requiring a health care specialist) may be serviced reflecting priorities for the service that differ as a function of time. For example, some diseases progress, meaning it is desirable that treatment starts soon but after some projected time treatment becomes critical. As such, this invention could be applied best rationing the health care specialist's time against multiple patients whose priority of treatment may vary over time.

The invention is useful with input preparation of creating demand records with multiple dates and associated priorities. The invention can also be used to handle the following business situation. An enterprise may create a set of demands for purchased parts based on its NEEDS and a separate set of demands based on its WANTS. For instance, perhaps the NEEDS file contains end-item demand reflective of the purchaser's commitments and conservative forecasts while its WANTS file reflects end-item demand using optimistic forecasts with "stretch goals." Using these two files (NEEDS and WANTS) the invention may be used to create a single output file wherein each record contains both a NEED date and WANT date. The invention may be applied to this situation by treating the NEEDS as a supply record (containing part# and demand location) and the WANTS as a demand record. The supply availability date of a match record produced by the method will correspond to the NEED date while the demand date of the match record produced by the method will correspond to the WANT date. The resulting single record of "demand" output could then be used by the supplier who would apply the logic disclosed in these jointly filed CRD inventions. Unmatched NEEDS (or WANTS) would correspond to NEEDS (or WANTS) dates arbitrarily far in the future.

One function of the invention is to matching demands with available supply. This aspect of the invention finds the best matches of supply where demand priority and/or quantity changes as a function of delivery date. This describes a methodology for doing so where a demand has multiple dates associated with it, each date with different associated priorities and/or perishing quantities.

The general idea is to iterate through the demands attempting to match demands with supply. Attempts will be made to satisfy the demands to a working date described in detail below. Initially the working date will be set to the earliest date of the multiple dates associated with the demand. If a supply cannot be found to satisfy a given demand's working date, the method will attempt to find supply that had been previously allocated to a lesser priority demand. If such supply can be found, the method will preemptively take the best such supply to cover the more important demand and leave the demand whose supply has been taken to be resolved in another iteration. The algorithm will do this while being cognizant that the priorities and/or quantities of the demands will change dependent on when the demand can be supplied (satisfied). In such a manner, in the case where priorities vary with time yet quantity is constant, the method will converge to an optimal solution such that it is not possible to find a pair of demands whose calculated matching supplies can be switched to better conform to the dated demand priorities. The solution will be good, but not necessarily optimal, where quantity varies with time for those situations where competing demands of equal priority have different rates of perishing (e.g., if one demand perishes abruptly and another of the same priority perishes gradually).

Figure 23:
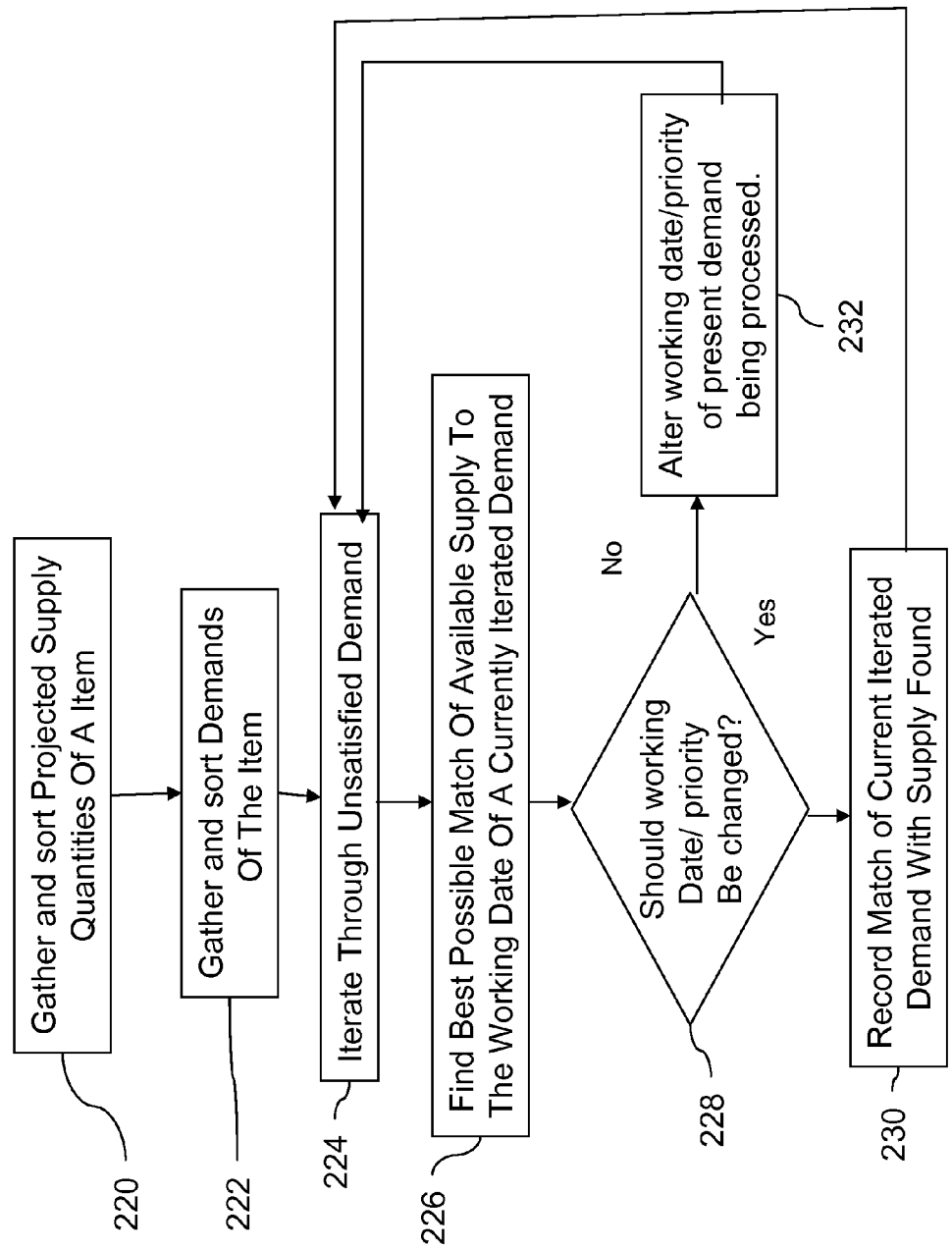
FIG. 23 is a flow diagram illustrating one embodiment of the invention relating to supply consumption optimization.

FIG. 23 illustrates such a method of optimizing supply consumption. This embodiment begins by receiving projected supply quantities of an item in block 220. The supply quantities can change over time as delivery times and schedules vary. The method also receives and sorts demands for the item in block 222. A demand may or may not have multiple dates each with an associated priority. A demand may or may not have quantities which perish over time. The demands are sorted in working date first order. As explained earlier, initially the working date of a demand is the earliest date associated with the demand.

In block 224, the method iterates through the demands to match the demands with the supply quantities. At each point in the iteration, the method finds the best possible supply against the current demand being processed in item 226. During this process, supply previously assigned to demands during an iteration of the method may be preemptively reallocated to satisfy current demand depending on the priority of the current demand. The method thus ensures lower priority demands will not take available supply at the expense of higher priority demands. Details of this step of the method will be described below and are further illustrated in FIG. 24.

A best possible supply against the current demand will have been returned at this point by the method of block 226. Two cases are possible and a condition is tested as indicated in block 228. If the supply date returned is for a date that is earlier than the next date associated with a priority/quantity change for the demand, the supply is booked as supply against the demand in block 230. The supply quantities and demand quantities are appropriately decremented then processing returns to block 224 for the next iteration of the algorithm. Otherwise, the date of supply is applicable to a time where the priority or quantity of the demand differs from the present working date of the demand. Therefore, the supply is not matched with the demand at this time. Instead, the working date of the present demand is changed to the next date associated with the demand along with its corresponding priorities and quantity. This altered demand is then returned to the block 224 for processing through another iteration of the method.

Thus, this method allocates the supply to the demands according to the priorities such that no demand having a lower priority earlier requirement date is satisfied until all demands having higher priority earlier requirement dates are satisfied, and such that no demand having a lower priority earlier requirement date is satisfied until all demands having higher priority later requirement dates are satisfied.

More specifically, in item 220, the invention obtains current and projected supply available for a given item or service. This can be the projected supply of a manufacturing asset at a given manufacturing plant or warehouse or it can be a service. Projected supply is sorted in supply date order (from earliest to latest). Additionally, dummy supply records are added with a huge quantity and a date far in the future to the input records. This is done to allow the method to proceed optimally in the case when there is more total demand than supply. Any demands that are ultimately associated with such dummy supply records by the invention are considered never satisfied with supply. This allows the method to continue to attempt to find the best match of supply versus demand even if all supply has been consumed.

As mentioned above, in item 222, the invention obtains demands which need to consume supply from the given supply of the item or service obtained from 220 above. Each of these demands may contain multiple dates and associated priorities. Optionally, each demand may have a set of "perish quantities" over time. These are the quantities of the demand which perish (i.e. vanish) if not delivered by the specified "perish dates." If the sum of all perish quantities for a demand exceeds the total quantity demanded, then an error message is produced and the latest perish quantities are reduced until the sum of all perish quantities equals the quantity demanded.

In addition, the demands are sorted in item 222. For each individual demand, if a demand has "n" dates each associated with its own priority, the dates and associated priorities are ordered in date sequence from earliest to latest. A working date is associated with each demand corresponding initially to the earliest date associated with a demand. In addition, in item 222 the invention creates a working date and associated priority for each demand. Initially, the working date is set to the earliest date associated with a demand and the working priority is set to the priority associated with this date. Finally in 222, the demands are sorted from earliest to latest working date.

As shown in items 224-232, the invention iterates through the demands (starting with the working date) matching supply against demands and creates a "match table" which will associate given supply assets with given demands. In item 224, the invention keeps iterating as long as there are demands which have not yet been matched with a supply and there are still non-zero asset supplies available.

During the iteration, in item 226 the invention finds the best possible supply with which to associate with the current demand/working date being processed. The details of this step are illustrated in FIG. 24 which will be described below.

Depending on the supply date that is returned by block 226, the method will follow two differing paths. A test is done by block 228 of the method to determine whether the present supply can be associated with the demand or whether instead it will be necessary to change the working date and associated priority of the demand for subsequent iteration of the method. If the date of the supply is less than or equal to the working date of the demand, the method proceeds to block 230 to associate the supply with the demand.

Otherwise, in the processing of block 208, the invention defines the "next effective demand date" as the next date associated with a given demand that is greater than the current working date. If the current date of the supply available to the demand is less than the next effective demand date or if there is no next effective demand date, the demand will be supplied late but this is the best that can be done and no further processing of this demand will be necessary. In this case, the invention proceeds to block 230 to associate the supply with the demand. If the current date of the supply available to the demand is greater than the next effective demand date, the current available supply will be available to cover a demand but at a date where the demand will have different priority. Therefore, to ensure supply is allocated with correct priority in such a case, the method will not at this time perform block 230 to assign supply to the demand. Instead, the invention will change the working date, priority, and potentially quantity associated with this demand to reflect the priorities and quantity of the demand being satisfied by next effective demand date by performing the method of block 232.

In block 230, the method records and saves a matching of supply to the currently iterated demand. A table entry is created in a "match table" which associates the quantity of a supply asset used to satisfy (fulfill) a same quantity of the particular demand. This same quantity is called the match table quantity. The supply available and demand needed to be supplied is netted by this process. More specifically, the invention nets the demand by creating an entry matching the supply with the demand in the "match table". This table holds information identifying each demand and each asset which is planned to be used to satisfy the demand. In addition to the keeping all the dates and associated priorities associated with a demand, this table also carries the specific demand working date and the associated priority that was used when the supply demand match was made.

If the supply of the asset is less than or equal to the amount of the demand, the invention sets the match table quantity to the asset supply quantity. Then, the invention nets the supply from the demand by subtracting out the asset supply from the demand quantity and making the supply of the asset zero. To the contrary, if the supply of the asset is greater than the amount of the demand, the invention sets the match table quantity to the demand quantity. Then, the invention nets the demand from the supply by subtracting the demand quantity from the asset supply available and making the demand quantity zero. By this process, some of both supply and demand used by the iteration of block 224 is consumed.

In block 232, the method will set the working date of the currently iterated demand to the next effective demand date and set priorities of the demand to the priorities associated with the next effective demand date. The invention at this point checks to see if there is a perish quantity corresponding to this demand when moving its working date to the next effective demand date. If no such perish quantity is found, the method returns to item 224 to be processed by the method, this time considering the new working date and priority. If the perish quantity is less than the demand quantity, then the invention reduces the demand quantity by the perish quantity and changes the perish quantity on that next effective demand date (for use in future iterations) to zero; otherwise, the invention eliminates this demand record (it has completely perished), reduces the perish quantity on that next effective demand date by the demand quantity, and repeats the next iteration without this demand record. After updating the working date of the demand and potentially its priority and/or quantity, the method proceeds to the next iteration at the beginning of item 224.

FIG. 24 illustrates in more detail the method of block 226 of FIG. 23, wherein in block 330, remaining supply is first examined in attempting to satisfy the current working date of the currently iterated demand. If a supply quantity cannot be found to satisfy the working date for the currently iterated demand on time, block 332 of the method determines if supply allocated to demand in a previous iteration of the method should be reallocated and used to cover the needs of the present iterated demand. Thus in step 332, the method compares the priority of the working date for the currently iterated demand with priorities of previously iterated demands which have been supplied. If a priority of the working date for the currently iterated demand exceeds a priority of a previously allocated working date of a previously iterated demand, the method reallocates (preemptively) the supply quantities from the previously allocated demand to the currently iterated demand in item 334. The reallocated supply providing an improved supply date is made available in item 336 providing block 228 with an improved supply date for its processing.

More specifically, in block 330, the invention finds the earliest unconsumed asset that can be used to supply (i.e., fulfill) the demand. An asset is unconsumed if it has quantity that has not yet been associated with a demand by some iteration of the method of block 230. If the supply date of the asset so found is less than or equal to the working date of the currently iterated demand, this step of the invention returns the supply to be used by the method of block 228 of FIG. 23. Otherwise, the method proceeds to block 332.

In block 332, the method determines if previous allocation of supply to other demands can be preemptively reallocated if current demand has higher priority. To find previously allocated supply which can be preemptively given to the current iterated demand, the invention goes through the existing match table with current entries of supply matched to demand and to find, if it exists, a lesser priority demand which has been previously covered by a supply asset whose supply can be taken to be applied against the higher priority demand represented by the current demand. The invention goes through each entry in the "match table" containing the association of specific assets supplying specific demands. The method searches for entries where the supply date of the corresponding match table entry is less than or equal to the working date of the current iterated demand and the priority of the demand being covered by this match table entry is of lesser priority than the priority associated with the current iterated demand. If such an entry is found and if this is the first time such a match table entry has been found in this search, the invention saves a pointer to this match table entry. If this is not the first time such a match table entry has been found in this search, the invention saves a pointer to this match table entry only if the supply date associated with the match table entry is greater than the previous one saved or the supply date associated with the match table entry is equal to the one previously saved and this match table entry is associated with a demand of lesser priority than the previous one that was saved.

If no pointer to a match table entry has been found by the above search, no improved supply date to the current iterated demand is possible and the method returns the existing supply to be used in block 228 of FIG. 23. That is, the supply found in block 330 is the best available and is returned. Otherwise, in block 336, the method will undo the match table entry which identifies the asset being associated with the lesser priority demand. In this undo process, it will make the match table quantity available again to available supply and similarly will recreate the lesser priority demand as a demand having that match table quantity that will later have to again have supply associated with it by iteration through block 224. More specifically, in this process, the invention undoes the match table entry that is pointed to by creating a demand record in the input of block 222 with the quantity pointed to in the match table with the same dates and priorities of the demand that was originally associated with this entry, creates a supply record in the input of block 220 with the quantity in the match table with the same supply date as the asset that was previously associated with this entry, and deletes the match table entry. If block 334 was executed, block 336 passes a pointer to the supply record found with the improved supply date which is then used by block 228 of the method as its supply.

With respect to the lotsizing that is briefly mentioned above in items 2, 2a, and 23, and the multiple component utilization that is discussed in items 3 and 22, above, FIGS. 14-22 discuss the lotsizing and multiple component utilization in greater detail.

An embodiment of the present invention has been programmed in C++ and implemented on an IBM P690 server with AFS for data storage and using the AIX operating system. It has also been implemented on HP-UX. It should be understood by those of ordinary skill in the art, however, that the present invention is not limited to the above implementation and is independent of the computer/system architecture. Accordingly, the present invention may equally be implemented on other computing platforms, programming languages, and operating systems, and also may be hardwired into a circuit or other computational component.

While the invention has been described in terms of the preferred embodiments, those skilled in the art will recognize that the invention can be practiced with modification within the spirit and scope of the appended claims.

The invention claimed is:

1. A machine-implemented production planning method comprising:
   inputting into a computing device demands for products, wherein each of said demands have multiple due dates, and wherein each of said multiple due dates have different priorities;
   performing, using said computing device, an explosion process utilizing linear programming and heuristics to identify demands for at least one component that are used to make said products, wherein said explosion process maintains said multiple due dates and corresponding priorities for said at least one component;
   performing, using said computing device, an implosion process utilizing linear programming and heuristics to assign resources to said at least one component considering said multiple due dates and corresponding priorities; and
   outputting from said computing device at least one of said demands for components and an assignment of resources to said components.

2. The production planning process according to claim 1, wherein said explosion process comprises:
   reading and understanding demand input wherein each demand has multiple due dates, each due date associated with a different priority;
   subtracting cycle time from said demands wherein each demand has multiple due dates, each due date associated with a different priority to determine corresponding production starts each having multiple start dates wherein each start date has a different priority;
   exploding said production starts each having multiple due dates, each due date associated with a different priority.

3. The production planning process according to claim 1, wherein said explosion process comprises a materials requirement planning methodology that creates production starts considering demands each of which has multiple due dates, each due date associated with a different priority.

4. The production planning process according to claim 1, wherein said explosion process comprises determining appropriate sizes of production lots demands wherein each of said production lots have multiple start dates and corresponding priorities considering the demands to be supplied each of which have multiple due dates and corresponding priorities.

5. The production planning process according to claim 1, wherein said explosion process comprises reading a bill of materials and the assembly part number release information to create dependent demand for the component part numbers wherein such demand each have multiple due dates and corresponding different priorities considering each assembly part number released have multiple start dates, each start date with a different corresponding priority.

6. The production planning process according to claim 1, wherein said implosion process comprises a supply consumption heuristic that produces optimal results for said demands each of which have multiple due dates and each date associated with a different priority considering supply of a single component.

7. The production planning process according to claim 1, wherein said implosion process comprises a multiple component utilization heuristic that produces optimal results for said demands each of which may have multiple due dates and each date associated with a different priority considering supply of multiple components.

8. The production planning process according to claim 1, wherein said implosion process comprises grouping production starts each having multiple start dates, each start date having different priorities.

9. A machine-implemented production planning method comprising:
   inputting into a computing device demands for products, wherein each of said demands have multiple due dates, and wherein each of said multiple due dates have different priorities;
   performing, using said computing device, an explosion process utilizing linear programming and heuristics to identify demands for at least one component that are used to make said products, wherein said explosion process maintains said multiple due dates and corresponding priorities for said at least one component; and
   performing, using said computing device, an implosion process utilizing linear programming and heuristics to assign resources to said at least one component considering said multiple due dates and corresponding priorities,
   wherein said explosion process comprises a materials requirement planning methodology that creates production starts considering demands each of which has multiple due dates, each due date associated with a different priority,
   wherein said explosion process comprises determining appropriate sizes of production lots wherein each of said production lots have multiple start dates and corresponding priorities considering the demands to be supplied each of which have multiple due dates and corresponding priorities, and
   wherein said explosion process comprises reading a bill of materials and the assembly part number release information to create dependent demand for the component part numbers wherein such demand can have multiple due dates and corresponding different priorities considering each assembly part number release may have multiple start dates, each start date with a different corresponding priority; and
   outputting from said computing device, at least one of said demands for components and an assignment of resources to said components.

10. The production planning process according to claim 9, wherein said implosion process comprises a supply consumption heuristic that produces optimal results for said demand each of which may have multiple due dates and each due date associated with a different priority considering supply of a single component.

11. The production planning process according to claim 9, wherein said implosion process comprises a multiple component utilization heuristic that produces optimal results for said demand each of which may have multiple due dates and each due date associated with a different priority considering supply of multiple components.

12. The production planning process according to claim 9, wherein said implosion process comprises grouping production starts each having multiple start dates having different priorities.

13. A machine-implemented production planning method comprising:
   inputting into a computing device demands for products, wherein each of said demands have multiple due dates, and wherein each of said multiple due dates have different priorities;
   performing, using said computing device, an explosion process utilizing linear programming and heuristics to identify demands for at least one component that are used to make said products, wherein said explosion process maintains said multiple due dates and corresponding priorities for said at least one component; and performing, using said computing device, an implosion process utilizing linear programming and heuristics to assign resources to said at least one component considering said multiple due dates and corresponding priorities, wherein said implosion process comprises a supply consumption heuristic that produces optimal results for said demands each of which have multiple due dates and each date associated with a different priority considering supply of a single component, wherein said implosion process comprises a multiple component utilization heuristic that produces results for said multiple due dates and corresponding priorities simultaneously considering supply of multiple components, and wherein said implosion process comprises grouping demands for said components considering production starts each having multiple start dates, each start date having different priorities; and outputting from said computing device at least one of said demands for components and an assignment of resources to said components.

14. The production planning process according to claim 13, wherein said explosion process comprises a materials requirement planning methodology that creates production starts considering demands each of which has multiple due dates, each due date associated with a different priority.

15. The production planning process according to claim 13, wherein said explosion process comprises determining appropriate sizes of production lots wherein each of said production lots have multiple start dates and corresponding priorities considering the demands to be supplied each of which have multiple due dates and corresponding priorities.

16. The production planning process according to claim 13, wherein said explosion process comprises reading a bill of materials and the assembly part number release information to create dependent demand for the component part numbers wherein such demand each have multiple due dates and corresponding different priorities considering each assembly part number released may have multiple start dates, each start date with a different corresponding priority.

17. A computer storage medium readable by machine tangibly embodying a program of instructions executable by said machine for performing a method comprising:

inputting demands for products, wherein each of said demands have multiple due dates, and wherein each of said multiple due dates have different priorities;

performing an explosion process utilizing linear programming and heuristics to identify demands for at least one component that are used to make said products, wherein said explosion process maintains said multiple due dates and corresponding priorities for said at least one component; and performing an implosion process utilizing linear programming and heuristics to assign resources to said at least one component considering said multiple due dates and corresponding priorities; and outputting at least one of said demands for components and an assignment of resources to said components.

18. The computer storage medium according to claim 17, wherein said explosion process comprises a materials requirement planning methodology that creates production starts demands each of which has multiple due dates, each due date associated with a different priority.

19. The computer storage medium according to claim 17, wherein said explosion process comprises determining appropriate sizes of production lots wherein each of said production lots have multiple start dates and corresponding priorities considering the demands to be supplied each of which have multiple due dates and corresponding priorities.

20. The computer storage medium according to claim 17, wherein said explosion process comprises reading a bill of materials and the assembly part number release information to create dependent demand for the component part numbers wherein such demand each have multiple due dates and corresponding different priorities considering each assembly part number released may have multiple start dates, each start date with a different corresponding priority.

21. The computer storage medium according to claim 17, wherein said implosion process comprises a supply consumption heuristic that produces optimal results for said demands each of which may have multiple due dates and each date associated with a different priority considering supply of a single component.

22. The computer storage medium according to claim 17, wherein said implosion process comprises a multiple component utilization heuristic that produces results for said demands each of which may have multiple due dates and each date associated with a different priority considering supply of multiple components.

23. The computer storage medium according to claim 17, wherein said implosion process comprises grouping production starts each having multiple start dates, each start date having different priorities.

* * * * *